United States Patent
Juliato et al.

(10) Patent No.: US 12,218,813 B2
(45) Date of Patent: Feb. 4, 2025

(54) CROSS-NETWORK TIME-ALIGNMENT CHARACTERIZATION FOR SCHEDULED TRAFFIC

(71) Applicant: Intel Corporation, Santa Clara, CA (US)

(72) Inventors: Marcio Juliato, Portland, OR (US); Javier Perez-Ramirez, North Plains, OR (US); Mikhail Galeev, Beaverton, OR (US); Manoj Sastry, Portland, OR (US); Dave Cavalcanti, Portland, OR (US); Christopher Gutierrez, Hillsboro, OR (US); Shabbir Ahmed, Hillsboro, OR (US); Vuk Lesi, Cornelius, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/215,936

(22) Filed: Jun. 29, 2023

(65) Prior Publication Data
US 2025/0007802 A1    Jan. 2, 2025

(51) Int. Cl.
*H04L 43/0817*    (2022.01)
*H04L 9/40*    (2022.01)
*H04L 43/067*    (2022.01)

(52) U.S. Cl.
CPC ........ *H04L 43/0817* (2013.01); *H04L 43/067* (2013.01); *H04L 63/1416* (2013.01); *H04L 63/1425* (2013.01)

(58) Field of Classification Search
CPC .............. H04L 43/0817; H04L 43/067; H04L 63/1416; H04L 63/1425
See application file for complete search history.

(56) References Cited

U.S. PATENT DOCUMENTS

| | | | |
|---|---|---|---|
| 2013/0077633 A1* | 3/2013 | Mizutani | H04L 7/0016 370/400 |
| 2020/0252424 A1 | 8/2020 | Regev | |
| 2022/0014529 A1* | 1/2022 | Juliato | H04L 9/12 |
| 2022/0014532 A1* | 1/2022 | Perez-Ramirez | H04L 63/1416 |
| 2022/0224701 A1 | 7/2022 | Gutierrez | |

OTHER PUBLICATIONS

Extended European Search Report issued in European Application No. 23216382.4, mailed May 15, 2024, 11 pages.

* cited by examiner

*Primary Examiner* — Abdulkader M Alriyashi
(74) *Attorney, Agent, or Firm* — KDW Firm PLLC

(57) ABSTRACT

Techniques include a method, apparatus, system and computer-readable medium to detect, quantify and localize attacks to enhance security for time-synchronized networking. Embodiments include a diagnostic stream producer to produce diagnostic information providing evidence of a timing attack on a node of a time-synchronized network. Embodiments include a diagnostic stream consumer to consume diagnostic information, analyze the diagnostic information, and determine whether a node is under a timing attack. Other embodiments are described and claimed.

20 Claims, 41 Drawing Sheets

802.3 ETHERNET PACKET AND FRAME STRUCTURE

| LAYER | PREAMBLE 2902 | SF DELIMITER 2904 | MAC DEST 2906 | MAC SOURCE 2908 | 802.1Q TAG (OPT) 2910 | TYPE OR LENGTH 2912 | PAYLOAD 2914 | FCS (32-BIT CRC) 2916 | IPG 2918 |
|---|---|---|---|---|---|---|---|---|---|
| | 7 OCTETS | 1 OCTET | 6 OCTETS | 6 OCTETS | 4 OCTETS | 2 OCTETS | 45-1500 OCTETS | 4 OCTETS | 12 OCTETS |
| L2 ETHERNET FRAME | | | 64-1522 OCTETS | | | | | | |
| L1 ETHERNET FRAME + IPG | | | 72-1530 OCTETS | | | | | | 12 OCTETS |

FIG. 29

CROSS-NETWORK TIME-ALIGNMENT CHARACTERIZATION FOR SCHEDULED TRAFFIC

BACKGROUND

Many computing systems (e.g., autonomous systems, industrial systems, etc.) require real-time safety critical features. This often necessitates that timekeeping performance within the system has higher levels of security relative to other aspects of the system. For example, factories employ synchronized robots to accomplish coordinated tasks, often in the presence of human beings. In another example, robots utilize coordination to perform surgeries on humans. As yet another example, self-driving vehicles require synchronization of networked sensing elements to build a precise perception of the environment around the vehicle, including other vehicles, objects, hazards, and persons. Tools relied on to achieve the necessary time performance, synchronization, and bounded latency communication for such time sensitive systems to perform as needed is often referred to as time-synchronized networking.

In general, time-synchronized networking or time-sensitive networking defines a set of standards (and amendments) with the aim to enable time synchronization and deterministic data delivery in converged networks where time-critical (TC) traffic coexists with other types of traffic. Thus, there is a need to provide security for time-synchronized network devices to mitigate the risks associated with disruption in time-synchronized network operation from attacks on the timing of the network.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 29 illustrates an aspect of a packet and frame structure 2900 in accordance with one embodiment.

DETAILED DESCRIPTION

Figure 1A:
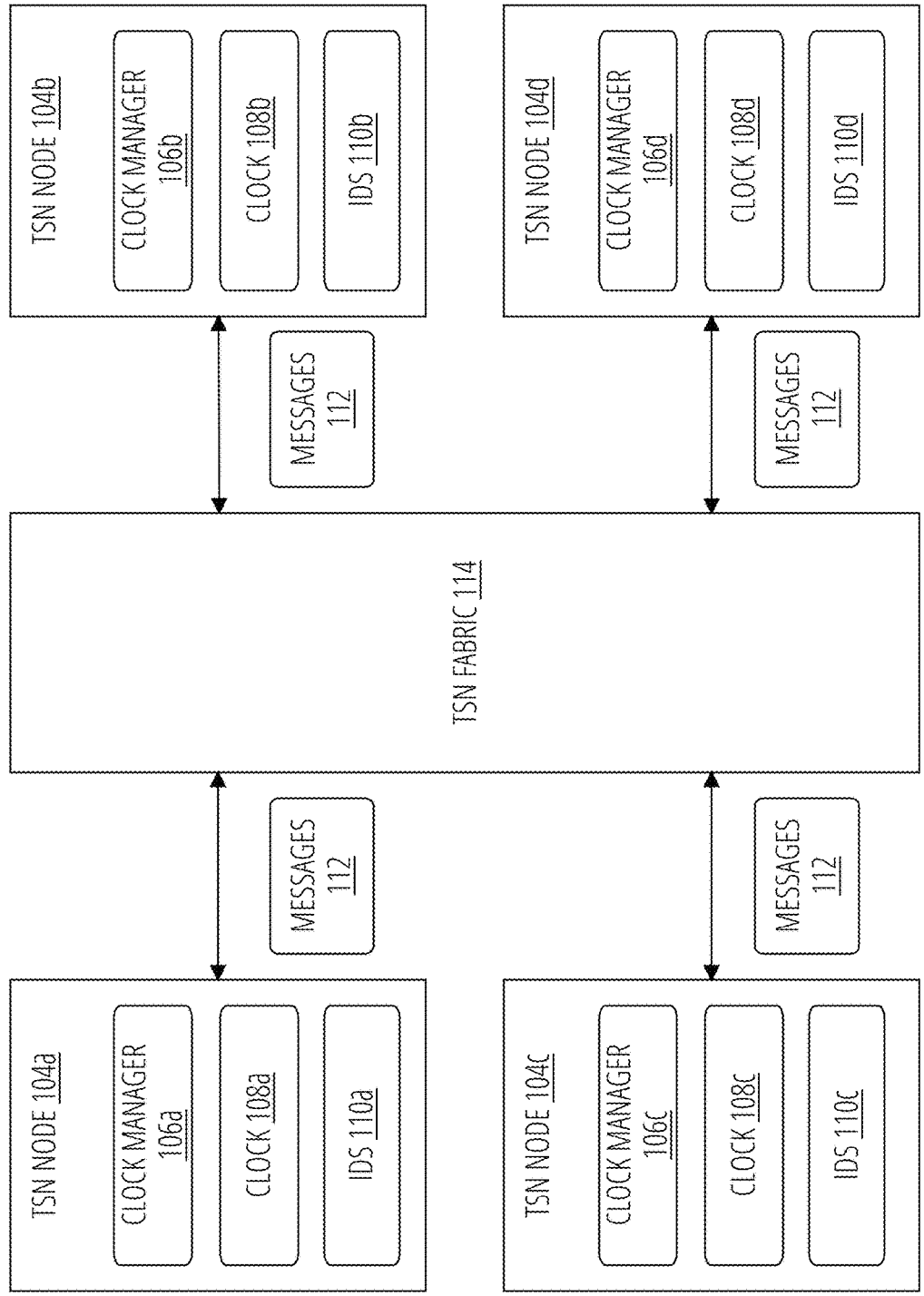
FIG. 1A illustrates an aspect of a time-synchronized network (TSN) 102 in accordance with one embodiment.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware (such as logic circuitry or more generally circuitry or circuit), software, firmware, or some combination thereof.

The present disclosure is generally directed to low-latency techniques to detect, quantify, and localize security attacks on time synchronization and traffic scheduling for systems operating on strict time requirements, such as systems based on time sensitive networks or time-synchronized networks (TSNs). Cyberattacks impacting time synchronization may cause network traffic schedules to misalign (e.g., such as those based on IEEE 802.1Qbv). To enhance the security and ultimately the reliability of system dependent on tight time synchronization, it is fundamental to detect, localize and quantify the amplitude of attacks in scheduled traffic. Embodiments implement a concept of an alignment check packet (ACP) and diagnostic streams in order to detect and quantify time misalignments due to malfunctions or attacks. Embodiments utilize the fact that a specific diagnostic schedule (e.g., an IEEE 802.1Qbv schedule) along with a diagnostic data stream induces anomalies to yield a unique pattern observed at the receiving end, enabling detection, quantification and localization of attacks. Specifically, time misalignments in the scheduled traffic will manifest as ACPs being delayed at the receiving end. The receiving end may implement a monitor to analyze such time misalignments to determine whether an anomaly or attack is ongoing. The number of ACPs determine the amount of misalignment happening in the time windows. The pattern of ACPs at the monitor reveals the location of the misalignment. With this capability, it is possible to have a fine-grained and constant monitoring of a system so that any interference caused by an attack is immediately characterized. This enables time-based networks such as a TSN to provide a much higher security level and quality of services than conventional solutions.

As noted, TSN defines a set of standards (and amendments) with the aim to enable time synchronization and deterministic data delivery in converged networks where time sensitive traffic coexists with other types of traffic. Various standards have been developed to address time-synchronized or time-sensitive communications. By way of example and not limitation, some standards for enabling time-synchronized communications include those promulgated by the Institute of Electrical and Electronics Engineers (IEEE) and/or the International Electrotechnical Commission (IEC). For example, IEEE 1588, IEEE 802.1AS, IEEE 802.1Qbv and IEC/IEEE 60802 provide systems and methods for synchronizing device clocks. In one example, IEEE 1588 defines a precision time protocol (PTP) for time synchronization across a network. In another example, IEEE 802.1AS defines a time-sensitive networking protocol referred to as a generic PTP (gPTP) for time synchronization across a network, where time sensitive devices (e.g., clock followers) synchronize to a leader clock (e.g., clock leader). In yet another example, IEEE 802.1Qbv defines time-sensitive networking for deterministic latency through traffic scheduling. In still another example, IEC/IEEE 60802 defines time-sensitive networking profiles for industrial automation. Other examples include a network time protocol (NTP) which is a networking protocol for clock synchronization between computer systems over packet-switched, variable-latency data networks, network time security (NTS) which is a secure version of NTP, and other time-synchronized network protocols. Embodiments are not limited to these examples.

Time synchronization in a TSN requires tight software-hardware interplay. A device (or node) in a TSN may implement a clock manager as a software component and a hardware clock as a hardware component. The clock manager adjusts timing for the hardware clock to ensure synchronization with a common network time for the TSN. In one embodiment, for example, a precision time protocol (PTP) hardware clock (PHC) is periodically adjusted by a PTP for Linux (PTP4L) software module to account for time offset between a clock leader and a clock follower in PTP-synchronized nodes. When a software component receives incorrect time information, such as a time offset bias within messages carrying time synchronization information, the software can misconfigure or mis-control hardware for the PHC, thereby leading to incorrect timekeeping. For instance, attackers located external to a TSN-capable platform along a network path can tamper with messages carrying time information to synchronize the hardware clock. Examples include malicious switches and/or relays tampering with time-related messages, or external attackers injecting messages into the network, which ends up impacting a time of the nodes downstream. Consequently, system and applications depending on TSN capabilities will consume incorrect time. Accordingly, early detection of a corrupted messages and/or software components for a TSN node is critical within a TSN.

One conventional solution to address this problem is to implement one or more Intrusion Detection Systems (IDSs) to monitor devices within a TSN to identify any abnormal behavior. An IDS implements software, firmware or hardware to support one or more specialized security functions, such as detecting malicious behavior caused by an attacker. The IDS may be implemented on a TSN node or separate from a TSN node. The IDS receives as input messages containing time information for synchronizing a clock of a TSN node with a network time for the TSN. The IDS analyzes the messages to detect anomalies, such as slight modifications to the time information to cause a TSN node to update an internal clock with a wrong network time. Incorrect time synchronization can cause disruptions in time sensitive applications executing on the TSN node, such as causing collisions between cooperative robotic arms or delaying braking in an autonomous vehicle. When the IDS detects abnormalities in messages carrying time information, the IDS generates an alert and takes action to isolate any affected TSN applications and/or TSN nodes from a compromised TSN node.

While deploying multiple IDSs throughout a TSN improves security for the TSN, each IDS tends to operate only on information analyzed by a given IDS. This presents a challenge of developing a comprehensive view of the TSN to recognize patterns, leverage information received from multiple IDSs, and localizing a source of a security attack (e.g., a specific node within the TSN). Further, building a comprehensive picture of the network by a central security server through querying individual IDSs causes an increase in network traffic and latency. Current solutions lack an efficient method to detect, quantify, and localize attacks in time synchronization and traffic scheduling in modern TSNs.

To solve these and other challenges in systems implementing time-synchronized networking operations, embodiments implement low-latency techniques to detect, quantify, and localize security attacks on time synchronization and traffic scheduling for systems operating on strict time requirements, such as TSNs. In general, as TSN nodes desynchronize, they will stop obeying the timing of their transmission windows. Receiving nodes start to receive packets arriving outside of the transmitter's transmit (TX) window. A monitor checks diagnostic packets received in a diagnostic stream and determines which/how many packets are delayed from assigned time windows. This enables the monitor to detect desynchronization and its amplitude as well as identify where it happened.

More particularly, a TSN typically implements some fundamental procedures (e.g., as defined by a standard) for all nodes operating within the TSN, such as time synchronization, traffic scheduling, packet format, reporting procedures, and so forth. For time synchronization, a clock leader has a clock that maintains a network time for a TSN. The clock leader periodically sends time information to clock followers. The clock followers use the time information to adjust local clocks and synchronize the local clocks to match the clock for the clock leader. This process is also followed by any intermediate nodes in the TSN, such as switches or relays. For traffic scheduling, a trusted entity such as a Central Network Controller (CNC) node distributes a traffic schedule to some or all of the TSN nodes in the TSN. Time-aware traffic shaping grants transmission windows to time-synchronized nodes. Each node has a specific transmission window with a pre-determined cycle and duration. The nodes communicate streams of data (e.g., in the form of messages, packets or frames) using the transmission windows. The data streams flow from "talker nodes" to "listener nodes."

Attackers may utilize various attack vectors to implement a timing attack on a TSN to desynchronize the TSN. For instance, an attacker may inject malicious software (malware) into a TSN node or fake data into a data stream communicated between TSN nodes. An attack may attempt to tamper with time synchronization procedures for the TSN, thereby causing network nodes such as clock followers and switches, to be desynchronized in relation to a clock leader. The desynchronization causes the network nodes to shift timing windows, due to clock drift, which impacts traffic scheduling. This deteriorates timing guarantees between talker nodes and listener nodes.

Various embodiments may utilize diagnostic information communicated between TSN nodes to detect misalignment of timing windows for the TSN nodes. A TSN node sends a specially-crafted set of packets in one or more diagnostic messages that collectively form a "diagnostic stream" towards a security monitor. The specially-crafted diagnostic packet may be referred to herein individually as an alignment-check packet (ACP) or collectively as a set of ACPs. The TSN node may communicate the diagnostic stream with the diagnostic messages using an in-band channel (e.g., interleaved within normal data streams using a priority scheme) of the TSN or an out-of-band channel (e.g., a dedicated diagnostic channel reserved only for diagnostic traffic) of the TSN. The monitor may be implemented in a distributed scheme among multiple TSN nodes within the TSN or a centralized scheme by a CNC node for the entire TSN. When a TSN node sends diagnostic information, it may be generally referred to herein as a "diagnostic stream producer." When a TSN node receives diagnostic information, it may be generally referred to herein as a "diagnostic stream consumer." In operation, one or more diagnostic stream producers may send a diagnostic stream of one or more diagnostic messages towards a diagnostic stream consumer. The diagnostic stream consumer may include a monitor that parses the diagnostic stream for diagnostic messages, analyzes any ACPs carried by the diagnostic messages, and determines whether a desynchronization event has occurred for a given TSN node based on results of the analysis.

In one embodiment, for example, a diagnostic stream consumer may be implemented, at least in part, by a computing apparatus that includes processor circuitry. The computing apparatus also includes a memory communicatively coupled to the processor circuitry, the memory to store instructions that when executed by the processor circuitry, causes the processor circuitry to execute a security monitor to receive a diagnostic stream in a time-synchronized network (TSN) by a diagnostic stream consumer of the TSN, the diagnostic stream to comprise a set of alignment-check packets (ACPs) for a diagnostic stream producer, the set of ACPs to include a reference ACP. The security monitor receives a first subset of ACPs from the set of ACPs in a first time window, and a second subset of ACPs from the set of ACPs in a second time window. The second subset of ACPs include at least the reference ACP. The security monitor determines an amount of desynchronization time for the diagnostic message based on a number of ACPs in the second subset of ACPs and a defined size for each ACP in the number of ACPs. The processor circuitry generates a security alert when the desynchronization time exceeds a defined threshold. Other embodiments are described and claimed.

In one embodiment, for example, a diagnostic stream producer may be implemented, at least in part, by a computing apparatus that includes processor circuitry. The computing apparatus also includes a memory communicatively coupled to the processor circuitry, the memory to store instructions that when executed by the processor circuitry, causes the processor circuitry to prepare a data stream for transmission from a diagnostic stream producer to a diagnostic stream consumer within a time window assigned to the diagnostic stream producer in a time-synchronized network (TSN). The processor circuitry may determine a set of alignment-check packets (ACPs) associated with the diagnostic stream producer that can be sent within a scheduled time window, each ACP of the set of ACPs having a defined size, generating one or more ACPs for the set of ACPs, each ACP to include diagnostic information associated with the diagnostic stream producer, the diagnostic information to comprise a node identifier for the diagnostic stream producer, an ACP sequence number, and an authentication code for the diagnostic stream producer. The processor circuitry may send a diagnostic message with the set of ACPs from the diagnostic stream producer to the diagnostic stream consumer within the time window assigned to the diagnostic stream producer. Other embodiments are described and claimed.

The use of ACPs (both in-band and out-of-band) significantly reduces an amount of latency, overhead, and device and network resources (e.g., memory, compute, bandwidth, etc.) associated with security schemes to protect a TSN. As a result, embodiments may provide faster and more accurate detection, quantification, and localization of security events occurring in real-time within an apparatus, device or network associated with a TSN. It may be appreciated that other technical advantages exist as well, as will become apparent in the figures, description and claims discussed herein.

FIG. 1A depicts an exemplary time-synchronized network (TSN) 102 implemented according to a TSN standard (e.g., IEEE 1588, IEEE 802.1AS, IEEE 802.1Qbv, or the like). As depicted, TSN 102 includes various TSN nodes 104, such as TSN nodes 104a-d. The TSN nodes 104 may be implemented as different types of nodes for a TSN, such as an origination node, relay node, switch node, end node, talker node, listener node, diagnostic stream producer, diagnostic stream consumer, and so forth. The TSN nodes 104a-d are communicatively coupled via a TSN fabric 114. The TSN fabric 114 can connect the TSN nodes 104a-d using various types of network topology (e.g., mesh, star, etc.) and various types of communications channels (e.g., wired, wireless, fiber optic, buses, etc.). It is noted that the number of nodes in the TSN 102 is selected for purposes of clarity and not limitation. In practice, the TSN 102 can include any number and combination of nodes (e.g., origination nodes, switches, relay nodes, end devices, etc.).

The TSN nodes 104 can communicate with each other via the TSN fabric 114. For instance, the TSN nodes 104 can send messages 112 to each other over one or more communication channels provided by the TSN fabric 114. The messages 112 can include control information and payload information. One type of control information may include time information. The time information may comprise synchronization messages, time update messages or time follow-up messages (among other time protocol messages) for a time protocol used by the TSN 102.

Each TSN node 104 in the TSN 102 includes various hardware and/or software components. As depicted in FIG. 1A, a TSN 104 includes a clock manager 106, a clock 108 and an intrusion detection system (IDS) 110 (referred to herein as an "IDS" or "detector"). For instance, the TSN node 104a includes a clock manager 106a, a clock 108a and an IDS 110a. The TSN node 104b includes a clock manager 106b, a clock 108b and an IDS 110b. The TSN nodes 104c, 104d are similarly configured. It may be appreciated that these are just a few components for a TSN 104, and the TSN 104 can include other standard components for an electronic device, such as network interfaces, radio transceivers, input/output (I/O) components, memory units, processing circuits, controllers, sensors, actuators, mechanical parts, application software, operating system software, TSN-enabled platforms, and so forth.

In various embodiments, the clock manager 106 is implemented as a software component, and the clock 108 is implemented as a hardware component (e.g., "hardware clock" or "clock circuitry"). The IDS 110 can be implemented as a software component, a hardware component, or a combination of both software and hardware components. Embodiments are not limited in this context.

The clock manager 106 generally manages a time (e.g., clock signals) generated by the clock 108. A key component in clock synchronization mechanisms is the clock manager software. In a time-synchronized network such as the TSN 102, this component tightly interacts with network hardware (e.g., Ethernet/Wi-Fi) to obtain Precision Time Protocol (PTP) message timestamps, as well as with PTP clock hardware to implement suitable phase/frequency corrections in order to synchronize with a clock leader. The clock manager 106 typically implements a "clock servo." A clock servo is a control algorithm that periodically takes as input some measurement (or estimate) of clock offset to a reference clock, and computes as output either time (e.g., phase) or frequency adjustment to compensate for the given offset.

The clock 108 is generally a hardware clock that implements clock circuitry to generate signals for digital electronics implemented by the TSN node 104. In electronics and especially synchronous digital circuits, a clock signal oscillates between a high and a low state and is used to coordinate actions of the digital circuits. A clock signal is produced by a clock generator. Although more complex arrangements are used, the most common clock signal is in the form of a square wave with a 50% duty cycle, usually with a fixed, constant frequency. Circuits using the clock signal for synchronization may become active at either the rising edge, falling edge, or, in the case of double data rate, both in the rising and in the falling edges of the clock cycle. The clock 108 generates clock signals under control of the clock manager 106. The clock 108 can be implemented using any suitable hardware having a timing accuracy required by a given device or network. In the TSN 102, the clock 108 can be implemented as a PHC, although other hardware clocks can be implemented as well. Embodiments are not limited in this context.

In normal operation, a network interface (not shown) for a TSN node 104 can receive messages 112 that include time information representative of a network time for the TSN 102. The clock manager 106 can receive the time information from the network interface, analyze the time information, and determine whether time adjustments are needed for the clock 108. When time adjustments are needed, the clock manager 106 generates control information and sends the control information to the clock 108. The clock 108 receives the clock manager control information, and adjusts a parameter for the clock 108, such as a phase or frequency for the clock signals generated by the clock 108.

The IDS 110 generally monitors the clock manager 106 to detect abnormal or malicious behavior of the TSN 102. In general, the IDS 110 is a device or software application that monitors a device, network or systems for malicious activity or policy violations. The IDS 110 may be specifically tuned to detect a timing attack, such as a desynchronization attack, or other TSN specific attack vector. Any intrusion activity or violation is typically reported either to other devices in the same network, an administrator, and/or collected centrally using a security information and event management (SIEM) system. A SIEM system combines outputs from multiple sources and uses alarm filtering techniques to distinguish malicious activity from false alarms. In addition to the TSN node 104, the IDS 110 may be implemented for other devices in the TSN, such as relay nodes 104a-104c, to provide a more comprehensive security solution against attacks.

The IDS 110 can operate in an on-line or off-line mode. When operating in an on-line mode, the IDS 110 examines network traffic in real time. It performs an analysis of passing traffic on the entire subnet, and matches the traffic that is passed on the subnets to the library of known attacks. For instance, it analyses the message 310 (e.g., a TSN timing message) and applies some rules, to decide if it is an attack or not. Off-line mode typically deals with stored data and passes it through some processes to decide if it is an attack or not. For the offline case, a message may be replicated for offline analysis. It may be replicated in hardware without incurring a memory copy. However, a software solution may copy the message from the queue for later analysis. In either mode, once an attack is identified, or abnormal behavior is sensed, an alert can be sent to a SIEM, a network administrator, or a software application to automatically implement security protocols, such as dropping the message 112, isolating an infected device guarded by the IDS 110, and/or re-configuring one or more network paths for impacted devices in the TSN network.

The IDS 110 can utilize any number of different methods to detect an attack. For instance, the IDS 110 may implement a signature-based method, a statistical anomaly-based method, a stateful protocol analysis method, machine-learning based, or some combination of all four methods. A signature-based IDS monitors packets in the network and compares with pre-configured and pre-determined attack patterns known as signatures. A statistical anomaly-based or machine-learning based IDS monitors network traffic and compares it against an established baseline. The baseline will identify what is "normal" for that network, such as what sort of bandwidth is generally used and what protocols are used. A stateful protocol analysis IDS identifies deviations of protocol states by comparing observed events with defined profiles of generally accepted definitions of benign activity. It will be appreciated that these detection methods are by way of example and not limitation. Other embodiments may use different detection methods as well. The embodiments are not limited in this respect.

Figure 1B:
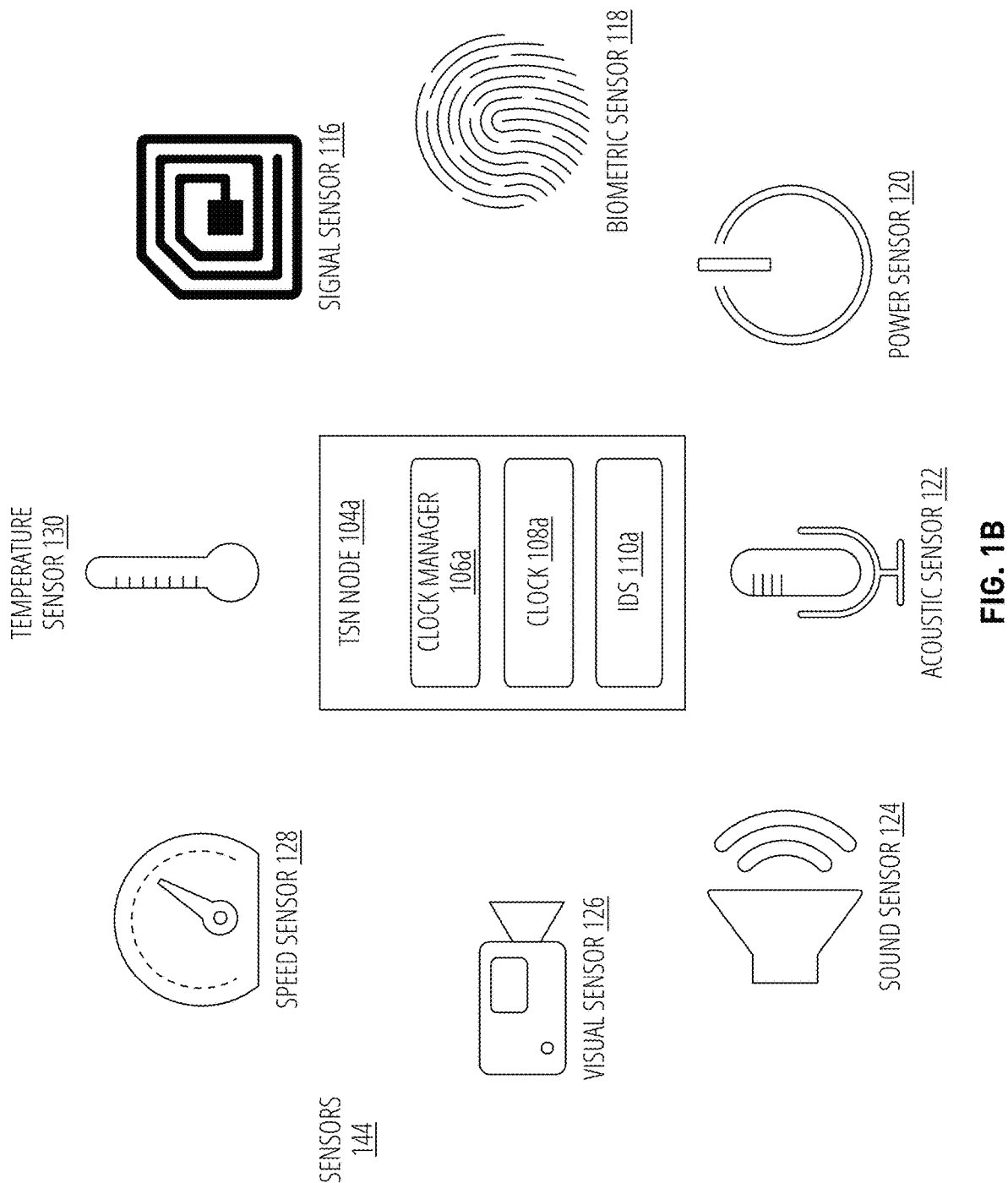
FIG. 1B illustrates an aspect of a TSN 102 for sensors in accordance with one embodiment.

FIG. 1B illustrates an example of a TSN node 104a of the TSN 102 designed to control one or more sensors 144. As depicted in FIG. 1B, the TSN node 104 manages various types of sensors 144, such as a signal sensor 116, a biometric sensor 118, a power sensor 120, an acoustic sensor 122, a sound sensor 124, a visual sensor 126, a speed sensor 128, a temperature sensor 130, and so forth. The TSN node 104a may be suitable for implementing a physics-based model for the IDS 110. A physics-based approach as proposed herein utilizes state prediction based on physical models of system dynamics. Unlike conventional information-based security measures, the physics-based model may utilize physical properties of a system, along with controller state estimation, to enable computationally-inexpensive analytical redundancy. For example, a mathematical model-based replica of the system is simultaneously executed to detect attacks.

Figure 1C:
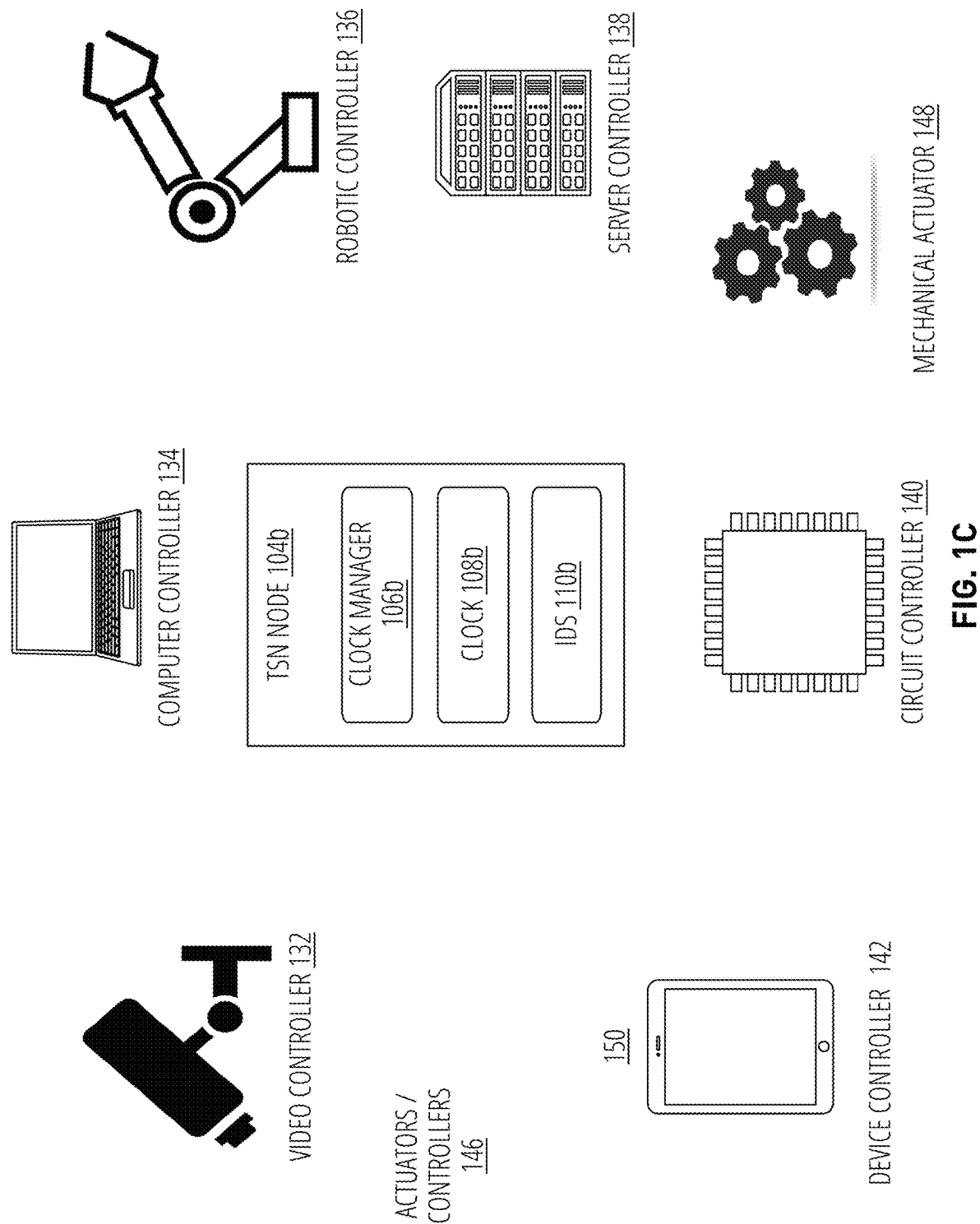
FIG. 1C illustrates an aspect of a TSN 102 for actuators in accordance with one embodiment.

FIG. 1C illustrates an example of a TSN node 104b of the TSN 102 designed to control one or more actuators and/or host controllers 146. As depicted in FIG. 1C, the TSN node 104b manages various types of actuators/controllers 146, such as a robotic controller 136, a server controller 138, a mechanical actuator 148, a circuit controller 140, a device controller 142, a video controller 132, a computer controller 134, and so forth. As with FIG. 1B, the TSN node 104b shown in FIG. 1C may be suitable for implementing a physics-based model for the IDS 110, as discussed in more detail herein.

In time-synchronized networks, such as the TSN 102 depicted in FIGS. 1A-1C, it becomes important for all the TSN nodes 104 to synchronize to a common or shared network time for the TSN 102. For instance, the TSN nodes 104 may operate in accordance with IEEE 802.1AS which implements a hierarchical network to synchronize one or more clock follower (CF) nodes to a clock leader (CL) node (e.g., a grand CL) through relay nodes or switch nodes. Synchronization is performed through communication of time messages, such as the messages 112. The time messages may comprise, for example, time synchronization messages, time update messages and/or time follow-up messages for a PTP.

In some cases, an attacker may simply attempt to disrupt timing of a single TSN node 104 handling critical functions, such as disrupting one or both of the TSN node 104a managing the sensors 144 and/or the TSN node 104b managing the actuators/controllers 146. Rather than attempting to disrupt timing for the entire TSN 102, the attacker may attempt to attack timing of a single TSN node 104 to disrupt key operations for the TSN node 104, such as an electronic control unit (ECU) to control speed sensing for a vehicle or a controller for a robotic arm in a factory.

In other cases, an attacker may attempt to disrupt timing across the entire TSN 102. To attack or disrupt the TSN 102, an attacker may attempt a timing attack or desynchronization attack to compromise timing for one or more of the TSN nodes 104 in the TSN 102. Assume the TSN node 104c operates as a clock leader (CL) in the TSN 102, and the TSN node 104d operates as a clock follower (CF) in the TSN 102. If an attacker located on a network device (e.g., switch or relay) modifies a critical attribute on a specific port, then all downstream nodes from that network device may suffer a desynchronization event. In this example, if the attacker successfully compromises the TSN node 104c, then the TSN node 104d is vulnerable to a timing attack in the form of receiving messages 112 from the TSN node 104c with erroneous time information. Therefore, it becomes important to detect and localize an attack as quickly as possible. Furthermore, upon detection, it becomes important for the TSN 102 to quickly isolate the compromised network device and thereby prevent the desynchronization attack from spreading to other downstream nodes.

In all cases, a time-synchronized network such as the TSN 102 is vulnerable to a timing attack or a desynchronization attack. If a single network node is compromised, it may cause a cascade failure across the entire TSN 102. An example of such an attack is further described with reference to FIGS. 2A, 2B, 3A and 3B.

Figure 2A:
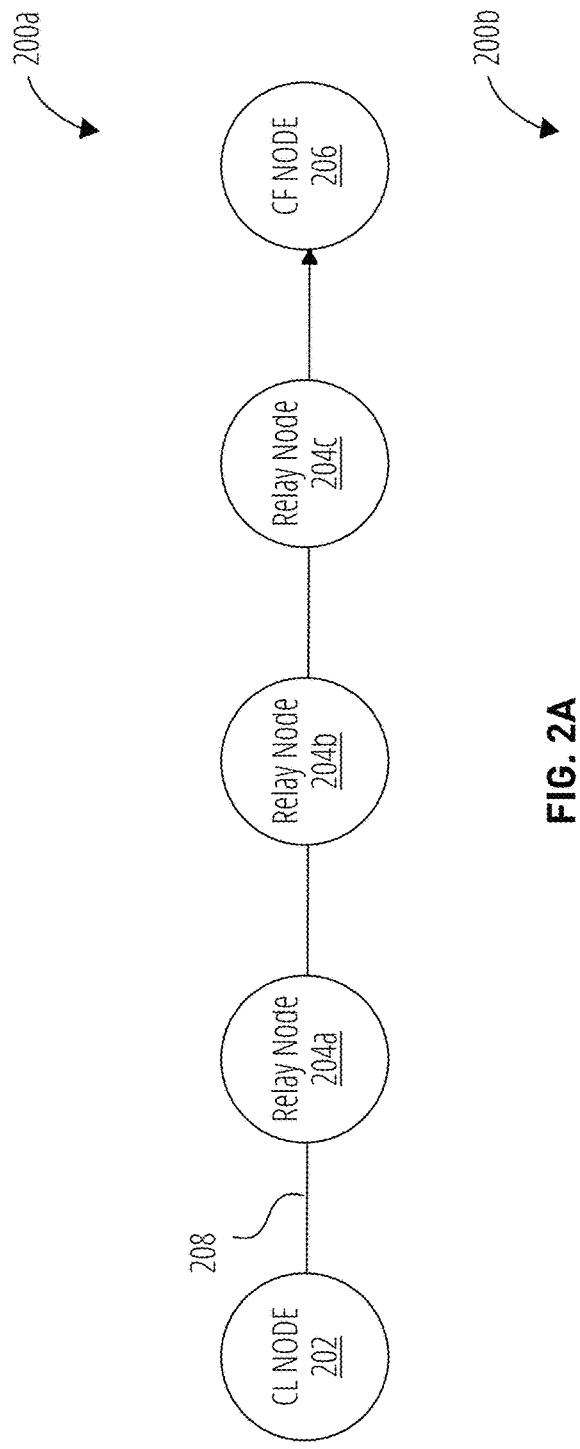
FIG. 2A illustrates an aspect of a TSN 200a in accordance with one embodiment.

FIG. 2A depicts a TSN 200a implemented according to a TSN standard (e.g., IEEE 1588, IEEE 802.1AS, IEEE 802.1Qbv, or the like). As depicted, the TSN 200a includes clock leader node 202, relay nodes 204a, 204b, and 204c, and clock follower node 206, all communicatively coupled via communication channel 208. The clock leader node 202 and the clock follower node 206 have a "master/slave" relationship, where the clock leader node 202 is treated as a "master" device and the clock follower node 206 is treated as a "slave" device. The clock leader node 202 includes a clock that maintains a network time for the TSN 102. The clock follower node 206 includes a clock that synchronizes a clock to the network time via one or more of the messages 112. Alternatively, nodes of the network may be implemented as a "talker node" and a "listener node", respectively. This configuration refers to data transmission, where the talker node transmits data and the listener node listens or receives data. This configuration is used, for example, in scheduled traffic.

Relay nodes 204a, 204b, and 204c are time-aware switching nodes and can be any number of devices in a network arranged to communicate information. A clock leader node 202 sends or originates information and a clock follower node 206 receives or consumes information. Examples of a clock leader node 202 or a clock follower node 206 include devices such as electronic control units in an autonomous vehicle, an industrial system, a medical system, or the like. Additionally, communication channel 208 can be any of a variety of communication channels, including wired or wireless communication channels. In some implementations, all devices in the TSN 200a will receive gate control list (GCL) tables. However, in some implementations, only clock leader nodes 202 and switching nodes (e.g., relay node 204a, etc.) receive GCL tables while destination devices (e.g., clock follower node 206) do not receive a GCL table.

Figure 2B:
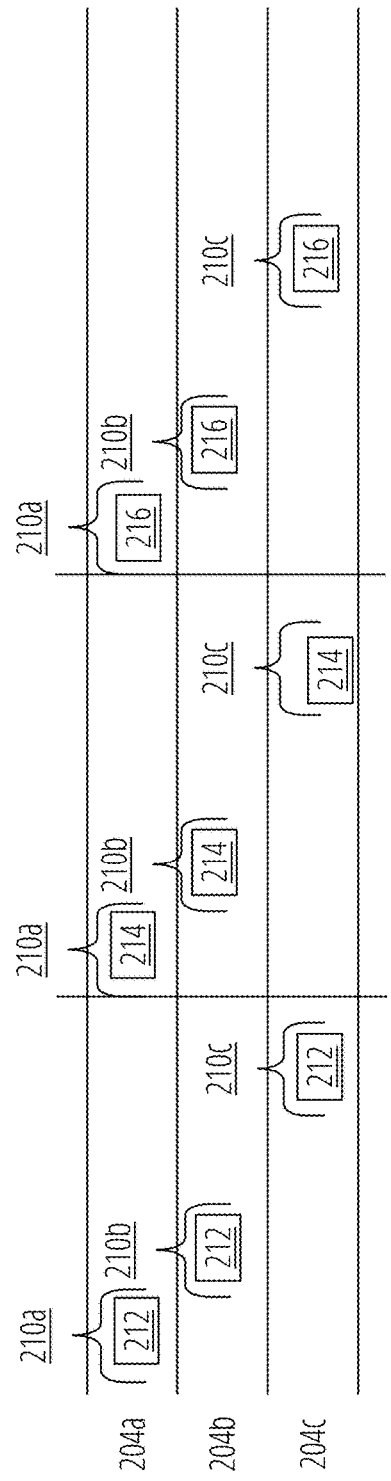
FIG. 2B illustrates an aspect of a timing diagram 200b in accordance with one embodiment.

FIG. 2B depicts a timing diagram 200b depicting communication windows (e.g., Qbv windows, or the like) for switches of TSN 200a based on GCL tables. Typically, GCL tables are generated in a network controller (not shown) and are designed to prioritize time critical (TC) traffic and prevent lower priority traffic from accessing communication channel 208, thus guaranteeing the timely delivery of TC packets within pre-configured time windows. In particular, timing diagram 200*b* depicts Qbv windows 210*a*, 210*b*, and 210*c* in which packets 212, 214, and 216 are transmitted. It is noted that the communication windows referred to herein are referred to as Qbv windows or protected windows for clarity. However, other standard or techniques for forming protected communication windows to facilitate time synchronization can be used besides Qbv windows. Examples are not limited in this context.

To facilitate transmission of packets (e.g., packet 212, etc.) during protected windows (e.g., Qbv window 210*a*, etc.), nodes in the TSN 200*a* are time synchronized and scheduled to transmit TC packets (e.g., packet 212, etc.) using non overlapping protected windows (e.g., Qbv window 210*a*, etc.). It is to be appreciated that providing latency bounded communication (e.g., as depicted in timing diagram 200*b*) requires tight synchronization of time between nodes in TSN 200*a*. With such dependency on time synchronization, reliable TSN operation can be disrupted by attacking the timing of the network, sometimes referred to as a desynchronization attack or event.

Figure 3A:
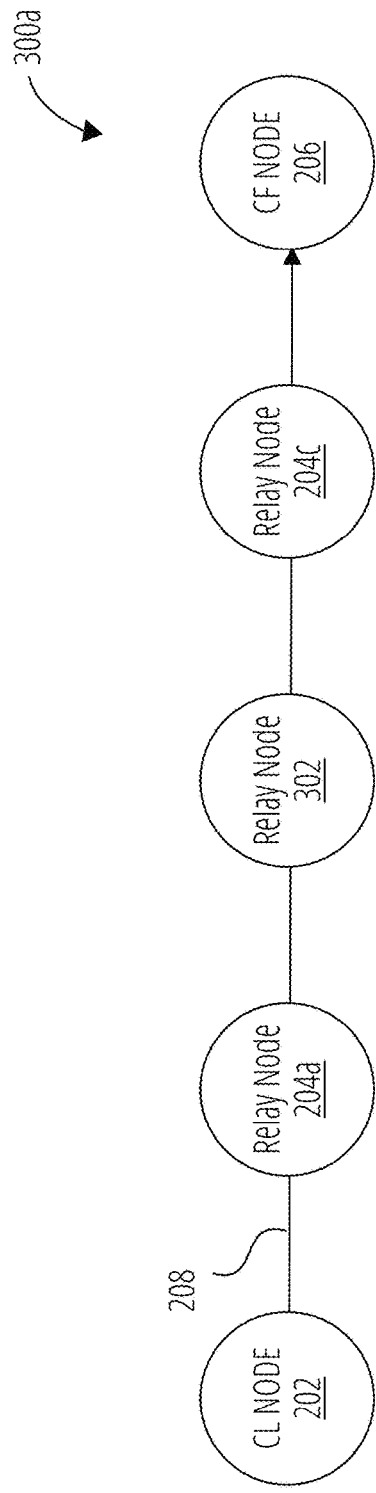
FIG. 3A illustrates an aspect of a TSN 300a in accordance with one embodiment.

FIG. 3A depicts a TSN 300*a*, which is like TSN 200*a* except that the relay node 302 is depicted as compromised. In particular, the clock (not shown) of relay node 302 can be attacked and compromised, thereby causing the Qbv window 210*b* associated with relay node 302 to be misaligned with respect to, and even overlap with, the protected windows of the other switch nodes in the data stream path (e.g., along communication channel 208).

Figure 3B:
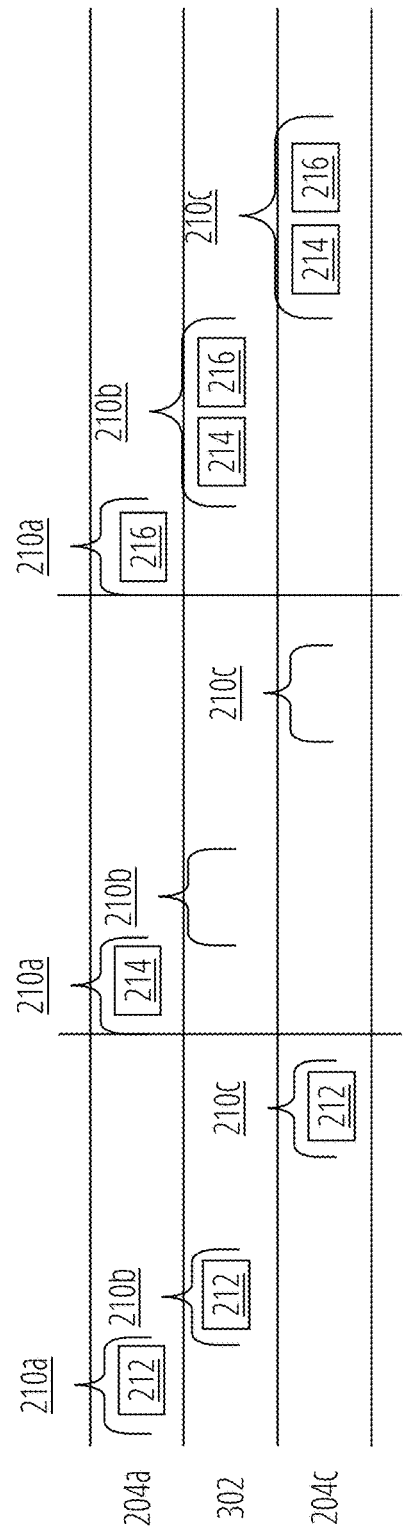
FIG. 3B illustrates an aspect of a timing diagram 300b in accordance with one embodiment.
Figure 4:
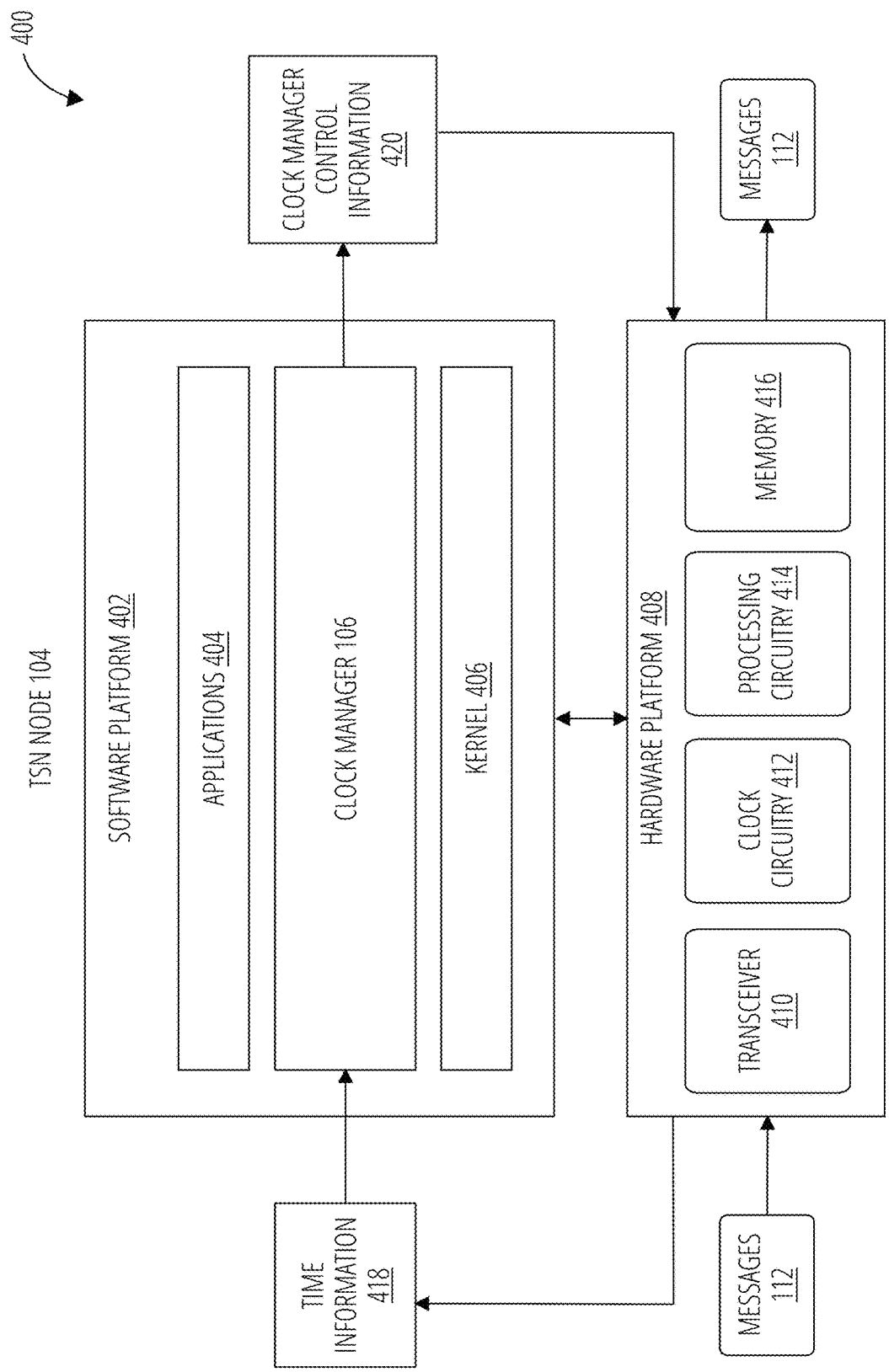
FIG. 4 illustrates an aspect of an apparatus 400 in accordance with one embodiment.

FIG. 3B depicts timing diagram 300*b* illustrating Qbv window 210*b* misaligned with Qbv window 210*a* and Qbv window 210*c* and overlapping with Qbv window 210*a*. As such, packets (e.g., packet 214 in the figure) arrive too late with respect to the attacked switch protected window (e.g., Qbv window 210*b*) causing them to be buffered and sent in the next protected window, or alternatively, dropped completely. As a result of the delay in transmitting packet 214, relay node 302 breaks the latency bound of the stream that it is serving and can result in errors or comprise the safety of the system in which the nodes are operating FIG. 4 illustrates a more detailed view of a TSN node 104 that implements one or more TSN protocols or standards. The TSN node 104 may be implemented as any network devices suitable for operation within a TSN, such as TSN 102, 200*a*, 300*a*, and so forth. The TSN node 104 may be implemented as part of a vehicle, robot, industrial machine or any other devices suitable for a TSN. The TSN node 104 may be implemented as an origination node 202, relay nodes 204*a*-204*c*, relay node 302 and/or end node 206. The TSN node 104 may be implemented as either a clock leader (CL) or a clock follower (CF) in a TSN. The TSN node 104 may include interfaces to communicate information with other TSN nodes 104 in the TSN 102, such as messages 112, for example.

The TSN node 104 may operate in accordance with a timing protocol, such as a precision time protocol (PTP) for IEEE 1588, IEEE 802.1AS, and so forth. For instance, the TSN node 104 may operate in accordance with IEEE 802.1AS which implements a hierarchical network to synchronize clock followers (CFs) to a clock leader (CL) through relays or switch nodes. Synchronization is performed through communication of time messages, such as the messages 112. The time messages may comprise, for example, time synchronization messages, time update messages or time follow-up messages (among others) for a PTP. The time messages may include, among other fields and attributes, a correction field, which accumulates a network residence, and an origin timestamp for a CL. The time message may also comprise, for example, a packet delay message type with additional fields and attributes.

As depicted in FIG. 4, the TSN device 104 may include a software platform 402 and a hardware platform 408. The software platform 402 may include, among other software components, one or more applications 404, a clock manager 106, and a kernel 406. The hardware platform 408 may include, among other hardware components, a network interface such as a transceiver 410, clock circuitry 412, processing circuitry 414 and memory 416.

The processing circuitry 414 may include circuitry or processor logic, such as, for example, any of a variety of commercial processors. In some examples, the processing circuitry 414 may include multiple processors, a multi-threaded processor, a multi-core processor (whether the multiple cores coexist on the same or separate dies), and/or a multi-processor architecture of some other variety by which multiple physically separate processors are in some way linked. Additionally, in some examples, the processing circuitry 414 may include graphics processing portions and may include dedicated memory, multiple-threaded processing and/or some other parallel processing capability. In some examples, the processing circuitry 414 may be an application specific integrated circuit (ASIC) or a field programmable integrated circuit (FPGA). In some examples, the processing circuitry 414 may be circuitry arranged to perform computations related to TSN, such as switching, clock leader, clock follower, routing, security, and so forth.

The memory 416 may include logic, a portion of which includes arrays of integrated circuits, forming non-volatile memory to persistently store data or a combination of non-volatile memory and volatile memory. It is to be appreciated, that the memory 416 may be based on any of a variety of technologies. In particular, the arrays of integrated circuits included in memory 406 may be arranged to form one or more types of memory, such as, for example, dynamic random access memory (DRAM), NAND memory, NOR memory, or the like.

The transceiver 410 may include logic and/or features to support a communication interface. For example, the transceiver 410 may include one or more interfaces that operate according to various communication protocols or standards to communicate over direct or network communication links. Direct communications may occur via use of communication protocols or standards described in one or more industry standards (including progenies and variants). For example, the transceiver 410 may facilitate communication over a bus, such as, for example, peripheral component interconnect express (PCIe), non-volatile memory express (NVMe), universal serial bus (USB), system management bus (SMBus), SAS (e.g., serial attached small computer system interface (SCSI)) interfaces, serial AT attachment (SATA) interfaces, or the like. In some examples, transceiver 410 may be arranged to support wireless communication protocols or standards, such as, for example, Wi-Fi, Bluetooth, ZigBee, LTE, 5G, or the like.

The TSN node 104 may also include where the network is a controller area network (CAN) or a vehicle area network (VAN). The TSN node 104 may be implemented as a device that manages a sensor, actuator or a controller. The sensors may comprise a speed sensor, a direction sensor, a global positioning system (GPS) sensor, a gas pedal sensor, a brake pedal sensor, a positioning sensor, an object detection sensor, a lane detection sensor, a radar sensor, a light detection and ranging (LIDAR) sensor, an ultrasound sensor, an inertial measurement unit (IMU) sensor, a temperature sensor, a pressure sensor, an altitude sensor, an acoustic sensor, and so forth.

In one aspect, the TSN node 104 may be implemented as a CL or CF for the TSN 102. As previously discussed, the clock manager 106 may ensure that the clock circuitry 412 maintains a network time for the TSN 102. When operating in a CL role, the clock manager 106 may send a message 112 with time information 418 representing a current network time to one or more nodes operating in a CF role for the TSN 102. When operating in a CF role, the clock manager 106 may receive a message 112 from a CL node. The clock manager 106 may use the time information 418 from the message 112 to synchronize a local device time with the current network time maintained by the clock circuitry 412. The clock manager 106 analyzes the time information 418, and determines whether to adjust a parameter (e.g., phase or frequency) of the clock circuitry 412 to synchronize the clock circuitry 412 to the current network time.

Figure 5:
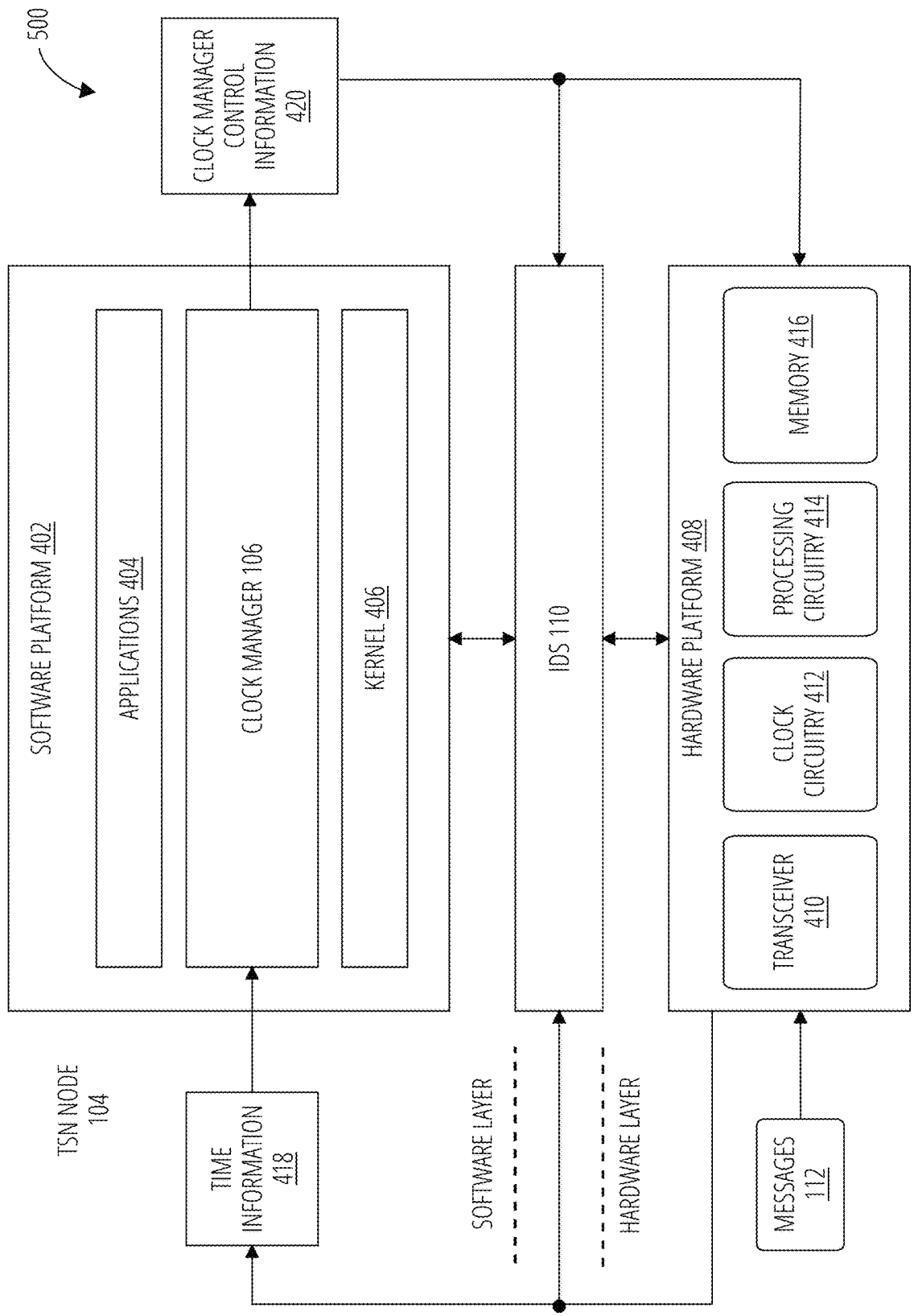
FIG. 5 illustrates an aspect of an apparatus 500 in accordance with one embodiment.

FIG. 5 illustrates an apparatus 500. Similar to the apparatus 400, the apparatus 500 includes a software platform 402 and a hardware platform 408. In addition, the apparatus 500 includes an IDS 110 to monitor a clock manager 106 of the software platform 402. As previously discussed, the IDS 110 generally monitors the clock manager 106 to detect abnormal or malicious behavior of the clock manager 106. More particularly, the IDS 110 monitors the inputs and/or outputs of the clock manager 106, such as consuming the time information 418 sent from the transceiver 410 to the clock manager 106 as input, and the clock manager control information 420 sent from the clock manager 106 to the clock circuitry 412 as output.

As depicted in FIG. 5, the apparatus 500 includes a clock circuitry 412 to implement a hardware clock (e.g., a PHC) for a device, such as a TSN node 104. The apparatus 500 includes a processing circuitry 414 coupled to the clock circuitry 412, the processing circuitry 414 to execute instructions to perform operations for a clock manager 106. The clock manager 106 is operative to receive messages 112 with time information 418 for a network, such as TSN 102. The clock manager 106 generates clock manager control information 420 to adjust the clock circuitry 412 to a network time for the TSN 102. The clock manager control information 420 may comprise one or more parameters to adjust the clock circuitry 412 for the apparatus 500. The one or more parameters may represent, for example, adjustments to a phase or frequency of the clock circuitry 412. For example, the clock manager control information 420 may comprise a phase or frequency adjustment based on a time offset between a reference time and a time maintained by the clock circuitry 412. The reference time is based on the time information 418 in at least one message 112.

The apparatus 500 further includes an IDS 110 coupled to the processing circuitry 414 and the clock circuitry 412. In one embodiment, the IDS 110 may be implemented as part of a software layer for the apparatus 500, such as the software platform 402. In another embodiment, the IDS 110 may be implemented as part of a hardware layer for the apparatus 500, such as the hardware platform 408. In yet another embodiment, certain elements of the IDS 110 may be implemented in the software platform 402, while other elements of the IDS 110 may be implemented in the hardware platform 408. Embodiments are not limited in this context.

Although FIG. 5 depicts the IDS 110 implemented as part of the apparatus 500, it may be appreciated that the IDS 110 may be implemented by another apparatus, device or system communicatively coupled to the apparatus 500. For instance, the IDS 110 may be implemented as part of an IDS for the apparatus 500 that is separate from the apparatus 500 or a device other than a device that implements the apparatus 500. For instance, if the apparatus 500 is implemented by a TSN node 104a, the IDS 110 of the apparatus 500 could optionally be implemented in a TSN node 104b. The IDS 110 could also be implemented by an IDS communicatively coupled to the TSN node 104, either directly via a wired or wireless connection, or indirectly via the TSN fabric 114. Embodiments are not limited in this context.

The IDS 110 is operative to consume multiple types of information to detect a security attack. For instance, the IDS 110 can receive and analyze messages 112 for a TSN node implementing the software platform 402 and/or the hardware platform 408. The messages 112 may carry time information for a TSN node, such as an origin time, resident time, link delays, among other types of clock information. The messages 112 may comprise, for example, synchronization messages or "FollowUp" messages. The TSN node retrieves or decodes the time information from the messages 112, and utilize the time information to synchronize an internal local clock with a network time issued by a clock leader or grand clock leader. The IDS 110 can also receive and analyze other types of information, such as clock manager control information 420 in transit from the clock manager 106 of the software platform 402 and the hardware platform 408. For instance, the IDS 110 can consume software control messages, or it can have one or more taps on a hardware bus or signal lines used to communicate electrical signals to the hardware platform 408. The IDS 110 analyzes the messages 112 and/or other types of information, and determines whether to generate an alert or take corrective action for the apparatus 500 based on results of the analysis.

The messages 112 are communicated between TSN nodes at a certain frequency or rate which can be measured in a number of messages sent or received per unit of time, such as a number of messages sent per second. This is referred to herein as a "message frequency." The message frequency for transmission of the messages 112, which carry origin time (Sync/FollowUp) and link delay computation (LDC), is typically dependent on the latency requirements of a time-sensitive application. The message frequency is usually calculated during a design phase for a TSN, considering a variety of factors, and instantiated during initialization of a TSN or individual TSN nodes.

Cybersecurity is increasingly becoming a critical or core function within a TSN. Numerous security devices, such as the IDS 110, are deployed throughout a TSN 102. Each deployed IDS 110 monitors a TSN node 104 or group of TSN nodes 104, receiving the messages 112 and analyzing the messages 112 for anomalies or abnormalities indicative of a security attack. Despite increasing security of a TSN, however, the multitude of IDS 110 typically cannot communicate with each other, or a centralized security system such as a SIEM, without introducing a significant amount of network traffic communicated by the TSN. As a result, each IDS 110 is limited to security analysis and inferencing operations based on only the network traffic available to the IDS 110. Consequently, an individual IDS 110 does not have a comprehensive view of the entire TSN 102.

To solve these and other challenges in systems implementing time-synchronized networking operations, embodiments implement low-latency techniques to detect, quantify, and localize security attacks on time synchronization and traffic scheduling for systems operating on strict time requirements, such as TSNs. Various embodiments may utilize diagnostic information communicated between TSN nodes to detect misalignment of timing windows for the TSN nodes. A TSN node sends a specially-crafted set of packets in one or more diagnostic messages that collectively form a "diagnostic stream" towards a monitor. The specially-crafted set of packets may be referred to herein individually as an alignment-check packet (ACP) or collectively as a set of ACPs. The TSN node may communicate the diagnostic stream with the diagnostic messages using an in-band channel (e.g., interleaved within normal data streams using a priority scheme) of the TSN or an out-of-band channel (e.g., a dedicated diagnostic channel reserved only for diagnostic traffic) of the TSN. The monitor may be implemented in a distributed schemed among multiple TSN nodes within the TSN or a centralized scheme by a CNC node for the entire TSN. When a TSN node sends diagnostic information, it may be generally referred to herein as a "diagnostic stream producer." When a TSN node receives diagnostic information, it may be generally referred to herein as a "diagnostic stream consumer." In operation, one or more diagnostic stream producers may send a diagnostic stream of one or more diagnostic messages towards a diagnostic stream consumer. The diagnostic stream consumer may include a monitor that parses the diagnostic stream for diagnostic messages, analyzes any ACPs carried by the diagnostic messages, and determine whether a desynchronization event has occurred for a given TSN node based on results of the analysis. A more detailed description for an exemplary diagnostic stream producer and a diagnostic stream consumer is discussed below.

Figure 6A:
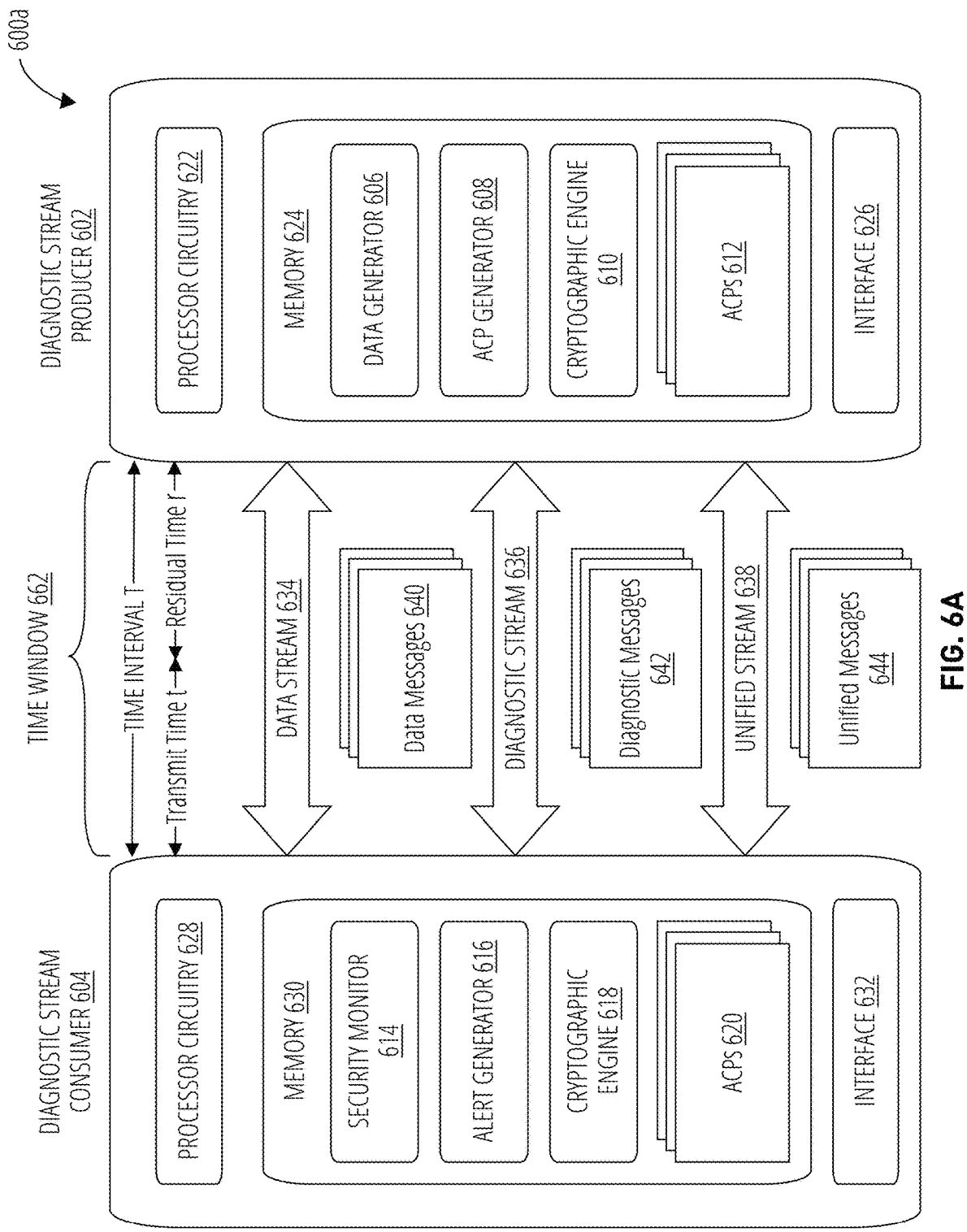
FIG. 6A illustrates an aspect of a system 600a in accordance with one embodiment.

FIG. 6A illustrates a system 600a suitable for a TSN, such as the TSN 102, for example. As depicted in FIG. 6A, the system 600a may include a diagnostic stream producer 602 and a diagnostic stream consumer 604. In one embodiment, for example, the diagnostic stream producer 602 and the diagnostic stream consumer 604 are both TSN nodes 104 within the TSN 102. In one embodiment, for example, the diagnostic stream producer 602 may be a talker node within the TSN 102, and the diagnostic stream consumer 604 may be a listener node within the TSN 102. In one embodiment, for example, the diagnostic stream producer 602 may be a TSN node 104 within the TSN 102, and the diagnostic stream consumer 604 may be a central network controller within the TSN 102.

While system 600a depicts a single diagnostic stream producer 602 and a single diagnostic stream consumer 604 for purposes of clarity, it may be appreciated that the system 600a can implement multiple diagnostic stream producers 602 and diagnostic stream consumers 604. Embodiments are not limited in this context.

In general operation, the diagnostic stream producer 602 may produce various types of information that may be communicated to the diagnostic stream consumer 604 over various communications channels implemented by the TSN 102. In one embodiment, for example, the diagnostic stream producer 602 may send a diagnostic message over a dedicated diagnostic stream channel for the TSN 102. In one embodiment, for example, the diagnostic stream producer 602 may send a diagnostic message as part of a message stream channel transporting non-diagnostic messages (e.g., normal TSN and regular data traffic) for the TSN 102. In one embodiment, for example, the diagnostic stream producer 602 may send a diagnostic message in accordance with a priority scheme. For instance, diagnostic messages may be sent with a priority identifier to identify a priority level for the diagnostic message, the priority level to indicate a highest priority level for transport through the TSN 102.

More particularly, as depicted in FIG. 6, the diagnostic stream producer 602 may produce various types of information that may be communicated to the diagnostic stream consumer 604 via a data stream 634 (e.g., data traffic), a diagnostic stream 636 (e.g., diagnostic traffic), or a unified stream 638 (e.g., a combination of data traffic and diagnostic traffic). A data stream 634 may communicate data information for a TSN node via one or more data messages 640. For example, the data information may comprise normal TSN and regular data traffic, such as control information, application information, management information, timing information, protocol information, and so forth. A diagnostic stream 636 may communicate diagnostic information for a TSN node via one or more diagnostic messages 642. For example, the diagnostic information may comprise ACP information, IDS information, and other security information. A unified stream 638 may communicate a combination of data messages 640 and diagnostic messages 642 in a single unified information stream via one or more unified messages 644, such as interleaving data messages 640 and diagnostic messages 642 according to a defined protocol format.

Although some embodiments may be described as a diagnostic stream producer 602 sending diagnostic information via diagnostic messages 642 in a diagnostic stream 636 to a diagnostic stream consumer 604, it may be appreciated that the diagnostic stream producer 602 may send diagnostic information via unified messages 644 in a unified stream 638 to the diagnostic stream consumer 604, and vice-versa. Embodiments are not limited in this context.

In one embodiment, for example, a diagnostic stream producer 602 such as a TSN node 104 may be implemented, at least in part, by a computing apparatus that includes processor circuitry 622, memory 624 and an interface 626. The memory 624 may be communicatively coupled to the processor circuitry 622 and the interface 626. The memory 624 may store instructions that when executed by the processor circuitry 622, causes the processor circuitry 622 to perform one or more operations for the diagnostic stream producer 602. Additionally, or alternatively, the operations may be executed by dedicated hardware (e.g., DSP, ASIC, FPGA, circuitry, etc.), or a combination of hardware and software. Embodiments are not limited in this context.

The processor circuitry 622 may execute instructions for a data generator 606. The data generator 606 may prepare a data stream 634 for transmission from the diagnostic stream producer 602 to a diagnostic stream consumer 604 within a time window 670 assigned to the diagnostic stream producer 602 in a TSN 102. The data generator 606 may determine an amount of transmit time needed to send the data stream 634 from the diagnostic stream producer 602 to the diagnostic stream consumer 604 during the time window 670 assigned to the diagnostic stream producer 602. The data generator 606 may also determine an amount of residual time for the time window 670 based on the transmit time information 418.

In one embodiment, for example, a CNC may assign a time window 662 according to a timing schedule (e.g., a 902.1Qbv timing schedule) to the diagnostic stream producer 602 prior to sending the diagnostic messages 642 in the diagnostic stream 636. The diagnostic stream 636 can be adjusted to fit an existing schedule, or the schedule may be created with a sufficient size to accommodate the diagnostic stream 636. The CNC may distribute a schedule of time window assignments for the TSN nodes 104 to some or all of the TSN nodes 104 within the TSN 102. The schedule of time window assignments include time window assignments for some or all of the TSN nodes 104 within the TSN 102. In this manner, one TSN node 104 will know time window assignments for other TSN nodes 104 in the TSN 102, and can monitor time windows for the other TSN nodes 104 when receiving packets and frames for the other TSN nodes 104. The time window 670 may be defined in accordance with any TSN or network protocols, such as a time window as defined by IEEE 802.1Qbv, for example. An 802.1Qbv time window is determined based on a maximum path length between a deepest node of interest and a destination (e.g., a monitor) so that the entire chain of ACPs can be transported to a monitor. As discussed in more detail below, the monitor is designed to consume the ACPs, analyze the ACPs, and produce a result indicating whether a TSN node 104 has been compromised. Embodiments are not limited to an IEEE 802.1Qbv, and other time windows defined by other TSN protocols may be used for a given implementation.

The processor circuitry 622 may execute instructions for an ACP generator 608. In general, the ACP generator 608 may generate a set of alignment-check packets (ACPs) 612 for a given TSN node 104. An ACP 612 is a well-defined packet structure that contains diagnostic information for the TSN node 104. A security monitor may receive the ACP for a TSN node 104, analyze the ACP, and determine whether the TSN node 104 has been compromised or is under a security attack.

It is worthy to note that a set of ACPs 612 may be transmitted from a TSN node 104 in an assigned time window 662, while only a subset of the transmitted ACPs 612 may be received by another TSN node 104, or ultimately at a final destination such as the security monitor 614, in the same assigned time window 662. This may occur for several reasons. For instance, some of the transmitted ACPs 612 will not be received within a defined time window, such as during a security attack, and therefore queued for transmission in a subsequent time window 662. In another example, link delay (LD) or switch delay (SD) may introduce network latency. In yet another example, some of the transmitted ACPs 612 may be corrupted or dropped because of transmission problems incurred by the TSN 102.

Attackers may utilize various attack vectors to implement a timing attack on a TSN node 104, such as a diagnostic stream producer 602, in order to desynchronize the synchronized timing of the TSN 102. For instance, an attacker may inject malicious software (malware) into the diagnostic stream producer 602 or inject fake data into timing information received by the diagnostic stream producer 602 in order to cause a local clock 108 for the diagnostic stream producer 602 to maintain a local time that is different from the network time of the TSN 102. The desynchronization causes the diagnostic stream producer 602 to shift its assigned time window 662, due to clock drift, which impacts traffic scheduling. This deteriorates timing guarantees between the diagnostic stream producer 602 and other TSN nodes 104 in the TSN 102, such as the diagnostic stream consumer 604, for example. Another example of an attack is when other TSN nodes 104 along a network path to the security monitor 614 (e.g., intermediate nodes) are impacted and therefore a misalignment of the windows will occur at these TSN nodes 104.

The diagnostic stream producer 602 may generate diagnostic information that can be used by the diagnostic stream consumer 604 to detect misalignment of a time window 662 for the diagnostic stream producer 602. The diagnostic stream producer 602 may send a specially-crafted set of ACPs 612 in one or more diagnostic messages that collectively form a diagnostic stream 636 towards the diagnostic stream consumer 604. The specially-crafted set of packets may be referred to individually as an ACP 612 or collectively as a set of ACPs 612. The diagnostic stream producer 602 may communicate diagnostic messages 642 with the set of ACPs 612 using an in-band channel such as the unified stream 638 (e.g., interleaved within normal data streams using a priority scheme) of the TSN 102 or an out-of-band channel such as the diagnostic stream 636 (e.g., a dedicated diagnostic channel reserved only for diagnostic traffic) of the TSN 102. The diagnostic stream consumer 604 may include a security monitor 614 that parses the diagnostic stream 636 or the unified stream 638 for the diagnostic messages 642, analyzes the ACPs 612 carried by the diagnostic messages 642, and performs security inferences to determine whether a desynchronization event has occurred for the diagnostic stream producer 602 based on results of the analysis.

It may be possible, however, for an attacker to intercept the diagnostic messages 642 in order to modify the set of ACPs 612 or forge a fake set of ACPs 612. In order to enhance security for ACPs 612, each ACP 612 is designed to be unique, bounded to a TSN node 104, and unforgeable. An ACP 612 is made unique and unforgeable using a pair-wise cryptographic key shared between a TSN node 104 and a security monitor 614. A keyed hash binds the node number and the packet sequence number. Further, each ACP has a unique identifier with a defined minimum size or bit-width. Forgery can happen during message relay within a resident time. After relaying a message, freshness of the identifier forces a brand-new forgery attempt. For example, an Ethernet packet minimum payload can accommodate identifiers up to 368 bits long.

The ACP generator 608 may generate a set of ACPs 612 for the diagnostic stream producer 602, where a given set of ACPs 612 comprises a number of ACP 1 through m, where m is any positive integer. The ACP generator 608 may determine a particular number of ACPs to generate for a given set of ACPs 612 by examining a time window 662 assigned to the diagnostic stream producer 602.

In one embodiment, the diagnostic stream producer 602 may transmit one or more diagnostic messages 642 using a dedicated diagnostic stream 636. In this case, the ACP generator 608 may determine a particular number of ACPs to generate for a given set of ACPs 612 by examining the time window 662. For example, assume the diagnostic stream producer 602 is assigned a time window 662 of a time interval T, where T is any positive integer. Further assume the interface 626 can transmit the diagnostic stream 636 within the entire time interval T, as denoted by transmit time t, where t represents any positive integer. The ACP generator 608 will generate a set of ACPs 612 that can fit within the entire time interval T, where T=t.

In one embodiment, the diagnostic stream producer 602 may transmit one or more diagnostic messages 642 using a shared unified stream 638. In this case, the ACP generator 608 may determine a particular number of ACPs to generate for a given set of ACPs 612 by examining the residual time left in the transmit window. For example, assume the diagnostic stream producer 602 is assigned a time window 662 of a time interval T, where T is any positive integer. Further assume the interface 626 can transmit the data stream 634 within the time interval T, as denoted by transmit time t, where t represents any positive integer. A residual time r is calculated as a difference between the time interval T and the transmit time, where T−t=r.

The ACP generator 608 may determine a set of ACPs 612 associated with the diagnostic stream producer 602 that can be sent within the residual time r for the time window 662. Each ACP 612 of the set of ACPs 612 may have a defined size set by the ACP generator 608. Given a transmit speed of the interface 626 and/or the communication channel 208, the ACP generator 608 may determine a time value associated with each ACP 612 needed to transmit the ACP 612. The ACP generator 608 may determine a number of ACPs 612 it can generate that can be transmitted within the remaining residual time r for the transmit window 670 assigned to the diagnostic stream producer 602.

In one embodiment, for example, the ACP generator 608 may generate a single ACP 612 (e.g., m=1) within the set of ACPs 612 associated with the diagnostic stream producer 602. In one embodiment, for example, the ACP generator 608 may generate multiple ACPs 612 (e.g., m>1) within the set of ACPs 612 associated with the diagnostic stream producer 602.

An ACP 612 has a well-defined packet structure designed to carry diagnostic information associated with the diagnostic stream producer 602. An ACP 612 may be sent as a separate packet and/or frame with a defined structure, such as discussed with reference to FIG. 30, for example. Alternatively, an ACP 612 may be sent as part of another packet, such as a payload for an Ethernet packet, such as discussed with reference to FIG. 29. When using an Ethernet packet, for example, an ACP 612 may have a defined length of 368 bits, a node identifier to comprise a length of 8 bits, an ACP sequence number to comprise a length of 232 bits, and an authentication code to comprise a length of 128 bits. Embodiments are not limited to this particular packet structure, fields, or field lengths. The Ethernet packet carries one ACP in its payload. The Ethernet packet is the smallest option that provides higher granularity. However, other network packets could be used higher in the network stack, such as Internet Protocol (IP) frames, User Datagram Protocol (UDP) datagrams. Note these options may start to increase the granularity of quantification of misalignment due to a given packet size.

Each ACP 612 may include diagnostic information associated with the diagnostic stream producer 602. The diagnostic information may comprise a node identifier for the diagnostic stream producer 602, an ACP sequence number, an authentication code for the diagnostic stream producer 602. The diagnostic information may optionally include security information, measurements, key performance indicators (KPIs), status information, etc., from any monitoring hardware or software that is assigned to monitor the diagnostic stream producer 602.

The diagnostic information may comprise a node identifier. A node identifier is a unique identifier for a TSN node 104. The node identifier indicates a TSN node that originates a given ACP 612. For example, assume a TSN 102 comprises a set of TSN nodes 1 through n, where n represents any positive integer. Further assume the TSN 102 comprise five TSN nodes (e.g., n=5). Each TSN node is assigned a node identifier from 1 to 5. If a TSN node 3 generates a set of ACPs 612 that is part of a diagnostic message 642, a diagnostic stream producer 602 or a diagnostic stream consumer 604 that receives the diagnostic message 642 may use the node identifier to determine that the ACP 612 was generated by the TSN node 3. In one embodiment, for example, the node identifier is a unique identifier for the diagnostic stream producer 602, the node identifier having a defined minimum size (or bit-width) to prevent forgeries.

The diagnostic information may comprise a set of ACPs 612, each ACP 612 having an ACP sequence number 1 through m, where m represents any positive integer. The ACP generator 608 may generate and arrange the set of ACPs 612 within the diagnostic message 642 according to a sequence, where the ACP sequence number represents an ordered number for an ACP 612 in an ordered number of ACPs 612 within the sequence. For instance, assume a diagnostic stream producer 602 transmits a set of ACPs 612 comprising 1 through m, where m is set to 5. The ACP generator 608 may assign a first ACP with an ACP sequence number of 1, a second ACP with an ACP sequence number of 2, and so forth through the fifth ACP with an ACP sequence number of 5.

The diagnostic information may comprise an authentication code. In one embodiment, for example, the authentication code may be generated by a cryptographic key used by the diagnostic stream producer 602 and the diagnostic stream consumer 604 of the TSN 102. The authentication code may represent any cryptographically secure authentication code generated in accordance with a given cryptographic scheme, such as symmetric-key schemes, asymmetric-key schemes, public key encryption schemes, Rivest-Shamir-Adleman (RSA) public key encryption schemes, and so forth. Embodiments are not limited to a particular cryptographic scheme.

For example, the processor circuitry 622 may execute instructions for a cryptographic engine 610. The cryptographic engine 610 may generate authentication codes for the diagnostic stream producer 602. The cryptographic engine 610 may receive as input a set of cryptographic information, such as a symmetric or asymmetric security key, and output the authentication codes based on the security key. The ACP generator 608 may receive as input the authentication codes from the cryptographic engine 610, and insert an authentication code into the ACPs 612 associated with the diagnostic stream producer 602.

Once the ACP generator 608 generates the ACPs 612, the ACP generator 608 may insert the set of ACPs 612 into one or more diagnostic streams 636. For instance, a set of ACPs 612 may be sent as individual messages, where each ACP 612 is sent in sequence to form the diagnostic stream 636. If misalignment occur, individual ACPs will be delayed along the way, and the time misalignments form a timing pattern which is how the security monitor 614 is able to determine an amount of delay and a source of the delay using the security monitor 614. Alternatively, the ACP generator 608 may insert the ACPs 612 into one or more diagnostic messages 642. A diagnostic message 642 may comprise a single ACP 612 or a set of ACPs 612, and in some cases, may include other types of diagnostic information. Embodiments are not limited in this context.

An interface 626 may send the diagnostic messages 642 with the set of ACPs 612 in a diagnostic stream 636 and/or a unified stream 638 from the diagnostic stream producer 602 to the diagnostic stream consumer 604 within the residual time for the time window assigned to the diagnostic stream producer 602. Continuing with the previous example, if the set of ACPs 612 comprises 5 ACPs 612 denoted 1 through 5, then the 5-ACP diagnostic stream 636 will comprise the 5 ACPs 612 having ACP sequence numbers 1 through 5.

In various embodiments, the interface 626 will transmit the 5 ACPs 612 in reverse order from highest to lowest ACP sequence number, starting with ACP5, ACP4, ACP3, ACP2, and ACP1. This will allow the security monitor 614 to quickly determine a number of dropped ACPs 612 based on a lowest ACP sequence number received by the diagnostic stream consumer 604. However, it may be possible for the interface 626 to transmit the 5 ACPs 612 in order from lowest to highest ACP sequence number. This would necessitate additional signaling overhead and information inserted into the diagnostic messages 642, such as an original number of ACPs 612 generated for the diagnostic stream producer 602.

In some cases, the diagnostic stream producer 602 may have an IDS 110 monitoring operations for the diagnostic stream producer 602. In such cases, the diagnostic information may optionally comprise security information from the IDS 110 associated with the diagnostic stream producer 602. The diagnostic stream producer 602 may determine whether security information has been generated for the diagnostic stream producer 602 by the IDS 110, and retrieve the security information from the IDS 110. The diagnostic stream producer 602 may add the security information to one or more ACPs 612, or in a different portion of the diagnostic message 642 (e.g., a different field), and send the diagnostic message 642 with the set of ACPs 612 and the security information from the IDS 110 from the diagnostic stream producer 602 to the diagnostic stream consumer 604 within the residual time for the time window assigned to the diagnostic stream producer 602.

In one embodiment, for example, a diagnostic stream consumer 604 such as a TSN 104 may be implemented, at least in part, by a computing apparatus that includes processor circuitry 628, memory 630 and an interface 632. The memory 630 may be communicatively coupled to the processor circuitry 628 and the interface 632. The memory 630 may store instructions that when executed by the processor circuitry 628, causes the processor circuitry 628 to perform one or more operations for a diagnostic stream consumer 604. Additionally, or alternatively, the operations may be executed by dedicated hardware (e.g., DSP, ASIC, FPGA, circuitry, etc.), or a combination of hardware and software. Embodiments are not limited in this context.

The processor circuitry 628 may execute instructions for a security monitor 614. The security monitor 614 may receive one or more diagnostic messages 642 from a diagnostic stream 636 or a unified stream 638 via the interface 632. As described with reference to the diagnostic stream producer 602, a diagnostic message 642 may comprise a set of ACPs 612 for a TSN node 104, such as the diagnostic stream producer 602. For example, the set of ACPs 612 may include a first node ACP from a first set of ACPs 612 associated with a first TSN node 104 in the TSN 102. The first TSN node 104 may comprise, for example, a diagnostic stream producer 602. The first node ACP may carry diagnostic information associated with the first TSN node 104. For example, the diagnostic information may comprise, among other types of information, a node identifier for the first TSN node 104, an ACP sequence number for the first TSN node 104, and an authentication code for the first TSN node 104. The first node ACP may have a defined size known by the diagnostic stream consumer 604.

The processor circuitry 628 may execute instructions for a cryptographic engine 618 to authenticate the first node ACP based on the authentication code. The cryptographic engine 618 may receive as input the authentication code and a set of cryptographic information, such as a symmetric or asymmetric security key, and output a verification that the authentication code is based on the security key. The security monitor 614 may receive as input the verification or authentication from the cryptographic engine 618.

In some cases, authentication does not verify. For example, this can happen when a forgery attack is attempted. The forged ACPs can indicate where the forgery is happening. TSN nodes 104 closer to the security monitor 614 would have their ACPs 612 authentication verified, but at some depth of the network, the ACPs will start not to verify due to forgery. This also indicates that an anomaly, likely an attack, is happening. In some cases, but not all, it is even possible to distinguish an anomaly from an attack. In an anomaly, usually some packets are corrupted and do not verify. In an attack, the adversary may try to forge as much as possible to maximize the likelihood of a forged packet to go through. However, the attacker may attempt to affect a selected number of ACPs, and that would appear like an anomaly to the security monitor 614.

Once authentication and verification is complete, the security monitor 614 may determine a number of ACPs from the first set of ACPs 612 associated with the first TSN node 104 that were received within a time window 662 associated with the first TSN node 104. The diagnostic stream consumer 604 has a schedule of time windows assigned to some or all of the TSN nodes 104 within the TSN 102, including the diagnostic stream producer 602. The diagnostic stream consumer 604 monitors the time window 662 assigned to the diagnostic stream producer 602 when receiving the ACPs 612 from the diagnostic stream producer 602. When an ACP 612 is received within the time window 662, it is stored in memory 630 as a received ACP of a set of received ACPs 620, where a number of received ACPs 620 is 1 through q, where q is any positive integer. When an ACP 612 is not received within the time window 662, however, it is received by a subsequent time window 662. Consequently, the set of ACPs 612 transmitted by the diagnostic stream producer 602 should eventually equal the set of ACPs 620 received by the diagnostic stream consumer 604, although they may arrive in different time windows 662. For example, in some cases, the set of ACPs 612 transmitted by the diagnostic stream producer 602 may eventually equal the set of ACPs 620 received by the diagnostic stream consumer 604. However, instead of the ACPs 612 arriving within a single time window 662, the ACPs 612 may arrive within multiple time windows 662.

One reason for this difference is that the local clock 108 for the diagnostic stream producer 602 has been compromised, due to time bias introduced by an attacker, and therefore is no longer synchronized to the local clock 108 of the diagnostic stream consumer 604. As such, the time window 662 assigned to the diagnostic stream producer 602 and calculated by the compromised local clock 108 of the diagnostic stream producer 602 to transmit the set of ACPs 612 will be different from the time window calculated by the non-compromised local clock 108 of the diagnostic stream consumer 604. Another reason for this difference is that local clocks of intermediate nodes along a network path between the diagnostic stream producer 602 and the diagnostic stream consumer 604 have been compromised by an attacker.

One way the security monitor 614 may detect when the local clock 108 of the diagnostic stream producer 602 or other intermediate nodes have been compromised is by inspecting the ACP sequence number of the first node ACP. The security monitor 614 may determine or estimate a desynchronization time for the first TSN node 104 based on a number of ACPs from the first set of ACPs 612 associated with the first TSN node 104 that have arrived outside of the first time window 662 and within a second time window 662. The first time window 662 and the second time window 662 may be of the same duration and sequential corresponding to different rounds of transmission.

Since the security monitor 614 knows that each ACP 612 has a defined size, and it knows a communications speed of the TSN 102, the security monitor 614 may calculate an estimated time value associated with each ACP 612 for each time window 662. For instance, if there were originally 5 ACPs 612 (e.g., m=5) transmitted and only 2 ACPs 612 were received within the first time window 662 (e.g., received ACPs 620 where q=2), this means 3 ACPs 612 were received outside of the first time window 662 and within the second (or subsequent) time window 662 (e.g., m−q=5−2=3 ACPs 612). In this case, the security monitor 614 will calculate a time value for the 3 ACPs 612, which when summed equal to the amount of time (e.g., a desynchronization time) that the first TSN node 104 has desynchronized (after accounting for Link Delay (LD) and Switch Delay (SD)). The security monitor 614 may compare the desynchronization time with a defined threshold, determine whether the comparison indicates sufficient evidence of a security attack on the first TSN node 104, and output a control signal to indicate there is sufficient evidence of a security attack to generate an alarm or alert and take corrective security actions in response to the security attack.

It is worthy to note that if an ACP arrives late due to a misalignment in time of the windows, it is either the receiver or the transmitter that is off. The security monitor 614 may not be able to distinguish immediately which TSN node 104 is desynchronized, as the window shift is relative in time. However, it is possible for the security monitor 614 to identify which node that has shifted (e.g., desynchronized) in time based on a timing pattern of the arriving ACPs 612 within the first time window 662 and/or the second time window 662, as described with reference to FIG. 7A through FIG. 7C and FIG. 8A through FIG. 8C, respectively.

The processor circuitry 628 may execute instructions for an alert generator 616. The alert generator 616 may receive the control signal indicating an attack on the first TSN node 104 from the security monitor 614, and generate an alert for the TSN 102 indicating the first TSN node 104 is under a security attack. The diagnostic stream consumer 604 may send an alert message to a CNC or a SIEM via the interface 632. The CNC or SIEM may initiate security procedures in response to the security attack, such as isolating the first TSN node 104, updating routing tables for other TSN nodes 104 within the TSN 102 (e.g., switch nodes, relay nodes, etc.), informing neighboring TSN nodes of the attack on the first TSN node 104, and other corrective actions.

Figure 6B:
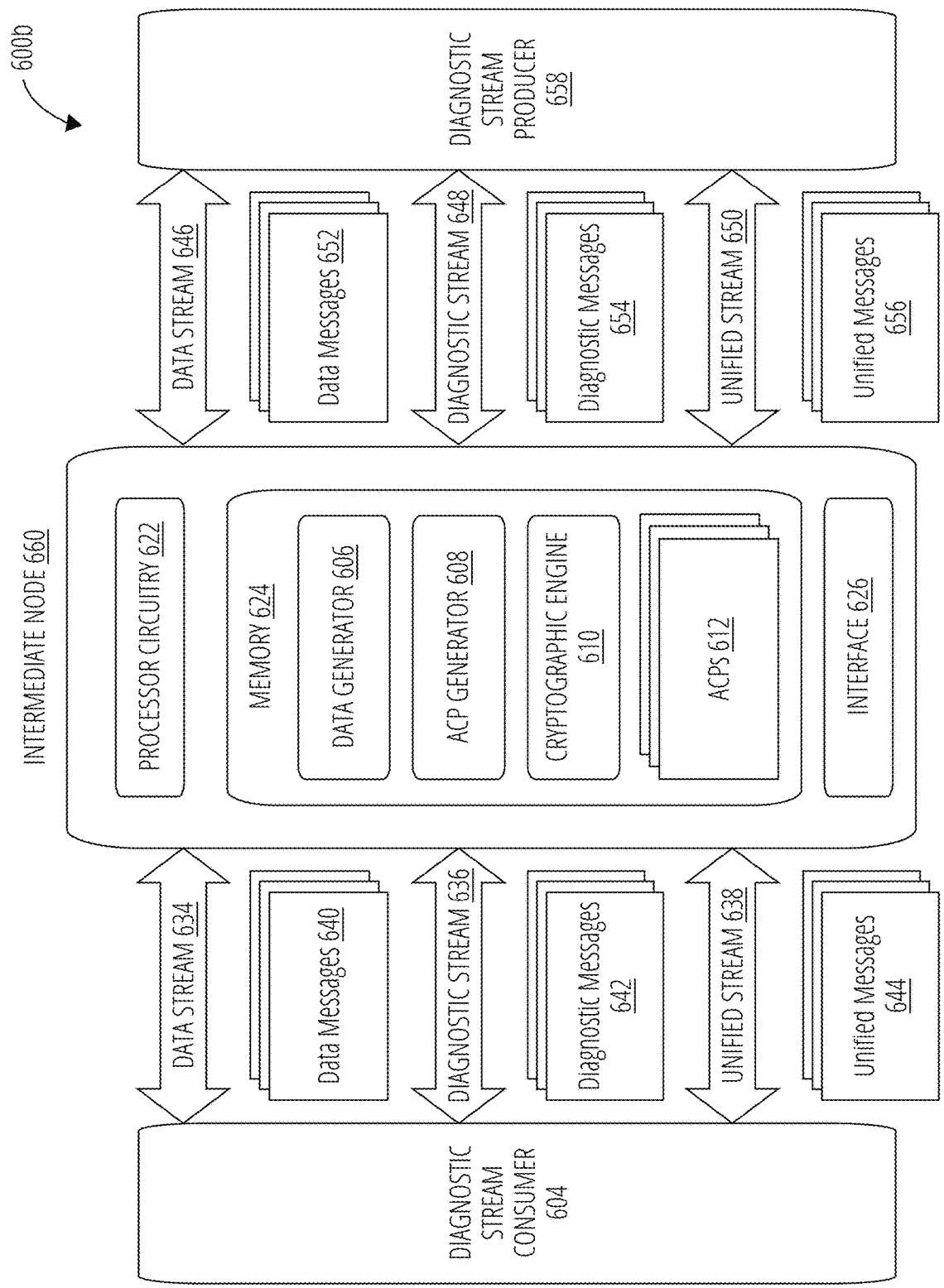
FIG. 6B illustrates an aspect of a system 600b in accordance with one embodiment.

FIG. 6B illustrates a system 600b suitable for a TSN, such as the TSN 102, for example. As depicted in FIG. 6B, the system 600b may be similar to system 600a. The system 600b, however, further depicts an intermediate node 660 between the diagnostic stream producer 602 and the diagnostic stream consumer 604.

In one embodiment, the intermediate node 660 may be a switch node or a relay node in the TSN 102. In this case, the intermediate node 660 receives the ACPs 612 in a receive queue, loads them into a transmit queue, and forwards the ACPs 612 in the same time window 662 of the diagnostic stream producer 602. In one embodiment, the intermediate node 660 may also a diagnostic stream producer 602. In this case, the intermediate node 660 may be the same or similar to the first diagnostic stream producer 602 in structure and functions.

Operations and additional examples for the systems 600a, 600b will be described with reference to FIGS. 7-23, particularly with respect to the TSN 102 having multiple TSN nodes 104 in a given network topology.

Figure 7A:
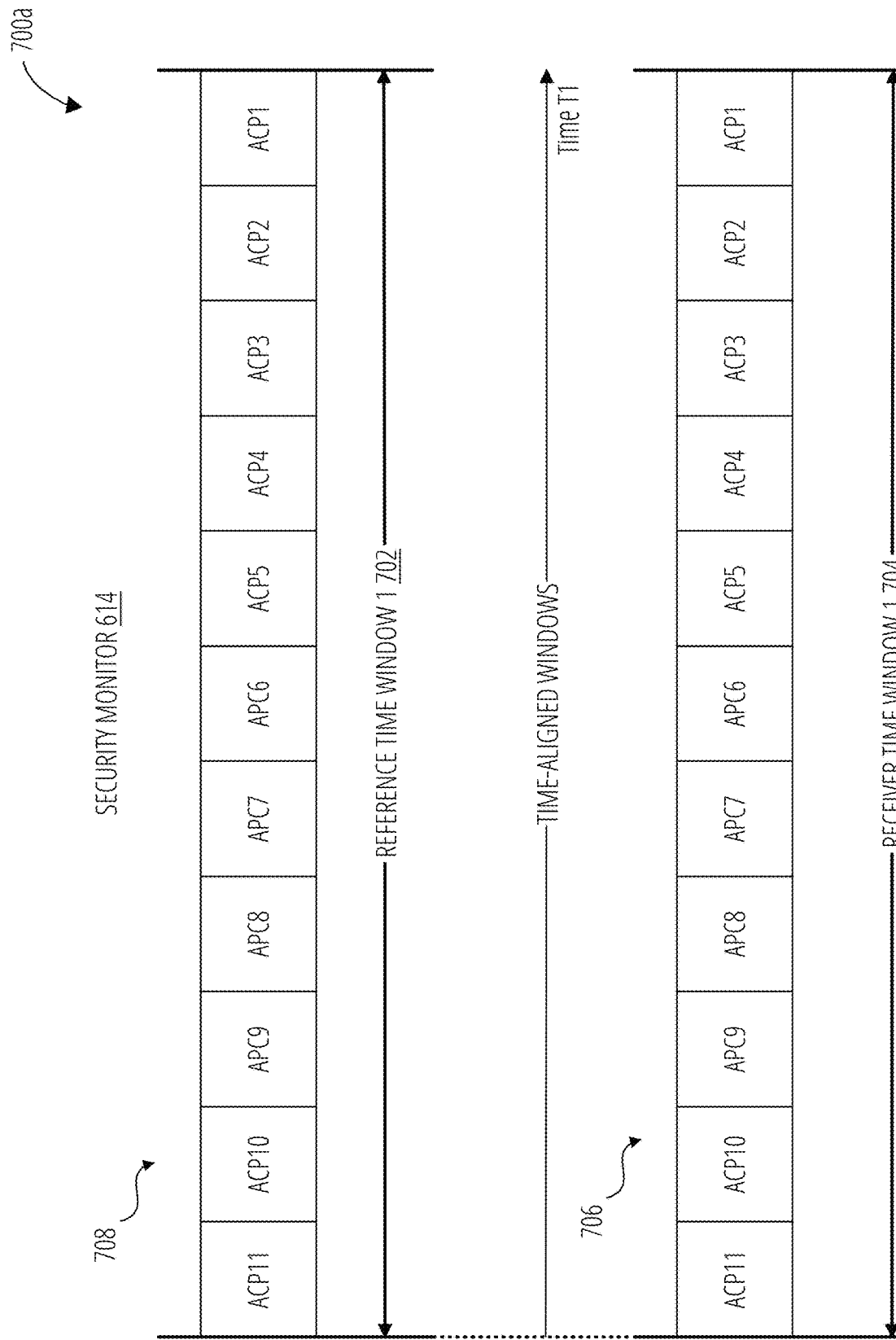
FIG. 7A illustrates an aspect of a timing pattern 700a in accordance with one embodiment.

FIG. 7A illustrates a first timing pattern 700a. A security monitor 614 may use the timing pattern 700a to detect, quantify and localize desynchronization time for one or more network nodes in a network path between a diagnostic stream producer 602 and a diagnostic stream consumer 604 based on an examination of arrival times for a set of ACPs 612 at the security monitor 614.

In one embodiment, for example, a security monitor 614 may receive one or more diagnostic messages 642 in the TSN 102 by a diagnostic stream consumer 604 of the TSN 102. The diagnostic message 642 may comprise a set of ACPs 612 for a diagnostic stream producer 602. The security monitor 614 may receive the set of ACPs 612 in a receive (RX) queue across one or more time windows 662 (e.g., 802.1Qbv time windows) scheduled for the diagnostic stream producer 602 by the CNC.

As depicted in FIG. 7A, the security monitor 614 may receive a first subset of ACPs 612 from the set of ACPs 612 in a first time window, referred to as receiver time window 1 704. The first subset of ACPs 612 may arrive in the receive queue according to an actual pattern 706. The security monitor 614 may determine the actual pattern 706 for the first subset of ACPs 612 received in the receiver time window 1 704. The actual pattern 706 may comprise an actual number of ACPs 612 in the first subset of ACPs 612, and actual receive times when the ACPs 612 are received in the receiver time window 1 704. The actual receive times may be measured on a leading edge of an ACP, a trailing edge of an ACP, or as an actual time slot having an upper and lower boundary of an ACP. By way of example, as shown in FIG. 7A, the security monitor 614 receives a set of ACPs 612 comprising 11 ACPs, denoted as ACP1 through ACP11.

The security monitor 614 may retrieve an estimated pattern 708 for the first subset of ACPs 612. The estimated pattern 708 may comprise an estimated number of ACPs 612 in the first subset of ACPs 612, and estimated times when the ACPs 612 are received in a reference time window 1 702. The estimated number and times may be generated by collecting statistical data for arrival times of ACPs 612 during normal (or benign) operations of the TSN 102. The estimated times may have an upper and lower boundary to form an estimated time slot. In one embodiment, the estimated time slot may have a size (e.g., time-width) that matches a defined size for an ACP. By way of example, as shown in FIG. 7A, the reference time window 1 702 illustrates an estimated pattern 708 that estimates the security monitor 614 receiving a set of ACPs 612 comprising 11 ACPs, denoted as ACP1 through ACP11.

The security monitor 614 may compare the actual pattern 706 with the estimated pattern 708 to detect a timing difference between the actual pattern 706 and the estimated pattern 708 for the first subset of ACPs 612. In the example shown in FIG. 7A, the actual pattern 706 and the estimated pattern 708 match. In this case, the security monitor 614 expects 11 ACPs in the set of ACPs 612 to arrive in the receiver time window 1 704, and 11 ACPs in the set of ACPs 612 actually arrive in the receiver time window 1 704. Further, the 11 ACPs arrive at the estimated time slots. Consequently, the security monitor 614 detects 0 timing differences, and therefore the security monitor 614 does not detect any desynchronization time for transport of the ACPs 612 in the first time window.

As discussed with reference to FIG. 7A, when the security monitor 614 receives an expected number of ACPs 612 in the receiver time window 1 704, it does not detect any time anomalies. However, at this point, the security monitor 614 does not have sufficient evidence to conclude that there is not a desynchronization event occurring along the network path, particularly for the diagnostic stream producer 602. Instead, the security monitor 614 examines a receiver time window 2 804, which occurs in a second transmit round (or receive round) from the diagnostic stream producer 602.

Figure 7B:
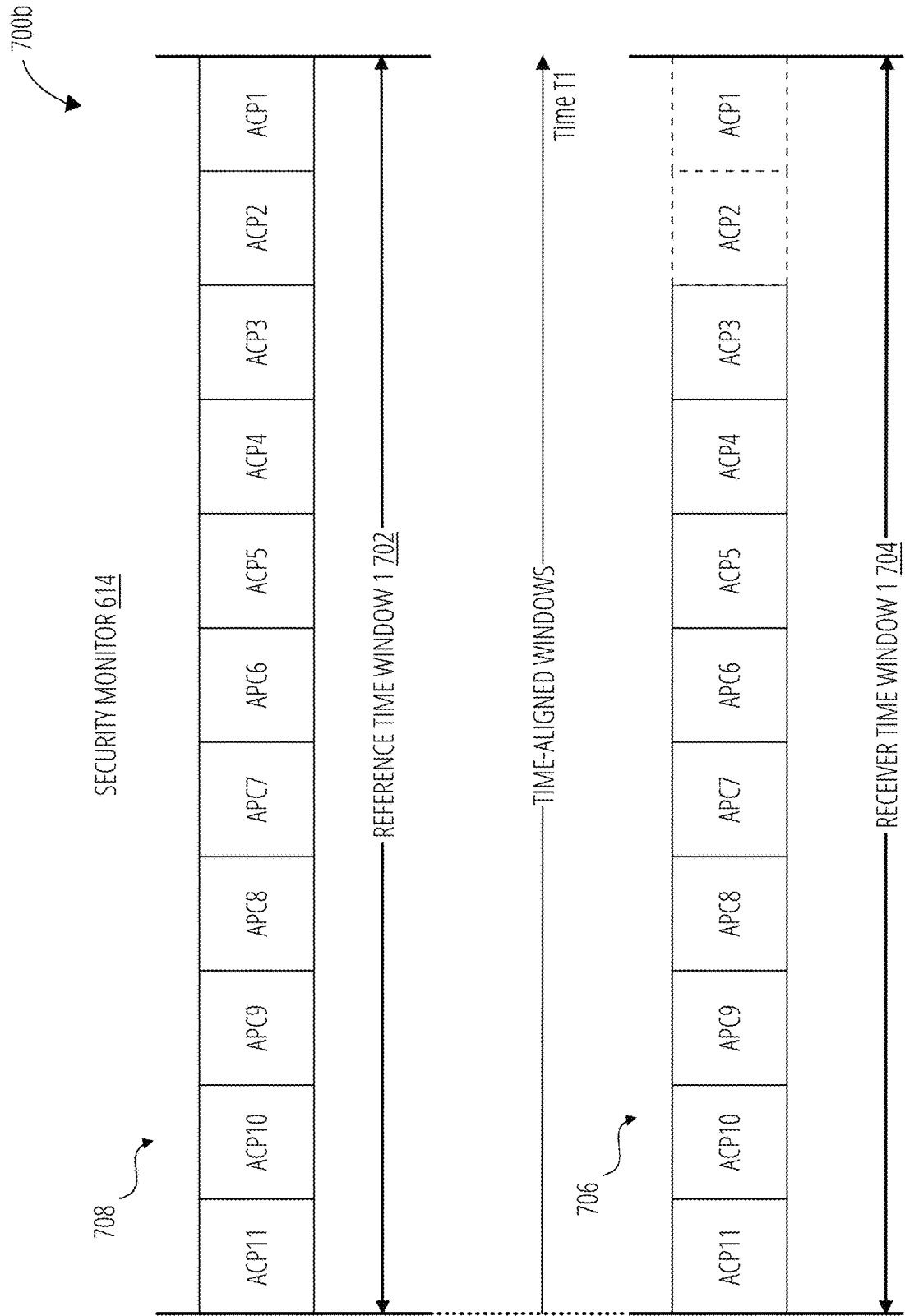
FIG. 7B illustrates an aspect of a timing pattern 700b in accordance with one embodiment.

FIG. 7B illustrates a second timing pattern 700*b*. A security monitor 614 may use the timing pattern 700*b* to detect, quantify and localize desynchronization time for one or more network nodes in a network path between a diagnostic stream producer 602 and a diagnostic stream consumer 604 based on an examination of arrival times for a set of ACPs 612 at the security monitor 614.

The timing pattern 700*b* is similar to the timing pattern 700*a*. However, unlike the timing pattern 700*a*, the security monitor 614 analyzes the actual pattern 706 in the receiver time window 1 704, compares it to the estimated pattern 708 in the reference time window 1 702, and determines that 2 ACPs 612 denoted as ACP1 and ACP 2 in the first subset of ACPs 612 that were expected to arrive did not actually arrive in the receiver time window 1 704. As such, the security monitor 614 has some evidence that one of the network nodes along the network path is experiencing a potential desynchronization event having a time-width of approximately 2 ACPs. Early misalignments of network nodes manifests as ACPs 612 missing in the end of the receiver time window 1 704. The number of missing ACPs 612 indicates a total amount desynchronization time, since each ACP is of a defined size and network communications speeds are known. At this point however, a source of the desynchronization time (e.g., which network node) is still unknown.

As discussed with reference to FIG. 7B, when the security monitor 614 does not receive an expected number of ACPs 612 in the receiver time window 1 704, it detects a time anomaly is occurring somewhere along the network path between the diagnostic stream producer 602 and the diagnostic stream consumer 604. At this point, it may approximately quantify an amount of desynchronization time based on a number of missing ACPs 612. However, it is unable to localize a source of the desynchronization time. Instead, the security monitor 614 examines a receiver time window 2 804, which occurs in a second transmit round (or receive round) from the diagnostic stream producer 602 to localize a source of the desynchronization time.

Figure 7C:
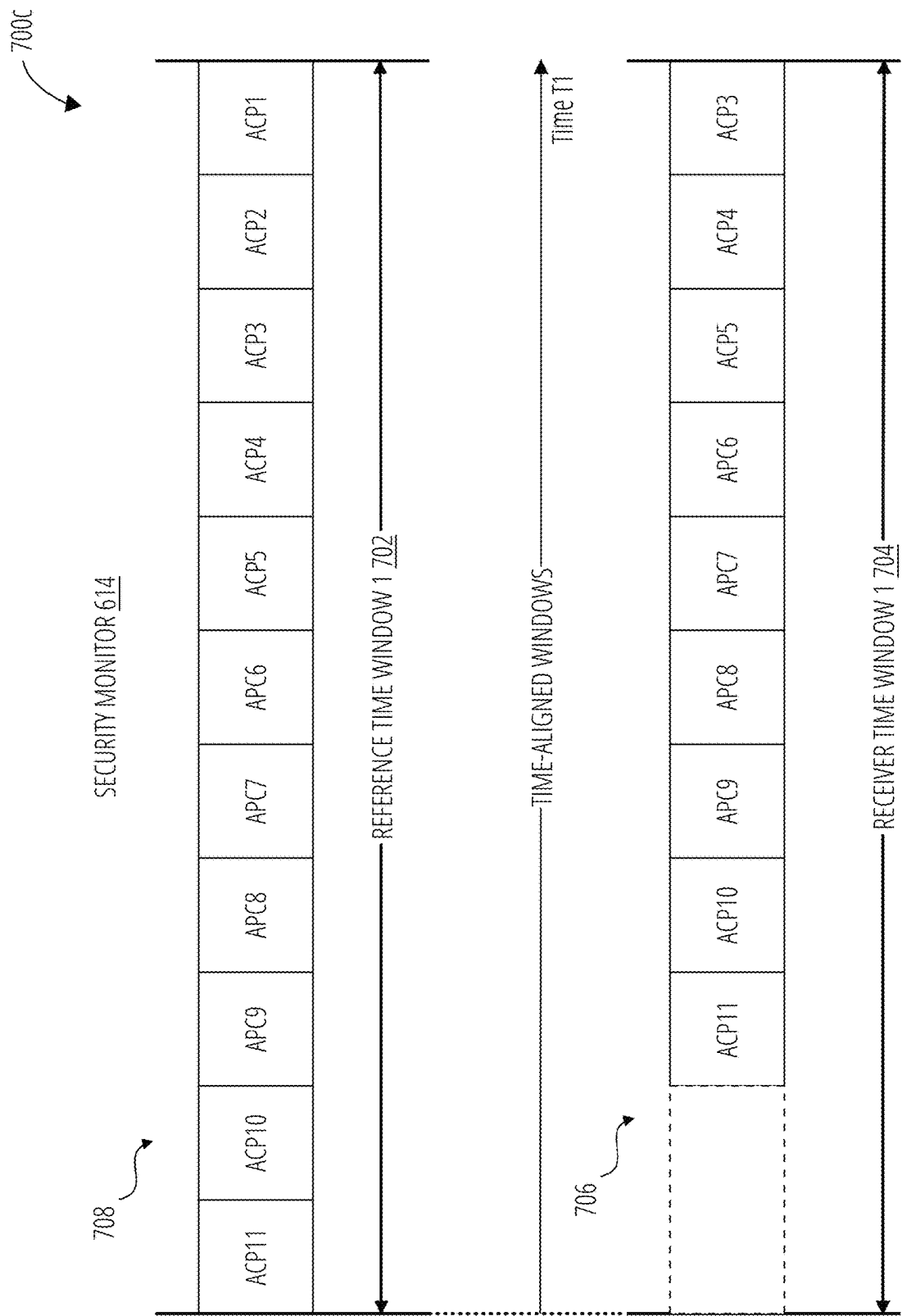
FIG. 7C illustrates an aspect of a timing pattern 700c in accordance with one embodiment.

FIG. 7C illustrates a third timing pattern 700*c*. A security monitor 614 may use the timing pattern 700*c* to detect, quantify and localize desynchronization time for one or more network nodes in a network path between a diagnostic stream producer 602 and a diagnostic stream consumer 604 based on an examination of arrival times for a set of ACPs 612 at the security monitor 614.

The timing pattern 700*c* is similar to the timing pattern 700*a*. However, unlike the timing pattern 700*a*, the security monitor 614 analyzes the actual pattern 706 in the receiver time window 1 704, compares it to the estimated pattern 708 in the reference time window 1 702, and determines that 2 ACPs 612 denoted as ACP1 and ACP 2 in the first subset of ACPs 612 that were expected to arrive did not actually arrive in the receiver time window 1 704 and instead were bumped to a subsequent receiver time window. As such, the security monitor 614 has some evidence that one of the network nodes along the network path is potentially experiencing a desynchronization event having a time-width of approximately 2 ACPs. Late misalignments of network nodes manifests as ACPs 612 missing in the beginning of the receiver time window 1 704. The number of missing ACPs 612 indicates a total amount desynchronization time, since each ACP is of a defined size and network communications speeds are known. At this point however, a source of the desynchronization time (e.g., which network node) is still unknown.

As discussed with reference to FIG. 7C, when the security monitor 614 does not receive an expected number of ACPs 612 in the receiver time window 1 704, it detects a time anomaly is occurring somewhere along the network path between the diagnostic stream producer 602 and the diagnostic stream consumer 604. At this point, it may approximately quantify an amount of desynchronization time based on a number of missing ACPs 612. However, it is unable to localize a source of the desynchronization time. Instead, the security monitor 614 examines a receiver time window 2 804, which occurs in a second transmit round (or receive round) from the diagnostic stream producer 602 to localize a source of the desynchronization time.

Figure 8A:
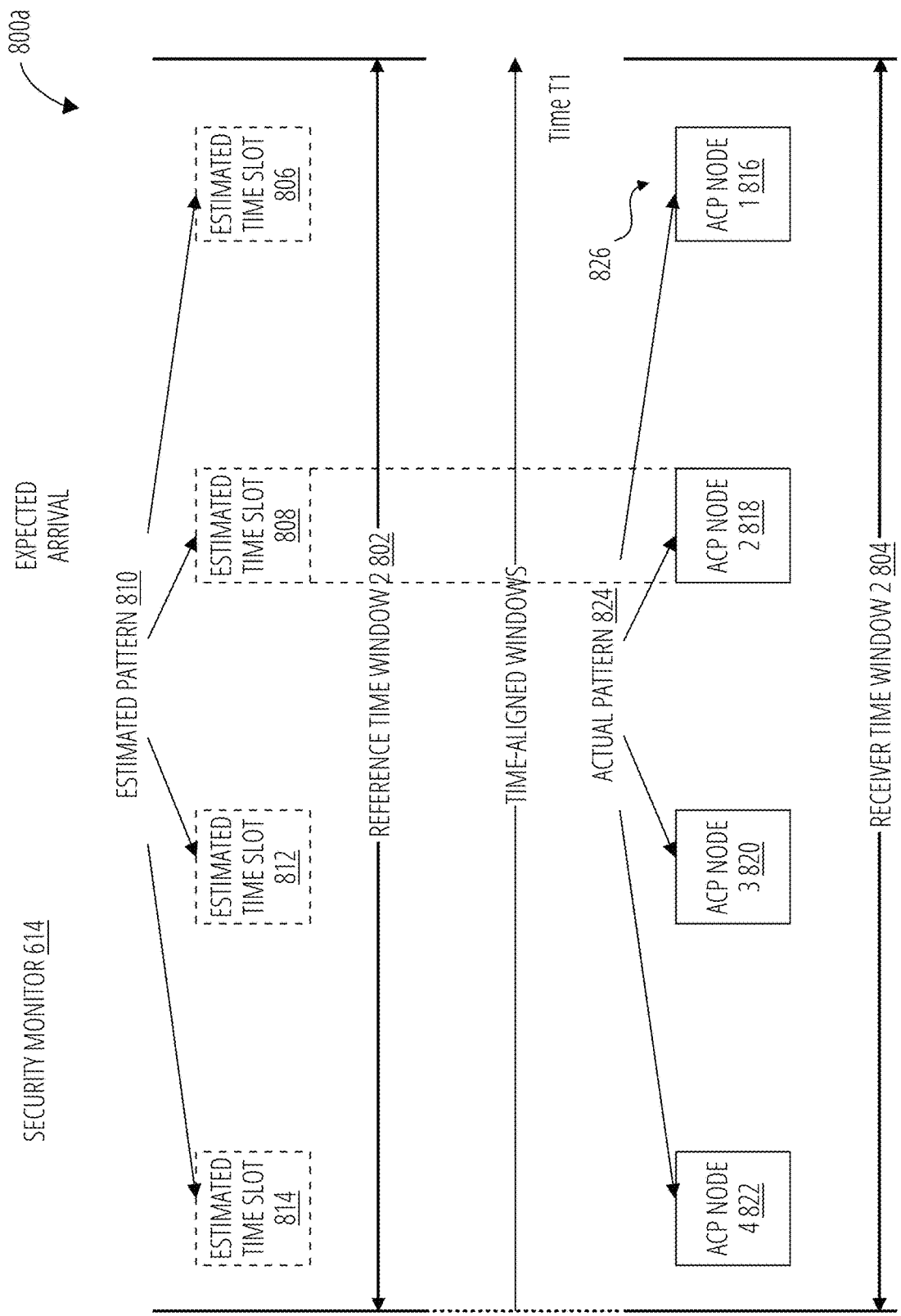
FIG. 8A illustrates an aspect of a timing pattern 800a in accordance with one embodiment.

FIG. 8A illustrates a first timing pattern 800*a*. A security monitor 614 may use the timing pattern 800*a* to detect, quantify and localize desynchronization time for one or more network nodes in a network path between a diagnostic stream producer 602 and a diagnostic stream consumer 604 based on an examination of arrival times for a set of ACPs 612 at the security monitor 614.

In one embodiment, for example, a security monitor 614 may receive one or more diagnostic messages 642 in the TSN 102 by a diagnostic stream consumer 604 of the TSN 102. The diagnostic message 642 may comprise a set of ACPs 612 for a diagnostic stream producer 602. The security monitor 614 may receive the set of ACPs 612 in a receive (RX) queue across one or more time windows 662 (e.g., 802.1Qbv time windows) scheduled for the diagnostic stream producer 602 by the CNC.

FIG. 7A through FIG. 7C illustrate a first subset of ACPs 612 from the set of ACPs 612 arriving in a receiver time window 1 704. In general, comparison of the receiver time window 1 704 with the reference time window 1 702 may reveal time anomalies or misalignments occurring along a network path between the diagnostic stream producer 602 and the diagnostic stream consumer 604. As noted in the timing pattern 700*b* and the timing pattern 700*c*, the security monitor 614 may examine the receiver time window 1 704 to reveal evidence of a desynchronization event when ACPs are missing when they are otherwise expected. As noted in the timing pattern 700*a*, however, in some cases all of the expected ACPs may be correctly received in the receiver time window 1 704. In these cases, the security monitor 614 may not conclude that the network is operating normally based on this evidence. Instead, the security monitor 614 examines a receiver time window 2 804, which occurs in a second transmit round (or receive round) from the diagnostic stream producer 602, in order to detect evidence of a misalignment and localize a source of the desynchronization time.

Figure 8B:
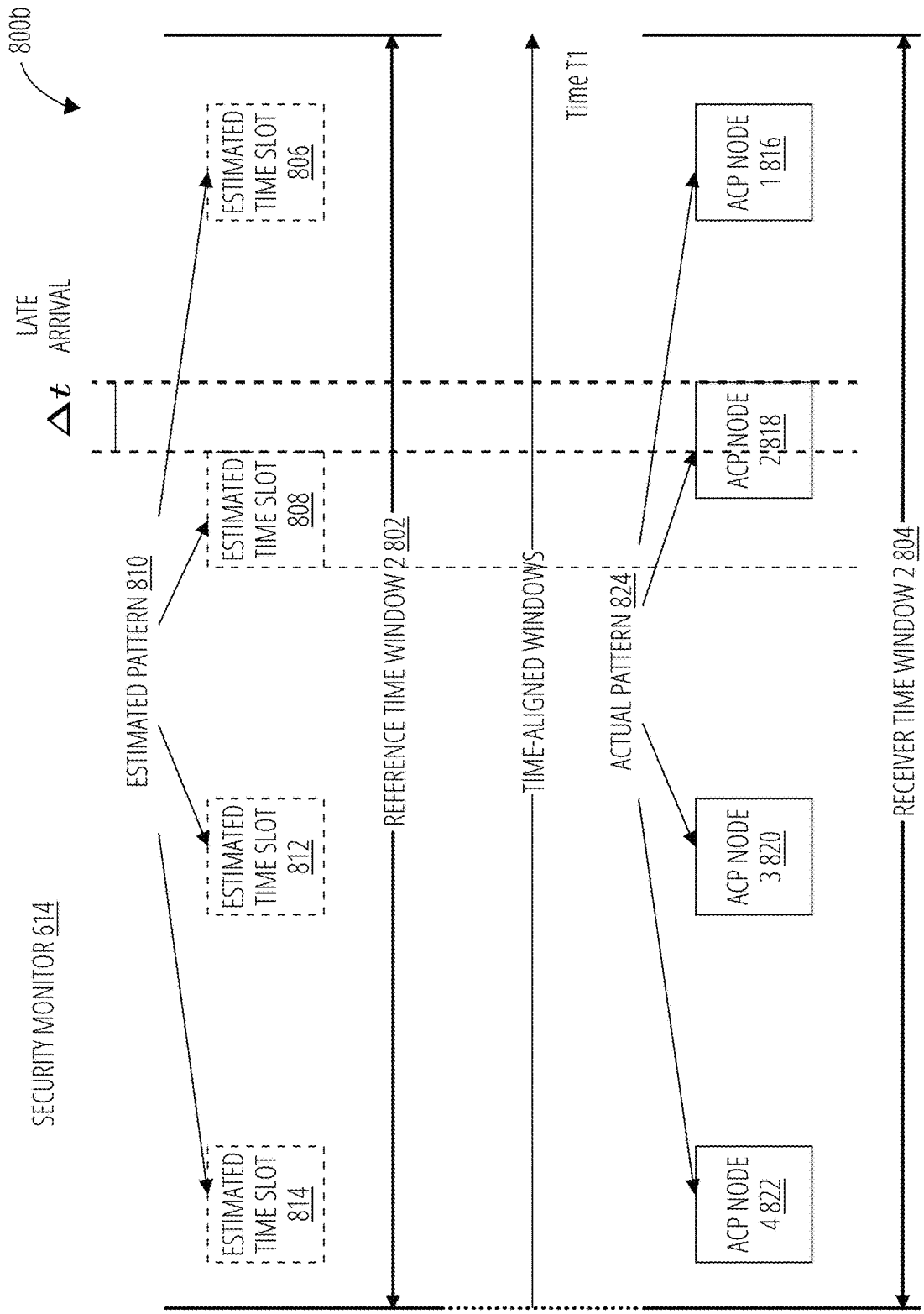
FIG. 8B illustrates an aspect of a timing pattern 800b in accordance with one embodiment.
Figure 8C:
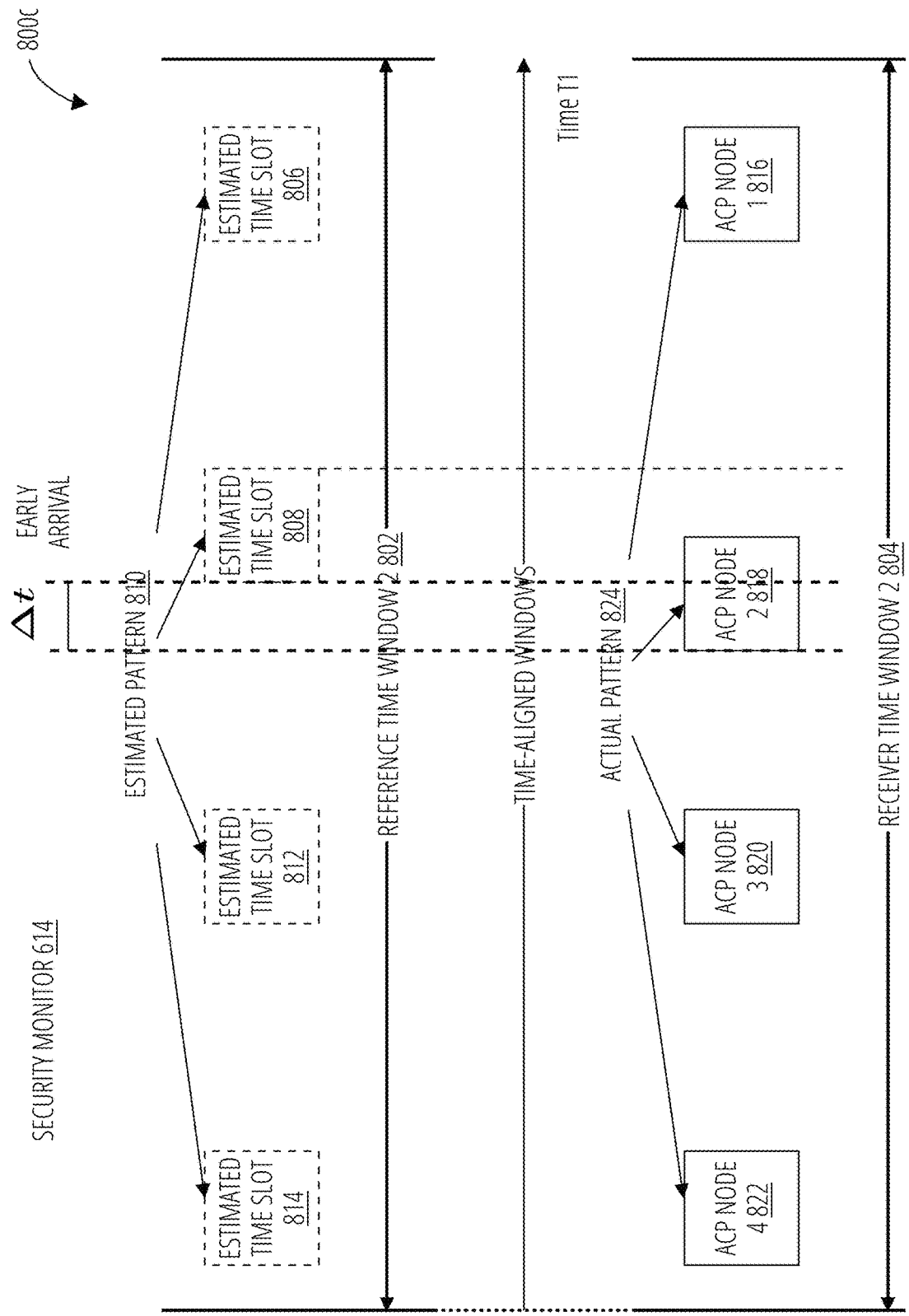
FIG. 8C illustrates an aspect of a timing pattern 800c in accordance with one embodiment.

FIG. 8A through FIG. 8C illustrate a second subset of ACPs 612 from the set of ACPs 612 arriving in a receiver time window 2 804. In general, comparison of the receiver time window 2 804 with the reference time window 2 802 may provide further evidence of time anomalies or misalignments occurring along a network path between the diagnostic stream producer 602 and the diagnostic stream consumer 604. In addition, comparison of the receiver time window 2 804 with the reference time window 2 802 may provide evidence of localization to identify a source for the time anomalies, such as a specific network node experiencing misalignment along the network path between the diagnostic stream producer 602 and the diagnostic stream consumer 604.

To enable the localization capability, a second round of time windows used by the network nodes are organized in such a way that it causes a temporal separation of the ACPs buffered in different locations of the network. The transmit time windows for the network nodes are intentionally offset from each other in time, so that they force a specific transmission time for a transmit (TX) queue of each node, which is slightly off of from its neighboring node. As a result, the receiver time window 2 804 will receive blocks of ACPs 612 that are separated in time and space from each other. Since the security monitor 614 knows the offset schedule for the network nodes, it may use the separation between blocks of ACPs 612 to determine which blocks of ACPs 612 correspond to a given network node based on time measurements between the blocks of ACPs 612 that correspond to a given offset scheduled for each network node.

As depicted in FIG. 8A, the security monitor 614 may receive a second subset of ACPs 612 from the set of ACPs 612 in a second time window, referred to as receiver time window 2 804. The second subset of ACPs 612 may arrive in the receive queue according to an actual pattern 824. The security monitor 614 may determine the actual pattern 824 for the second subset of ACPs 612 received in the receiver time window 2 804. The actual pattern 824 may comprise an actual number of blocks of ACPs 612 in the second subset of ACPs 612, where each block comprises one or more ACPs 612 from the second subset of ACPs 612, and actual receive times (or time slots) when the blocks of ACPs 612 are received in the receiver time window 2 804.

By way of example, as shown in FIG. 8A, the security monitor 614 receives blocks of ACPs 612 comprising up to 4 blocks of ACPs 612, with a start block for each block of ACPs 612 denoted as ACP node 1 through ACP node 4. Each block of ACPs 612 in the second subset of ACPs 612 may comprise one or more ACPs 612 from the second subset of ACPs 612 from the original set of ACPs 612. Each of the start blocks correspond to a network node (or interspace in-between) along a network path between the diagnostic stream producer 602 and the diagnostic stream consumer 604. It may be appreciated that FIG. 8A only illustrates a single ACP 612 in each of the 4 blocks of ACPs 612 for purposes of clarity and not limitation. Each block of ACPs 612 may comprise multiple ACPs 612 in application.

Continuing with the example shown in FIG. 8A, an ACP node 1 816 corresponds to a start block for node 1, which in this case is the diagnostic stream producer 602 or the talker node. An ACP node 2 818 corresponds to a start block for node 2, which in this case is a first intermediate node 660. An ACP node 3 820 corresponds to a start block for node 3, which in this case is a second intermediate node 660. An ACP node 4 822 corresponds to a start block for node 4, which in this case is a third intermediate node 660. The security monitor 614 may comprise part of the diagnostic stream consumer 604, which in this case is node 5 or the listener node.

The security monitor 614 may retrieve an estimated pattern 810 for the second subset of ACPs 612. The estimated pattern 810 may comprise an estimated number of ACPs 612 in the second subset of ACPs 612, and estimated times when blocks of ACPs 612 are received in a reference time window 2 802. The estimated number and times may be generated by collecting statistical data for arrival times of blocks of ACPs 612 during normal (or benign) operations of the TSN 102. Alternatively, estimated number and times for arrival times of blocks of ACPs 612 during normal (or benign) operations of the TSN 102 may be calculated based on known parameters set for the TSN 102.

By way of example, as shown in FIG. 8A, the reference time window 2 802 illustrates an estimated pattern 810 that estimates the security monitor 614 receiving up to 4 blocks of ACPs 612, with an estimated start block (or start time for a start block) for each block of ACPs 612 denoted as an estimated time slot 806 for the ACP node 1 816, an estimated time slot 808 for the ACP node 2 818, an estimated time slot 812 for the ACP node 3 820, and an estimated time slot 814 for the ACP node 4 822.

The security monitor 614 may compare the actual pattern 824 with the estimated pattern 810 to detect a timing difference between the actual pattern 824 and the estimated pattern 810 for the second subset of ACPs 612. In the example shown in FIG. 8A, the actual pattern 824 and the estimated pattern 810 match. In this case, the security monitor 614 expects any blocks of ACPs 612 arriving in the receiver time window 2 804 from a given network node to correspond to one or more of the estimated time slot 806, estimated time slot 808, estimated time slot 812 or estimated time slot 814. For example, the security monitor 614 expects any blocks of ACPs 612 arriving in the receiver time window 2 804 from node 1 to start to arrive in the estimated time slot 806, any blocks of ACPs 612 arriving in the receiver time window 2 804 from node 2 to start to arrive in the estimated time slot 808, any blocks of ACPs 612 arriving in the receiver time window 2 804 from node 3 to start to arrive in the estimated time slot 812, and any blocks of ACPs 612 arriving in the receiver time window 2 804 from node 4 to start to arrive in the estimated time slot 814.

When the security monitor 614 detects that the arriving blocks of ACPs 612 from the second subset of ACPs 612 start at the correct estimated time slot, within some acceptable margin of error represented by a defined threshold, the security monitor 614 does not detect any desynchronization time for transport of the ACPs 612 in the second time window. However, when the security monitor 614 detects that the arriving blocks of ACPs 612 from the second subset of ACPs 612 do not start at the correct estimated time slot, the security monitor 614 does detect desynchronization time for transport of the ACPs 612 in the first time window, as discussed with reference to FIG. 8B and FIG. 8C.

It is worthy to note that a scenario exists where the receiver time window 2 804 does not receive any blocks of ACPs 612 from the second subset of ACPs 612 of the set of ACPs 612 that correspond to ACP node 2 818, ACP node 3 820 or ACP node 4 822, depending on whether offsets are used for transmit windows for associated node 2, node 3 or node 4, respectively, as discussed with reference to FIG. 10. However, in some implementations, the receiver time window 2 804 will always receive at least a single block of ACPs 612 in the receiver time window 2 804 from the diagnostic stream producer 602 (ACP node 1 816). When the diagnostic stream producer 602 generates and transmits a set of ACPs 612 in a first time window scheduled by the CNC, it transmits one ACP from the set of ACPs 612 in a second time window that occurs after the first time window closes. The one ACP is referred to as a reference ACP 826, which is also denoted as ACP node 1 816 or ACP0. The reference ACP 826 allows the security monitor 614 to detect a desynchronization event occurring for the diagnostic stream producer 602, which is also designated as node 1 or a talker node. The reference ACP is an ACP from the set of ACPs 612 denoted as ACP0 that is transmitted in a second time window after the other ACPs 612 1-m are transported in a first time window.

As discussed with reference to FIG. 7A, when the security monitor 614 receives an expected number of ACPs 612 in the receiver time window 1 704, it does not detect any time anomalies. However, at this point, the security monitor 614 does not have sufficient evidence to conclude that there is not a desynchronization event occurring along the network path. Instead, the security monitor 614 examines a receiver time window 2 804, which occurs in a second transmit round (or receive round) from the diagnostic stream producer 602.

When the receiver time window 2 804 indicates that the reference ACP 826 denoted as the ACP node 1 816 is correctly received in the estimated time slot 806, then the security monitor 614 concludes that the diagnostic stream producer 602 (i.e., node 1) is not experiencing a desynchronization event.

When the receiver time window 2 804 indicates that the reference ACP 826 is not correctly received in the estimated time slot 806, then the security monitor 614 concludes that the diagnostic stream producer 602 is under a desynchronization attack. It may quantify an amount of desynchronization time by comparing a start time for the reference ACP 826 to the start time for the estimated time slot 806, and measure any differences to arrive at the amount of desynchronization time. In other words, time of arrival of the reference ACP 826 indicates an amount of desynchronization time. If the diagnostic stream producer 602 is early, then the first subset of ACPs 612 from the set of ACPs 612 will all arrive in the receiver time window 1 704, and the second subset of ACPs 612 will include the reference ACP 826 that will arrive in the reference time window 2 802 earlier than expected. If the diagnostic stream producer 602 is late, then the first subset of ACPs 612 from the set of ACPs 612 will all arrive in the receiver time window 1 704, and the second subset of ACPs 612 will include the reference ACP 826 that will arrive in the receiver time window 2 804 later than expected.

By way of example, the security monitor 614 receives the space-separated blocks of ACPs 612 in the receiver time window 2 804 and compares them with the estimated pattern 810 in the reference time window 2 802. A sequence of nodes in the diagnostic stream 636 along with their corresponding offset schedules determine that the shallowest node (e.g., node 4) block of ACPs arrive first, then the second shallowest and so on. These blocks quantify the time misalignment (Tm) between the node and its ancestor.

In one embodiment, the misalignment is measured in Tacp, which is the time-width of one ACP. Time-width is a function of the ACP bit-width and the channel speed, which is found as follows: Tacp ACP bitwidth Channel bps. For node 4 ACPs 612, misalignment between node 4 and node 3 in time is: $0<Tm\leq Tacp$. For node 3 ACPs 612, misalignment between node 3 and node 2 in time is: $Tacp<Tm\leq 2$ Tacp. For node 2 ACPs 612, time misalignment between node 2 and node 1 in time is between $2\ Tacp<Tm\leq 3$ Tacp. For node 1 ACP0, ACP0 provides a time reference to the packets received, as it is transmitted in the second time window and does not suffer time impact of buffering of first time windows.

FIG. 8B illustrates a second timing pattern 800b. A security monitor 614 may use the timing pattern 800b to detect, quantify and localize desynchronization time for one or more network nodes in a network path between a diagnostic stream producer 602 and a diagnostic stream consumer 604 based on an examination of arrival times for a set of ACPs 612 at the security monitor 614.

As discussed with reference to FIG. 7B and FIG. 7C, when the security monitor 614 does not receive an expected number of ACPs 612 in the receiver time window 1 704, it detects a time anomaly (early or late) is occurring somewhere along the network path between the diagnostic stream producer 602 and the diagnostic stream consumer 604. At this point, it may quantify an amount of desynchronization time based on a number of missing ACPs 612. However, it is unable to localize a source of the desynchronization time. Instead, the security monitor 614 examines a receiver time window 2 804, which occurs in a second transmit round (or receive round) from the diagnostic stream producer 602 to localize a source of the desynchronization time.

The timing pattern 800b is similar to the timing pattern 800a. However, unlike the timing pattern 800a, the security monitor 614 analyzes the timing pattern 800b and notes a timing difference relative to the estimated pattern 810. The timing of arrival of the missing ACPs from the receiver time window 1 704 that instead arrive in the receiver time window 2 804 reveals which network node is misaligned. In this example, an ACP node 2 818 which is a first block from a block of ACPs 612 that corresponds to ACPs 612 transmitted from node 2 arrives later than the estimated time slot 808, as denoted by $\Delta t$. The security monitor 614 notes the timing difference, and concludes the source of the desynchronization time is node 2. The security monitor 614 may perform similar operations using the receiver time window 2 804 and the reference time window 2 802 to localize desynchronization time to other network nodes as well.

FIG. 8C illustrates a third timing pattern 800c. A security monitor 614 may use the timing pattern 800c to detect, quantify and localize desynchronization time for one or more network nodes in a network path between a diagnostic stream producer 602 and a diagnostic stream consumer 604 based on an examination of arrival times for a set of ACPs 612 at the security monitor 614.

The timing pattern 800c is similar to the timing pattern 800a. However, unlike the timing pattern 800a, the security monitor 614 analyzes the timing pattern 800c and notes a timing difference relative to the estimated pattern 810. The timing of arrival of the missing ACPs from the receiver time window 1 704 that instead arrive in the receiver time window 2 804 reveals which network node is misaligned. In this example, an ACP node 2 818 which is a first block from a block of ACPs 612 that corresponds to ACPs 612 transmitted from node 2 arrives earlier than the estimated time slot 808, as denoted by $\Delta t$. The security monitor 614 notes the timing difference, and concludes the source of the desynchronization time is node 2. The security monitor 614 may perform similar operations using the receiver time window 2 804 and the reference time window 2 802 to localize desynchronization time to other network nodes as well.

In summary, the security monitor 614 may analyze patterns for a receive queue to detect desynchronization events that occur in network nodes along a network path between a diagnostic node diagnostic stream producer 602 and a diagnostic stream consumer 604. If a single node is affected, the security monitor 614 can identify which nodes are not synchronized based on a set of scheduled windows with ACP diagnostic traffic that presents distinct patterns. In case of attacks, it is also possible that desynchronization may impact multiple nodes downstream. It is possible to verify if a sender is time-synchronized, and if not, whether the sender is early or late. If the sender is time-synchronized, the security monitor 614 can identify whether intermediate nodes are early or late, but not necessarily which node. If the sender is early, the security monitor 614 may not be capable of affirming anything about the intermediate nodes. If the sender is late, however, the security monitor 614 can affirm which intermediate node is also late.

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. Moreover, not all acts illustrated in a logic flow may be required in some embodiments. In addition, the given logic flow may be implemented by a hardware element, a software element executed by a processor, or any combination thereof. The embodiments are not limited in this context.

Figure 9A:
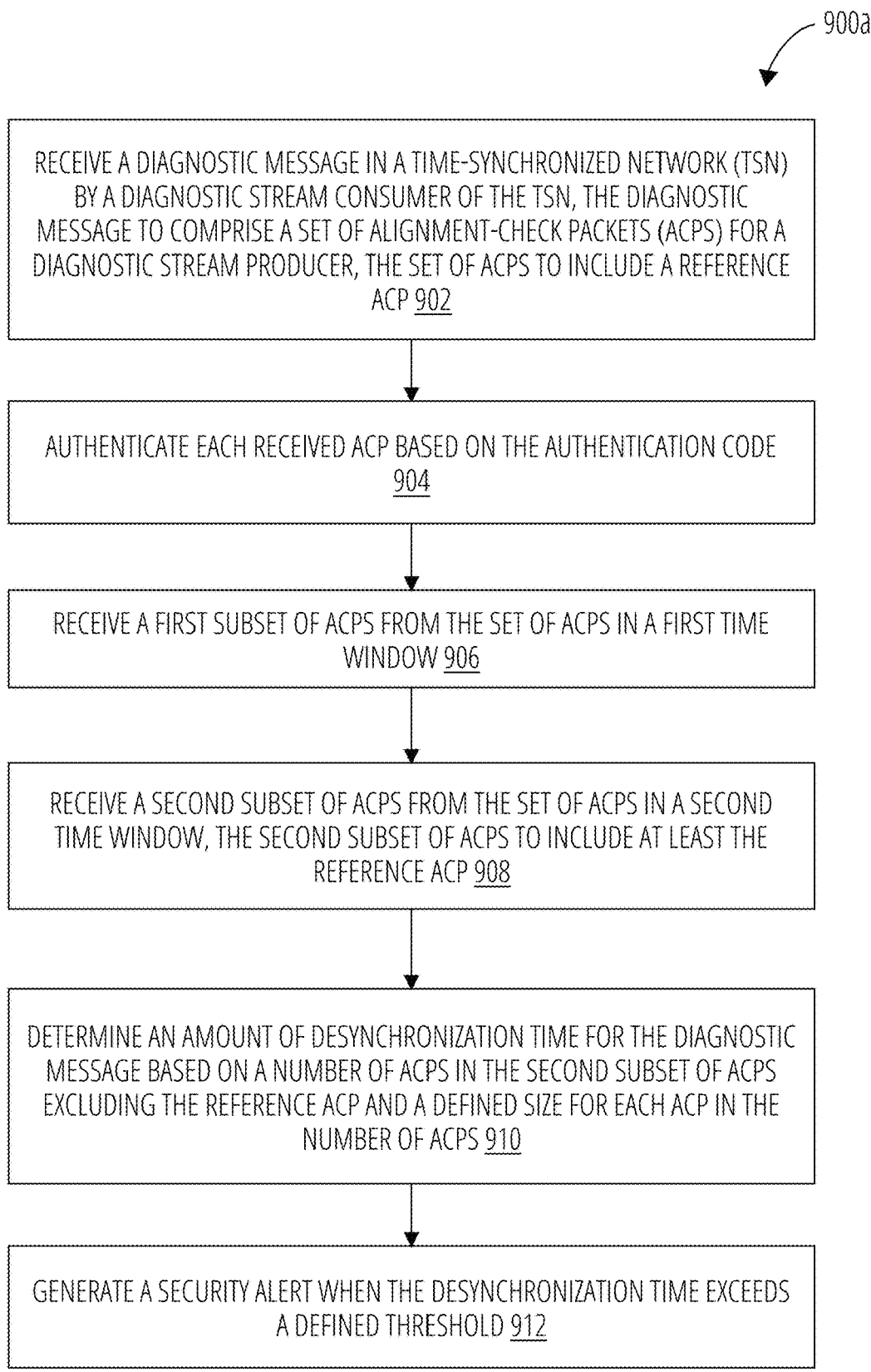
FIG. 9A illustrates a logic flow 900a in accordance with one embodiment.

FIG. 9A illustrates an embodiment of a logic flow 900*a*. The logic flow 900*a* may be representative of some or all of the operations executed by one or more embodiments described herein. For example, the logic flow 900*a* may include some or all of the operations performed by devices or entities within the TSNs 102, 200 or 300, the TSN node 104, the IDS 110, the apparatus 400, the apparatus 500, and/or the systems 600*a*, 600*b*. More particularly, the logic flow 900*a* illustrates an example where a diagnostic stream consumer 604 receives a diagnostic stream 636 or a unified stream 638 transporting diagnostic information for one or more TSN nodes 104, and analyzes the diagnostic information to determine whether the one or more TSN nodes 104 are under a security attack based on the analysis.

In block 902, logic flow 900*a* receives a diagnostic message in a time-synchronized network (TSN) by a diagnostic stream consumer of the TSN, the diagnostic message to comprise a set of alignment-check packets (ACPs) for a diagnostic stream producer, the set of ACPs to include a reference ACP For example, a diagnostic stream consumer 604 receives a diagnostic message 642 in a TSN 102. The diagnostic message 642 comprises a set of one or more ACPs 612. The set of ACPs 612 include a first node ACP from a first set of ACPs 612 associated with a first TSN node 104 in the TSN 102. The first TSN node 104 may comprise, for example, a diagnostic stream producer 602. The first node ACP carries diagnostic information associated with the first TSN node. The diagnostic information comprises a node identifier for the first TSN node, an ACP sequence number for the first TSN node, and an authentication code for the first TSN node. The first node ACP has a defined size by TSN protocol design. For instance, assume the diagnostic stream producer 602 transmits 10 ACPs 612 denoted by ACP 1 through ACP 10 in a first time window 662. Further assume the diagnostic stream producer 602 transmits one ACP 612 denoted by ACP 0 in a second time window 662. The ACP 0 is a reference ACP that may be used to localize which node in a network path between the diagnostic stream producer 602 and the diagnostic stream consumer 604 is under attack.

In block 906, logic flow 900*a* authenticates each received ACP based on the authentication code. For example, a cryptographic engine 618 for the diagnostic stream consumer 604 may authenticate the first ACP based on the authentication code in the first ACP. Failed authentication operations may localize which TSN node 104 is under attack, such as when ACPs are forged, as previously discussed.

In block 908, logic flow 900*a* receives a first subset of ACPs from the set of ACPs in a first time window. For example, the security monitor 614 for the diagnostic stream consumer 604 may determine a number of ACPs from the first set of ACPs 612 associated with the first TSN node 104 that were received within a first time window 662 associated with the first TSN node 104 based on the ACP sequence number of the first node ACP, when the ACP sequence number is the lowest ACP sequence number of the first set of ACPs 612 transmitted by the diagnostic stream producer 602 and received by the diagnostic stream consumer 604. For instance, assume the diagnostic stream producer 602 transmits 10 ACPs 612 denoted by ACP 1 through ACP 10 in the time window 662. The diagnostic stream consumer 604 only receives 5 ACPs 612 denoted 6-10 in the time window 662, the first node ACP will have a lowest ACP sequence number of 6. In this example, the security monitor 614 will calculate a number of 5 ACPs 612 (e.g., ACPs 6 through 10) that were received within the first time window 662 by the diagnostic stream consumer 604.

In block 910, logic flow 900*a* receives a second subset of ACPs from the set of ACPs in a second time window, the second subset of ACPs to include at least the reference ACP. For example, the security monitor 614 knows that it received 5 ACPs 612 (e.g., ACPs 6 through 10) in the first time window 662, and monitors the second time window 662 to determine whether it receives the remaining 5 ACPs 612 (e.g., ACPs 1 through 5). In addition, the security monitor 614 monitors the second time window 662 to determine whether it receives the ACP 0, which is the reference ACP.

In block 912, logic flow 900*a* determines an amount of desynchronization time for the diagnostic message based on a number of ACPs in the second subset of ACPs excluding the reference ACP and a defined size for each ACP in the number of ACPs. For example, since the security monitor 614 knows that each ACP 612 has a defined size, and it knows a communications speed of the TSN 102, the security monitor 614 may calculate an estimated time value associated with each ACP 612 received in the second time window 662. For instance, if there were originally 10 ACPs 612 (e.g., m=10) transmitted and only 5 ACPs 612 were received within the first time window 662 (e.g., received ACPs 620 where q=5), this means 5 ACPs 612 were received outside of the first time window 662 and within the second (or subsequent) time window 662 (e.g., m−q=10−5=5 ACPs 612). In this case, the security monitor 614 will calculate a time value for the 5 ACPs 612, which when summed equal to the amount of time (e.g., a desynchronization time) that the first TSN node 104 has desynchronized.

In block 914, logic flow 900*a* generates a security alert when the desynchronization time exceeds a defined threshold. For example, the security monitor 614 may compare the desynchronization time with a defined threshold value, and output a control signal to an alert generator 616 for the diagnostic stream consumer 604. The alert generator 616 may generate an alert and initiate security protocols to take corrective actions in response to the alert.

Figure 9B:
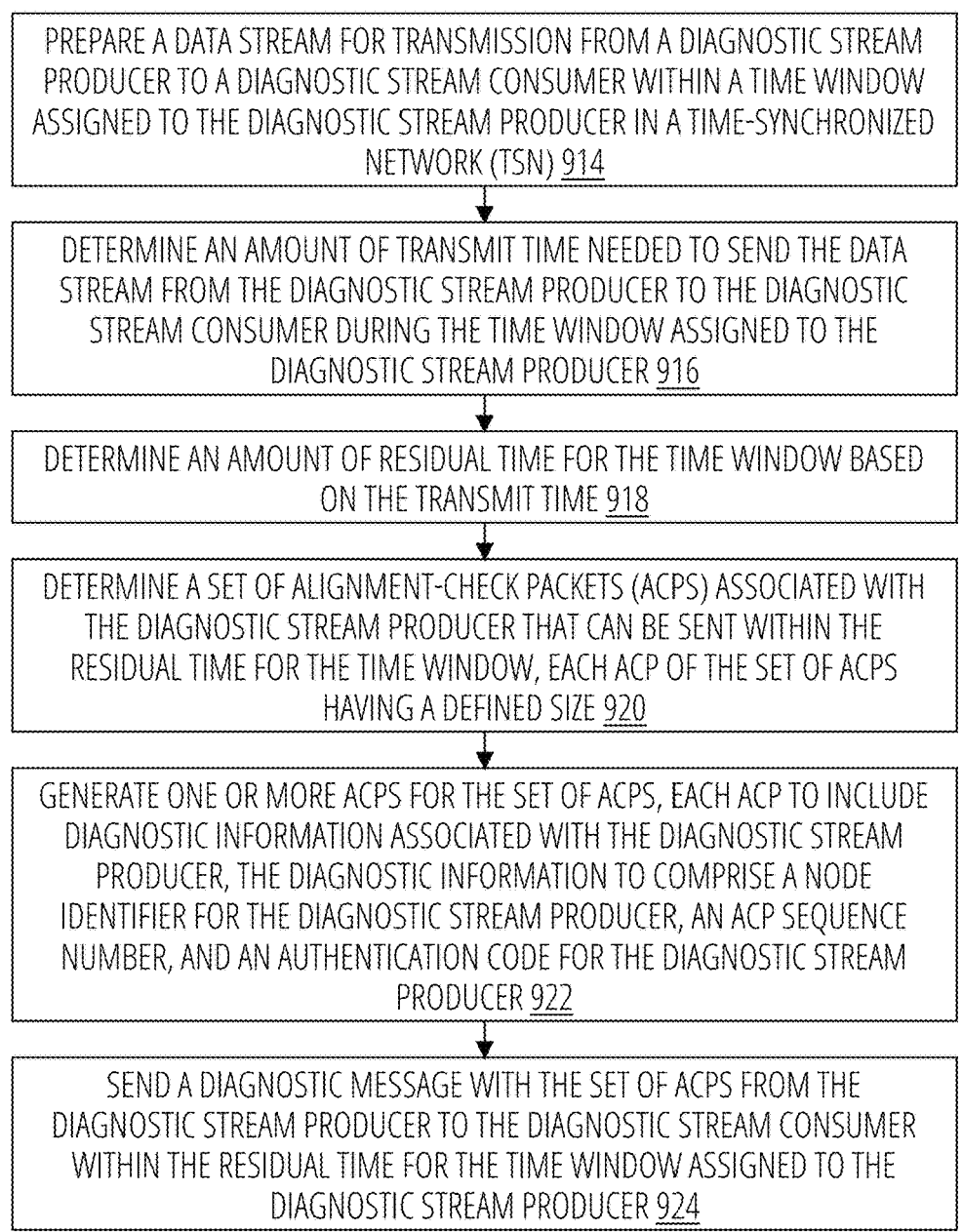
FIG. 9B illustrates a logic flow 900b in accordance with one embodiment.

FIG. 9B illustrates an embodiment of a logic flow 900*b*. The logic flow 900*b* may be representative of some or all of the operations executed by one or more embodiments described herein. For example, the logic flow 900*b* may include some or all of the operations performed by devices or entities within the TSNs 102, 200 or 300, the TSN node 104, the IDS 110, the apparatus 400, the apparatus 500, and/or the systems 600a, 600b. More particularly, the logic flow 900b illustrates an example where a diagnostic stream producer 602 sends a unified stream 638 transporting diagnostic information for one or more TSN nodes 104 to a diagnostic stream consumer 604. The diagnostic stream consumer 604 may analyze the diagnostic information to determine whether the one or more TSN nodes 104 are under a security attack based on the analysis.

In block 914, logic flow 900b prepares a data stream for transmission from a diagnostic stream producer to a diagnostic stream consumer within a time window assigned to the diagnostic stream producer in a time-synchronized network (TSN). For example, a diagnostic stream producer 602 may prepare a data stream 634 for transmission from the diagnostic stream producer 602 to a diagnostic stream consumer 604 within a time window 670 assigned to the diagnostic stream producer 602 in the TSN 102. In one embodiment, the CNC may assign the time window 662 to the diagnostic stream producer 602 and other TSN nodes 104 within the TSN 102 during a provisioning phase for the TSN nodes 104 in the TSN 102 and prior to a normal operating phase for the TSN nodes 104 in the TSN 102, e.g., before transmitting the data stream 634. In one embodiment, the CNC may dynamically assign the time window 662 during the operating phase of the TSN 102 using an update procedure for the TSN protocol.

In block 916, logic flow 900b determines an amount of transmit time needed to send the data stream from the diagnostic stream producer to the diagnostic stream consumer during the time window assigned to the diagnostic stream producer. For example, the ACP generator 608 for the diagnostic stream producer 602 may determine an amount of transmit time/needed to send the data stream 634 from the diagnostic stream producer 602 to the diagnostic stream consumer 604 during the time window 662 assigned to the diagnostic stream producer 602.

In block 918, logic flow 900b determines an amount of residual time for the time window based on the transmit time. For example, the ACP generator 608 may determine an amount of residual time r for the time window 662 having a time interval T based on the transmit time t, where T−t=r.

In block 920, logic flow 900b determines a set of alignment-check packets (ACPs) associated with the diagnostic stream producer that can be sent within the residual time for the time window, each ACP of the set of ACPs having a defined size. For example, the ACP generator 608 may determine a set of ACPs 612 1 through m associated with the diagnostic stream producer 602 that can be sent within the residual time r for the time window 662, each ACP 612 of the set of ACPs 612 having a defined size according to a given TSN protocol.

In block 922, logic flow 900b generates one or more ACPs for the set of ACPs, each ACP to include diagnostic information associated with the diagnostic stream producer, the diagnostic information to comprise a node identifier for the diagnostic stream producer, an ACP sequence number, and an authentication code for the diagnostic stream producer. The ACP generator 608 may generate one or more ACPs 612 for the set of ACPs 612, each ACP 612 to include diagnostic information associated with the diagnostic stream producer 602. The diagnostic information may comprise a node identifier for the diagnostic stream producer 602, an ACP sequence number, and an authentication code for the diagnostic stream producer 602.

In block 924, logic flow 900b sends a diagnostic message with the set of ACPs from the diagnostic stream producer to the diagnostic stream consumer within the residual time for the time window assigned to the diagnostic stream producer. For example, the diagnostic stream producer 602 may send a diagnostic message 642 with the set of ACPs 612 from the diagnostic stream producer 602 to the diagnostic stream consumer 604 within the residual time r for the time window 662 assigned to the diagnostic stream producer 602. The diagnostic stream producer 602 may also send an additional ACP 612 as a reference ACP in a subsequent time window 662.

Figure 9C:
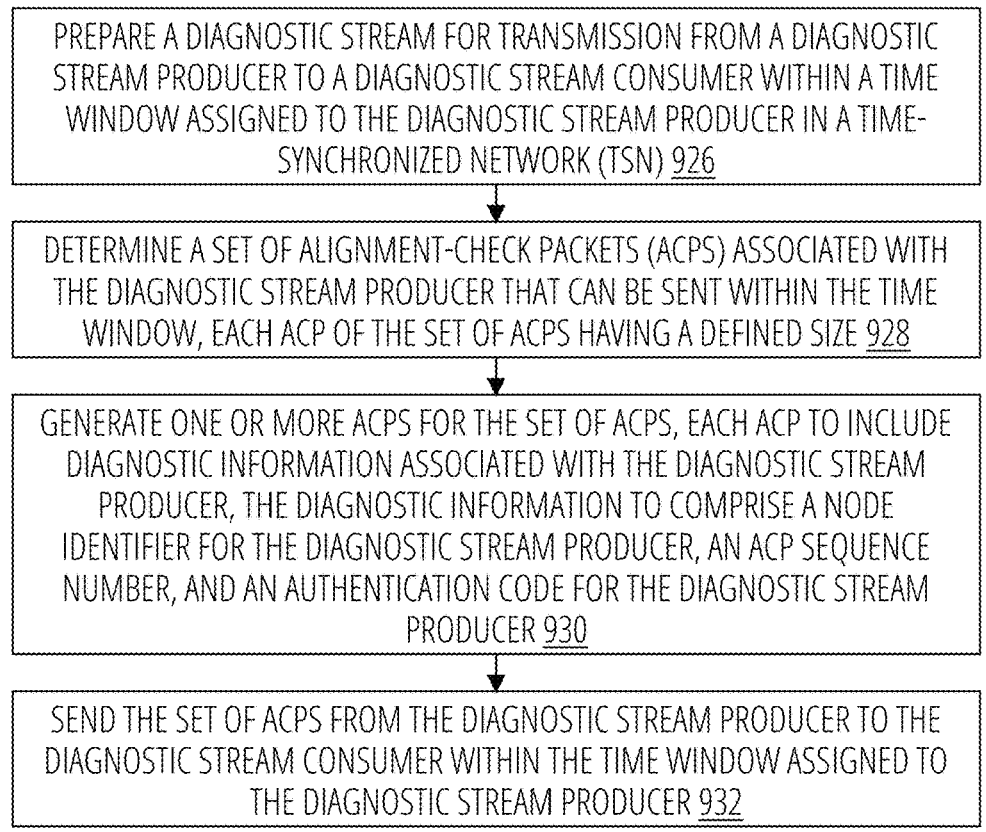
FIG. 9C illustrates a logic flow 900c in accordance with one embodiment.

FIG. 9C illustrates an embodiment of a logic flow 900c. The logic flow 900c may be representative of some or all of the operations executed by one or more embodiments described herein. For example, the logic flow 900c may include some or all of the operations performed by devices or entities within the TSNs 102, 200 or 300, the TSN node 104, the IDS 110, the apparatus 400, the apparatus 500, and/or the systems 600a, 600b. More particularly, the logic flow 900c illustrates an example where a diagnostic stream producer 602 sends a diagnostic stream 636 transporting diagnostic information for one or more TSN nodes 104 to a diagnostic stream consumer 604. The diagnostic stream consumer 604 may analyze the diagnostic information to determine whether the one or more TSN nodes 104 are under a security attack based on the analysis.

In block 926, logic flow 900c prepares a diagnostic stream for transmission from a diagnostic stream producer to a diagnostic stream consumer within a time window assigned to the diagnostic stream producer in a time-synchronized network (TSN). For instance, a diagnostic stream producer 602 may prepare a diagnostic stream 636 for transmission from the diagnostic stream producer 602 to a diagnostic stream consumer 604 within a time window 662 assigned to the diagnostic stream producer 602 in TSN 102.

In block 928, logic flow 900c determines a set of alignment-check packets (ACPs) associated with the diagnostic stream producer that can be sent within the time window, each ACP of the set of ACPs having a defined size. For example, the ACP generator 608 of the diagnostic stream producer 602 may determine a set of ACPs 612 associated with the diagnostic stream producer 602 that can be sent within the time window 662, each ACP 612 of the set of ACPs 612 having a defined size or bit-width.

In block 930, logic flow 900c generates one or more ACPs for the set of ACPs, each ACP to include diagnostic information associated with the diagnostic stream producer, the diagnostic information to comprise a node identifier for the diagnostic stream producer, an ACP sequence number, and an authentication code for the diagnostic stream producer. For example, the ACP generator 608 may generate one or more ACPs 612 for the set of ACPs 612, each ACP 612 to include diagnostic information associated with the diagnostic stream producer 602, the diagnostic information to comprise a node identifier for the diagnostic stream producer 602, an ACP sequence number, and an authentication code for the diagnostic stream producer 602.

In block 932, logic flow 900c sends the set of ACPs from the diagnostic stream producer to the diagnostic stream consumer within the time window assigned to the diagnostic stream producer. For instance, the interface 626 of the diagnostic stream producer 602 may send the set of ACPs 612 from the diagnostic stream producer 602 to the diagnostic stream consumer 604 within the time window 662 assigned to the diagnostic stream producer 602.

Figure 10:
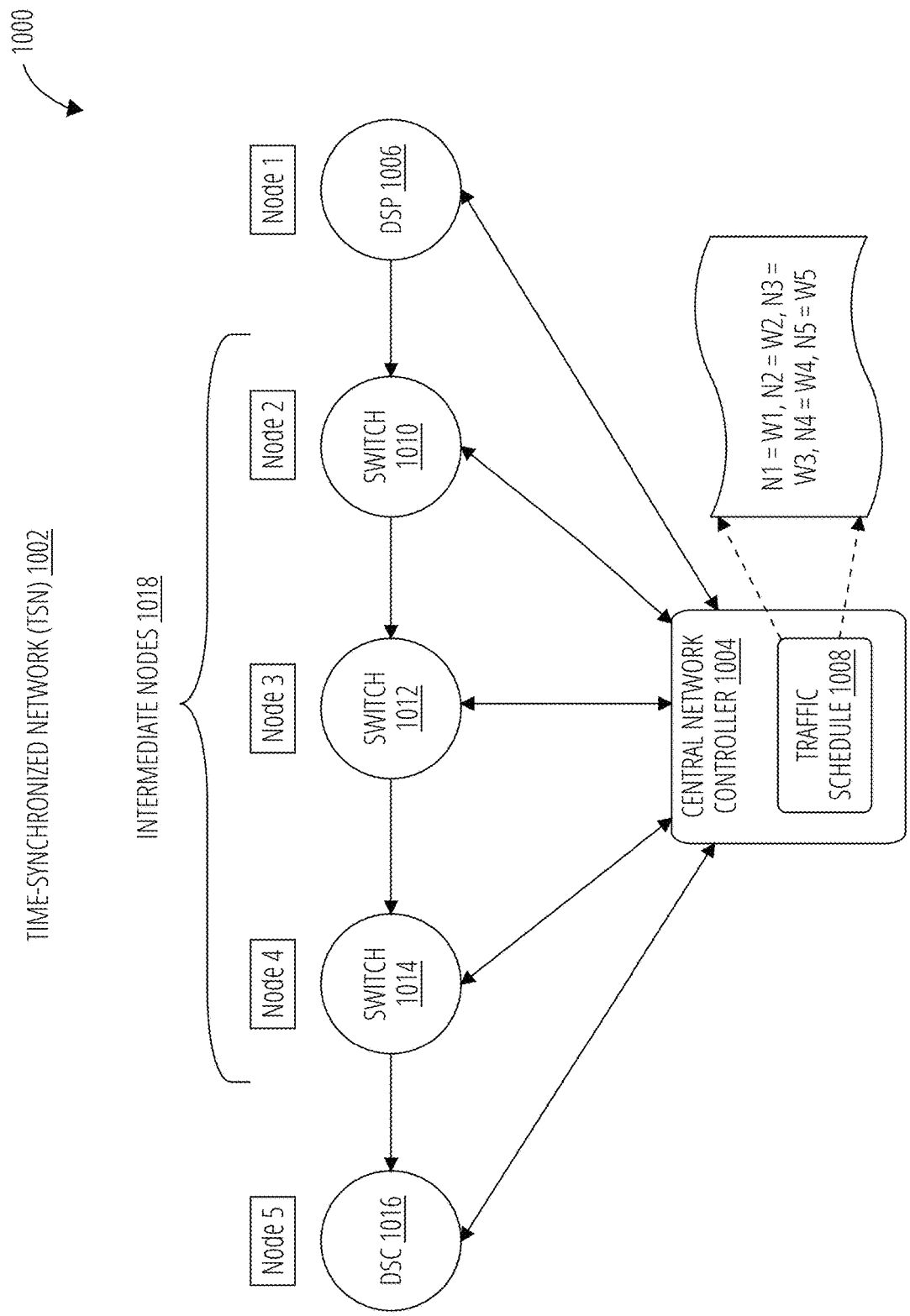
FIG. 10 illustrates an aspect of an operating environment 1000 in accordance with one embodiment.

FIG. 10 illustrates an operating environment 1000 for the TSN 1002 implementing one or more TSN protocols, such as IEEE 802.1Qbv, for example. IEEE 802.1Qbv defines traffic scheduling for a set of network nodes 1 through 5 of the TSN 1002. The first TSN node 1 of the TSN 1002 may correspond to a diagnostic stream producer 1006. The fifth TSN node 5 of the TSN 1002 may correspond to a diagnostic stream consumer 1016. The second, third and fourth TSN nodes 2 through 4 may correspond to switch 1010, switch 1012 and switch 1014, respectively.

A central network controller 1004 distributes a traffic schedule 1008 to TSN nodes 1 through 5. The traffic schedule 1008 includes a time window assigned to each node 1 through 5. For instance, nodes (N) 1 through 5 may be assigned time windows (W) 1 through 5, respectively. Since the traffic schedule 1008 is distributed to all the nodes 1 through 5, each of nodes 1 through 5 knows an assigned time window W1 through W5 for all nodes 1 through 5 in the TSN 102. This means each of nodes 1 through 5 can monitor an assigned time window W1 through W5 for any of the nodes 1 through 5, albeit using its own local clock.

The traffic schedule 1008 may further include a set of parameters 1-P for each of the nodes N1 through N5, where P represents any positive integer. Examples of parameters may include offset (O) values for each of the assigned time windows W1 through W5 in accordance with a phased schedule. The offset values may represent an amount of link delay (LD) and/or switch delay (SD) incurred by the ACPs 612 as they traverse a network path between the diagnostic stream producer 1006 and the diagnostic stream consumer 1016. Each of the nodes N1 through N5 may use the offset values to offset time windows W1 through W5.

For instance, assume the diagnostic stream producer 1006 of TSN node 1 is assigned a time window W1. Each of the TSN nodes 2 through 5 may use the time window W1 when receiving and transmitting ACPs 612 generated by the diagnostic stream producer 1006. Further, each of the intermediate nodes, such as TSN nodes 2 through 4, may use an offset value O1 through O3 assigned to each of the TSN nodes 2 through 4 to modify the time window W1 of the diagnostic stream producer 1006. For example, TSN node 2 may use the offset value O1 to modify a first time window W1 of the diagnostic stream producer 1006, TSN node 3 may use the offset value O2 to modify the first time window W1 of the diagnostic stream producer 1006, and TSN node 4 may use the offset value O3 to modify the first time window W1 of the diagnostic stream producer 1006. The intermediate nodes N2 through N4 can use the offset values to offset LD and SD associated with each of the intermediate nodes N2 through N4 when forwarding the ACPS 612. This ensures that all the ACPs 612 are received within a single time window W1 at the diagnostic stream consumer 604.

Another example of parameters may include reverse offset (RO) values for each of the assigned time windows W1 through W5 in accordance with a reverse offset schedule. The reverse offset values may represent an amount of planned delay between nodes N1 through N2 incurred by a reference ACP of the ACPs 612 as they traverse a network path between the diagnostic stream producer 1006 and the diagnostic stream consumer 1016. Each of the nodes N1 through N5 may use the reverse offset values to offset time windows W1 through W5.

For instance, assume the diagnostic stream producer 1006 of TSN node 1 is assigned a time window W1. Each of the TSN nodes 2 through 5 may use a first time window W1 when receiving and transmitting ACPs 612 generated by the diagnostic stream producer 1006. However, in some embodiments, an ACP 612 such as a reference ACP is intentionally transmitted in a second time window W1 by the diagnostic stream producer 1006 rather than the first time window W1. The diagnostic stream consumer 1016 may use the reference ACP to localize desynchronization time or a desynchronization event to a particular network node N1 through N5. Further, an attack may introduce latency that may cause some of the ACPs 612 to move from the first time window W1 to the second time window W1. The reverse offset parameter ensures a time (or space) separation between blocks of ACPs transported by each of the intermediate nodes, such as TSN nodes 2 through 4. The diagnostic stream consumer 1016 may use the separation between blocks of ACPs to localize which of the intermediate nodes N2 through N4 are under a desynchronization attack and therefore the source of the desynchronization time.

Each of the intermediate nodes, such as TSN nodes 2 through 4, may use a reverse offset value RO1 through RO3 assigned to each of the TSN nodes 2 through 4 to modify a second time window W1 of the diagnostic stream producer 1006. For example, TSN node 2 may use the reverse offset value RO1 to modify the second time window W1 of the diagnostic stream producer 1006, TSN node 3 may use the reverse offset value RO2 to modify the second time window W1 of the diagnostic stream producer 1006, and TSN node 4 may use the reverse offset value RO3 to modify the second time window W1 of the diagnostic stream producer 1006. The intermediate nodes N2 through N4 can use the reverse offset values to offset when each of the intermediate nodes N2 through N4 forwards the reference ACP from the diagnostic stream producer 1006. This ensures that the reference ACP is received within a second time window W1 at the diagnostic stream consumer 604. Further, the intermediate nodes N2 through N4 can use the reverse offset values to offset when each of the intermediate nodes N2 through N4 forwards the ACPs from the diagnostic stream producer 1006 that are received in the second time window W1.

It may be appreciated that the pattern of schedules, with offsets and/or reverse offsets, opens up space between the late ACPs 612 of different nodes. This allows the security monitor 614 to know, based on a spacing between blocks of ACPs 612, which TSN node sent which late set of ACPs 612 relative to the expected slot, which therefore enables localization. A defined amount of offset and reverse offset are not necessarily the same. The offset is there to compensate for LD and SD. The reverse offset is to open up space between blocks of ACPs 612 arriving at the security monitor 614 to be able to perform localization operations.

Figure 11:
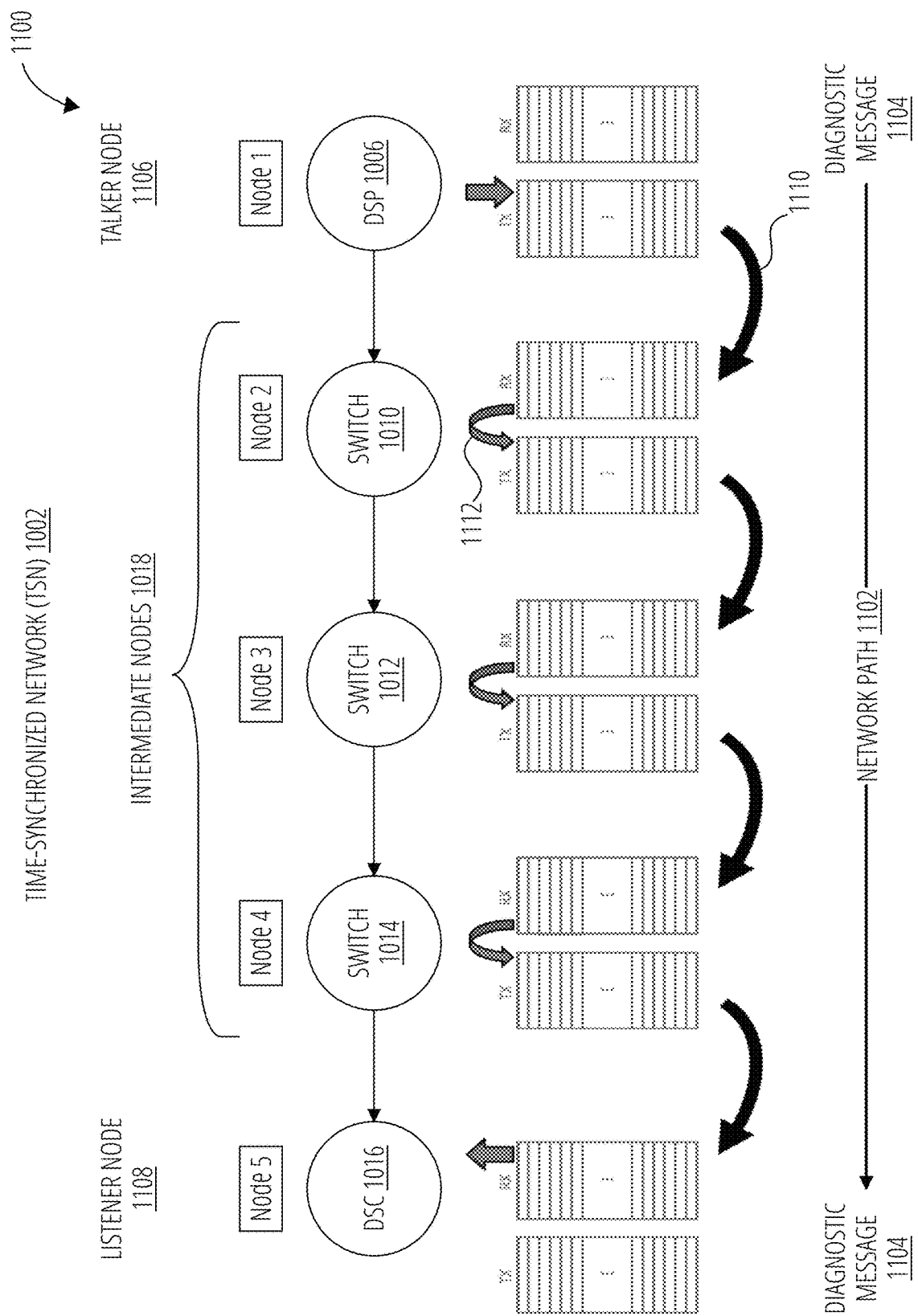
FIG. 11 illustrates an aspect of an operating environment 1100 in accordance with one embodiment.

FIG. 11 illustrates an operating environment 1100 for an exemplary TSN 1002 implementing one or more TSN protocols. The TSN 1002 may comprise 5 TSN nodes labeled node 1, node 2, node 3, node 4 and node 5. Node 1 may comprise a diagnostic stream producer 1006. Node 2 may comprise a switch 1010. Node 3 may comprise a switch 1012. Node 4 may comprise a switch 1014. Node 5 may comprise a diagnostic stream consumer 1016. Node 2 through node 4 may comprise intermediate nodes 1018 implemented as time-synchronized switches.

As depicted in FIG. 11, the diagnostic stream producer 1006 may operate as a talker node 1106 and the diagnostic stream consumer 1016 may operate as a listener node 1108. Additionally, the diagnostic stream consumer 1016 may include a monitor, such as security monitor 614. Alternatively, the diagnostic stream consumer 1016 may be protected by an IDS 110 implementing the security monitor 614.

The diagnostic stream producer 1006 may generate a diagnostic message 1104 for transport as a diagnostic stream 636 to the diagnostic stream consumer 1016 over a network path 1102 that includes a set of intermediate nodes 1018 such as the switch 1010, the switch 1012 and the switch 1014. The diagnostic message 1104 may include a set of ACPs 612. The intermediate nodes 1018 forward the diagnostic message 1104 along the network path 1102 using receive (RX) queues to receive the ACPs 612 and transmit (TX) queues to transmit the ACPs 612. Each hop along the network path 1102 may introduce a certain amount of expected latency or delay, such as link delay 1110 and switch delay 1112. LD 1110 is naturally occurring propagation delays of the signal in the network media. SD 1112 is naturally occurring internal delay as each switch processes the ACPs 612 for forwarding. Consequently, the diagnostic stream producer 1006 may transmit the ACPs 612 in a single time window 662 assigned to it and the diagnostic stream consumer 1016 may receive the ACPs 612 in multiple sequential time windows 662 assigned to it. Accordingly, it may be difficult for the diagnostic stream consumer 1016 to ascertain whether the accumulated delay occurs naturally or is due to a desynchronization attack.

Embodiments implement a schedule that opens a direct channel between the talker node 1106 and the listener node 1108 (e.g., with a security monitor 614). Under benign conditions, all ACPs 612 are forwarded, and nothing is left behind. However, whenever an attack is launched and misalign one node (or multiple of nodes), the time window W1 will close sooner or later than expected. As a consequence, the diagnostic stream 636 will suffer an impact that indicates an ongoing anomaly. More precisely, under the attack conditions the ACPs 612 will start to be buffered and lagging behind. The security monitor 614 at the receiving end will notice that not all expected set of ACPs 612 of the diagnostic stream 636 arrived, which informs that misalignment is occurring in the scheduled traffic.

Figure 12:
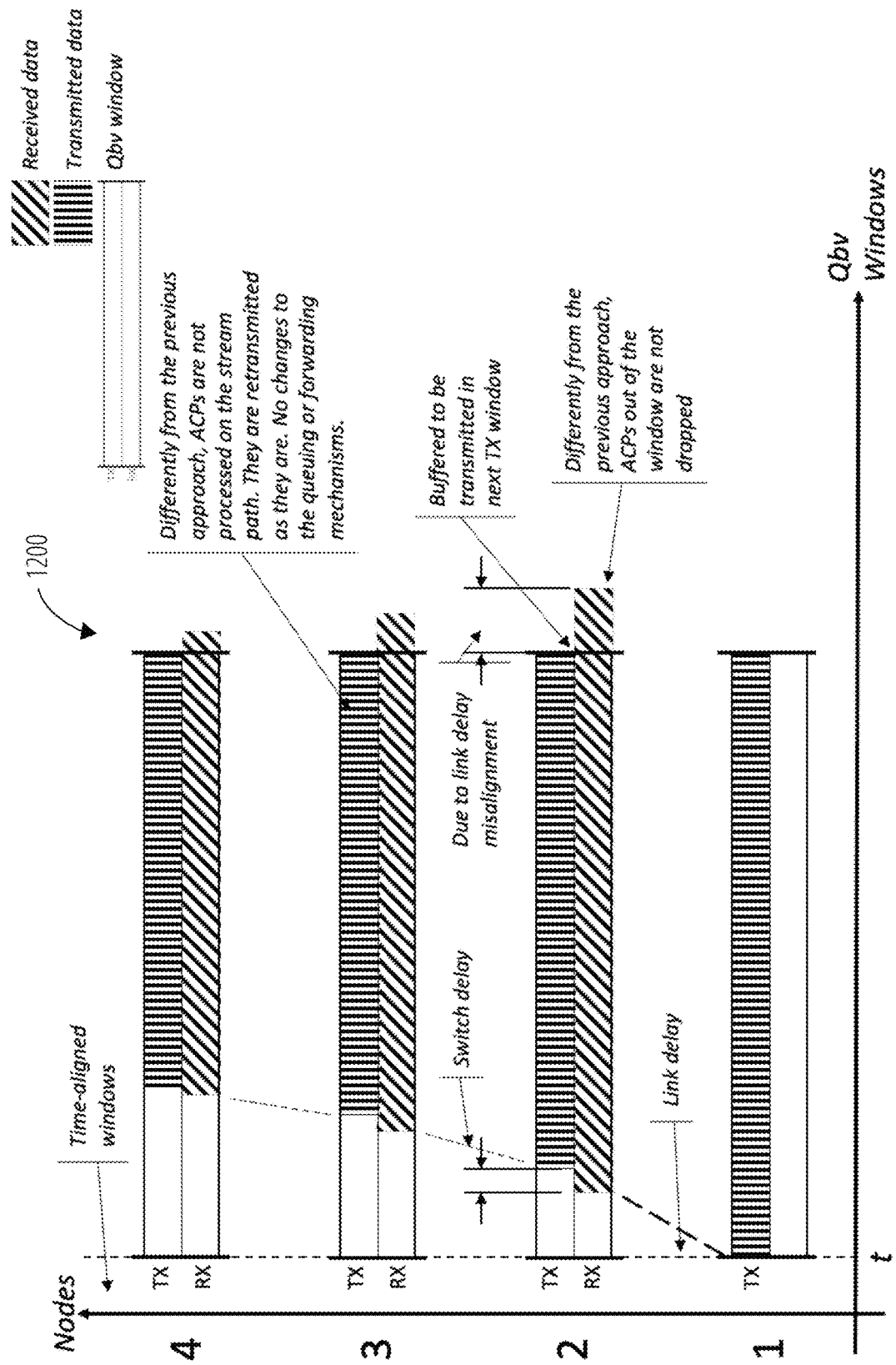
FIG. 12 illustrates an aspect of an operating environment 1200 in accordance with one embodiment.

FIG. 12 illustrates an operating environment 1200. The operating environment 1200 illustrates stream propagation losses during normal or benign operation of the TSN 1002.

Assume for example a set of 4 nodes N1 through N4 and a time-aligned set of 802.1Qbv windows at time t. The lower part of the 802.1Qbv windows represents the RX window of the node, whereas the upper part represents the TX window. Node 1 fills the entire window with packets for transmission, illustrated by vertical hatched areas. This traffic is sent to node 2 and faces some link delay. The traffic fills the RX buffer of node 2. The data also suffers a delay within node 2 (switch delay) until it is moved into its TX queue. Note that most, but not all data will be transmitted immediately in this round of 802.1Qbv windows. Node 2 transmits to node 3 all data that fits within its Qbv window. Node 3 does the same, and so on, until the data arrives at the security monitor 614 (not shown) right after node 4. Notice that all the traffic that was not transmitted within the 802.1Qbv window of the node is buffered, and it is transmitted in the next round of 802.1 Qbv windows. This is shown in FIG. 13.

Figure 13:
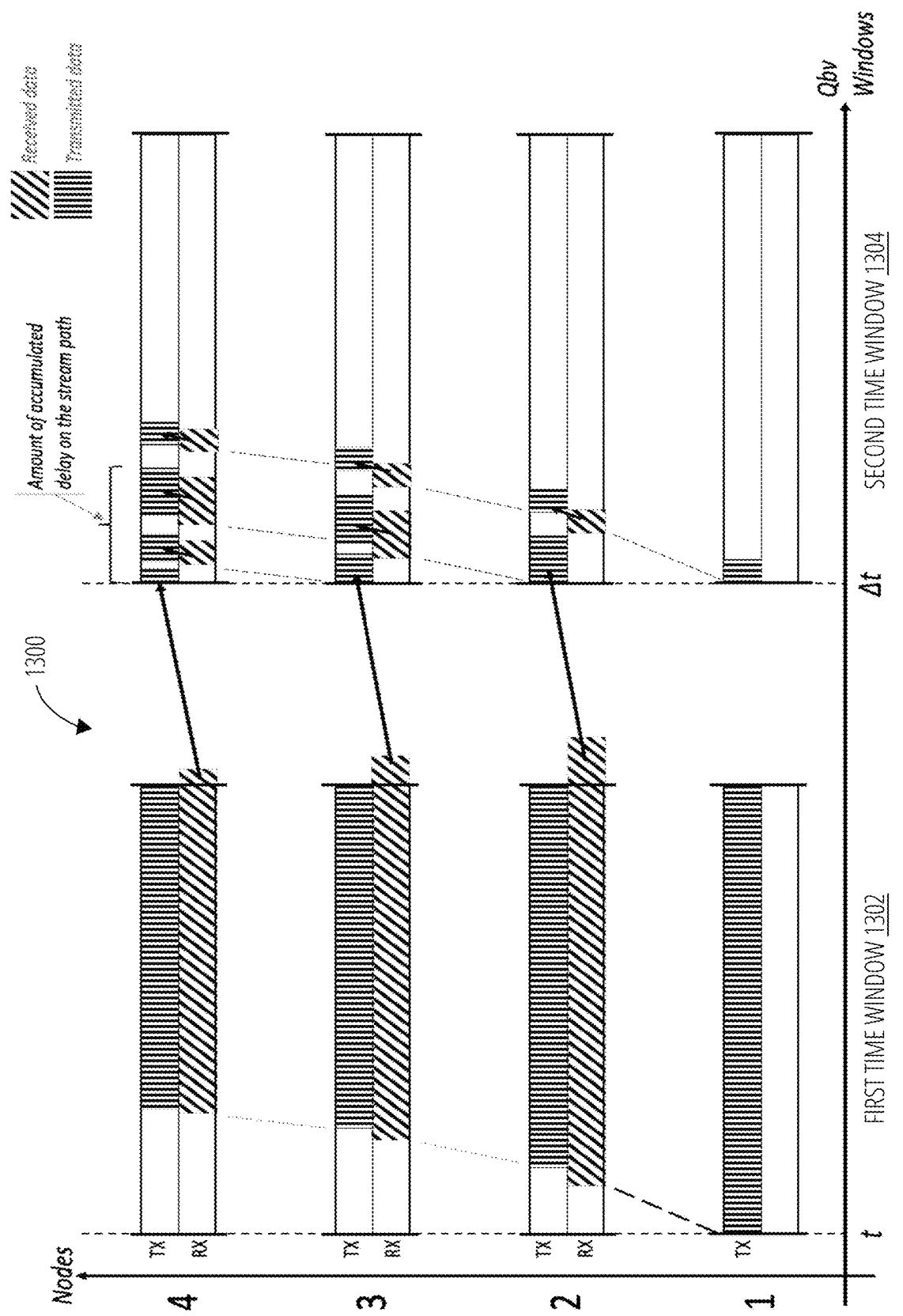
FIG. 13 illustrates an aspect of an operating environment 1300 in accordance with one embodiment.

FIG. 13 illustrates an operating environment 1300. The operating environment 1300 illustrates measured delay during normal or benign operations of the TSN 1002.

The IEEE 802.1Qbv standard defines the transmission of time-sensitive and latency-critical data in scheduled time slots. IEEE 802.1Qbv operates by managing queues of Ethernet frames, or buffers, at the network switches. The standard uses a traffic scheduling mechanism that categorizes frames based on priority levels into different queues (or buffers). Each priority level has its own queues managed with its own scheduling policy. When a data frame arrives at the switch, it is classified based on priority. For example, time-sensitive traffic might be given a higher priority compared to regular or best-effort traffic. After classification, each frame is placed into the corresponding queue based on its priority. The IEEE 802.1Qbv standard introduces a mechanism called a Gate Control List (GCL). The GCL defines when the gate for each queue should be opened or closed. In other words, it sets the exact times when frames from a specific queue can be sent. When the gate for a specific queue is open, the frames from that queue are transmitted. When the gate is closed, no frames are sent from that queue, effectively pausing the transmission. This process is strictly controlled according to the GCL to ensure time-sensitive traffic gets through with minimal delay. By using this type of priority-based traffic management and scheduled transmission, IEEE 802.1Qbv ensures that time-critical data can be sent with a predictable latency, making Ethernet more suitable for real-time, mission-critical applications. The buffering of traffic helps to manage data flow in a way that prioritizes important data frames without blocking or excessively delaying other traffic.

On the left-hand side of FIG. 13 are represented a first time window 1302 (or first round) of IEEE 802.1Qbv windows of the nodes N1 through N4. On the right-hand side of FIG. 13 are represented a second time window 1304 (or second round) of 802.1Qbv windows of the nodes N1 through N4. All traffic that has been buffered from the first time window 1302 of 802.1Qbv windows are now transmitted forward in the second time window 1304 of 802.1Qbv windows, and arrives at the security monitor 614 in the second time window 1304. Under benign conditions, the security monitor 614 receives this data and already knows that they are due to naturally occurring delays of the network path 1102. This can serve as a baseline for benign conditions.

Figure 14:
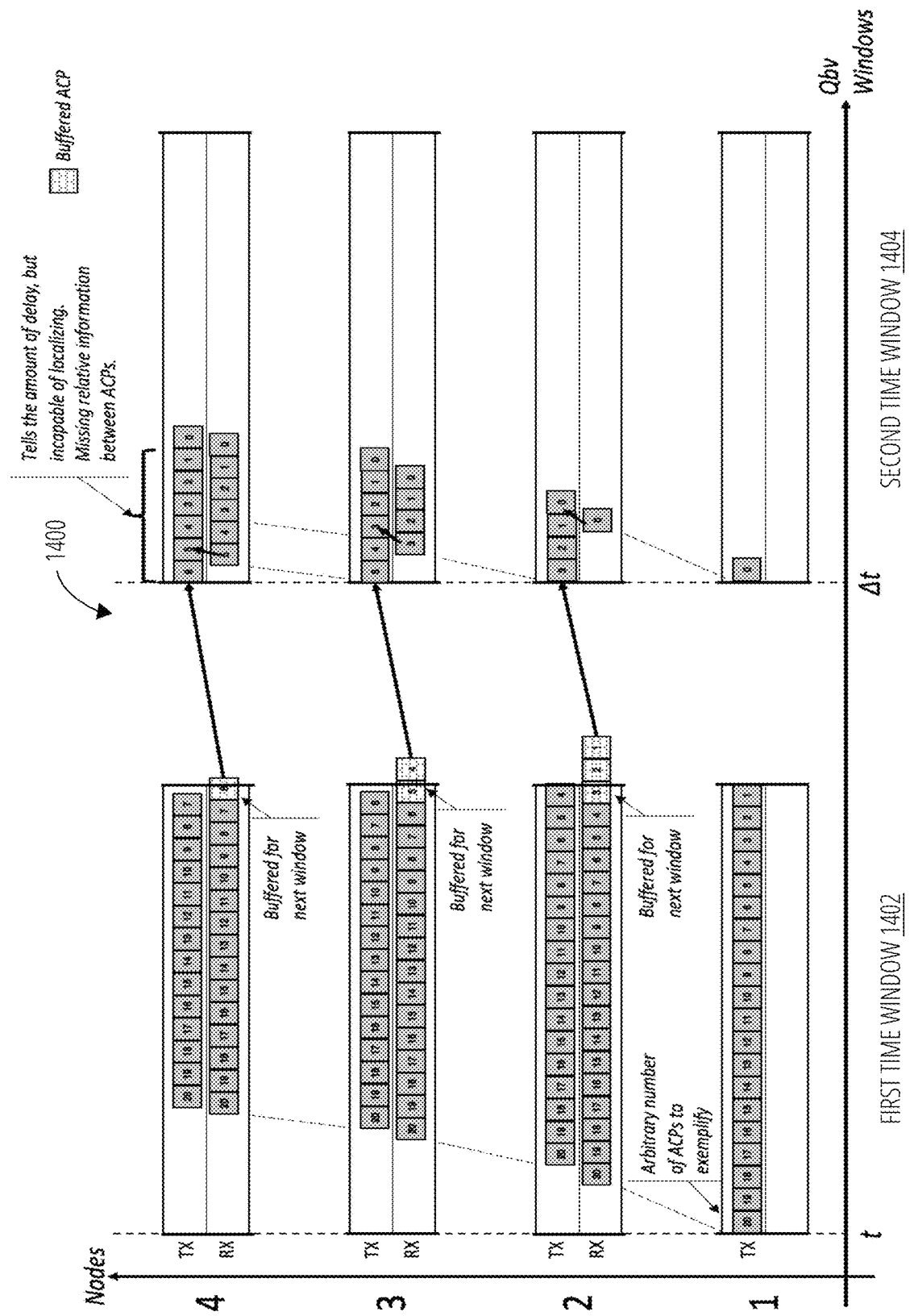
FIG. 14 illustrates an aspect of an operating environment 1400 in accordance with one embodiment.

FIG. 14 illustrates an operating environment 1400. The operating environment 1400 illustrates an ACP-based implementation to measure delay during normal or attack operations of the TSN 1002.

The operating environment 1400 depicts the concepts introduced in the operating environment 1300 and replaces the hatched areas with ACPs, such as ACPs 612, for example. The same reasoning applies, but now in a discrete way. The size of the ACPs 612 represent the minimum granularity of data being transmitted. The ACPs 612 move from the diagnostic stream producer 1006 to the diagnostic stream consumer 1016 across the network path 1102, and in doing so face the naturally occurring delays (e.g., LDs and SDs) from intermediate nodes 1018 and associated communication links. All ACPs 612 that do not arrive in the first time window 1402 are buffered due to those measured delays, and therefore will arrive at the security monitor 614 in a second round of 802.1Qbv windows, such as the second time window 1404.

It is worthy to note that at this point, the defined size for each of the ACPs 612 already grants the security monitor 614 the ability of quantifying LDs and SDs, which are fundamental for quantification of time misalignment. However, the security monitor 614 cannot identify where each ACP 612 was buffered along the network path 1102, therefore it lacks the ability of localization.

Figure 15:
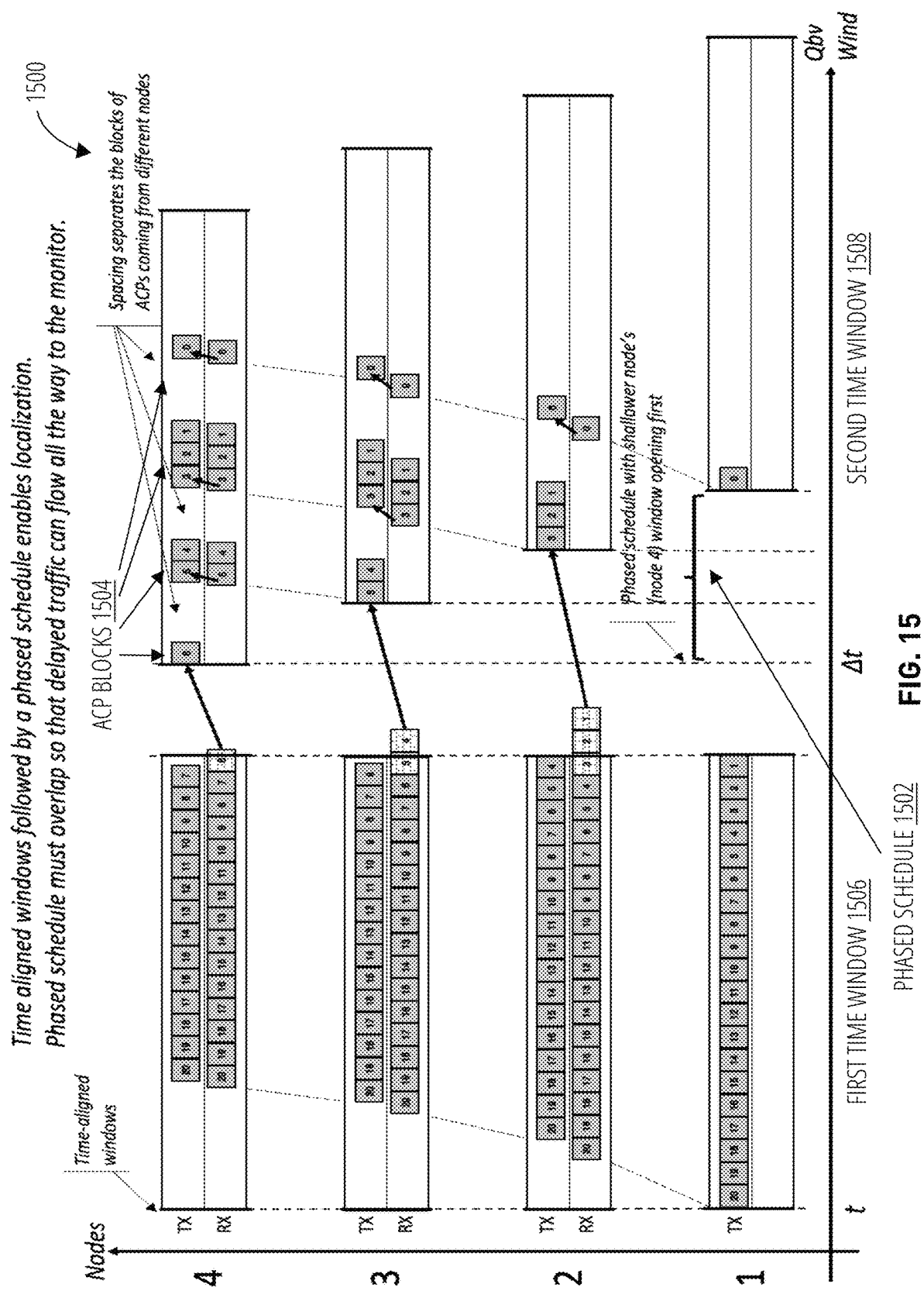
FIG. 15 illustrates an aspect of an operating environment 1500 in accordance with one embodiment.

FIG. 15 illustrates an operating environment 1500. The operating environment 1500 illustrates ACP-based localization to measure delay during normal or attack operations of the TSN 1002.

The operating environment 1500 introduces a phased schedule 1502 for the nodes N1 through N4 to enable localization. The phased schedule 1502 schedules a set of offset values (or reverse offset values) for time windows used by each of node 1 through node 4 that causes a temporal separation of the ACPs 612 buffered in different locations of the network path 1102. As depicted in FIG. 15, starting at Δt, the time windows are intentionally offset from each other in time in accordance with the phased schedule 1502, so that they force a specific transmission time for TX queue of each node, which is slightly off of its neighboring node.

For example, observing the TX window of node 4, there exists a clear separation between sets of ACP blocks 1504, where each of the ACP blocks 1504 comprise one or more ACPs 612. Node 4 receives ACP6 outside of the first time window 1506 in its RX queue, and therefore it buffers ACP6 in its TX queue for transmission in the second time window 1508. Due to an offset between the first time window 1506 and the second time window 1508 for node 3 and node 4, there is a separation between ACP block 1504 comprising ACP4, ACP5 and ACP block 1504 comprising ACP6 when node 4 transmits the ACPs 612 in the second time window 1508.

The space-separated sets of ACP blocks 1504 comprising one or more ACPs 612 indicate not only how much misalignment occurred in each location, but it is intrinsically tied to where it occurred. Notice also that node 1 transmits a reference packet (e.g., ACP0), which serves to enable the measurement of delays between nodes 1 and 2.

Figure 16:
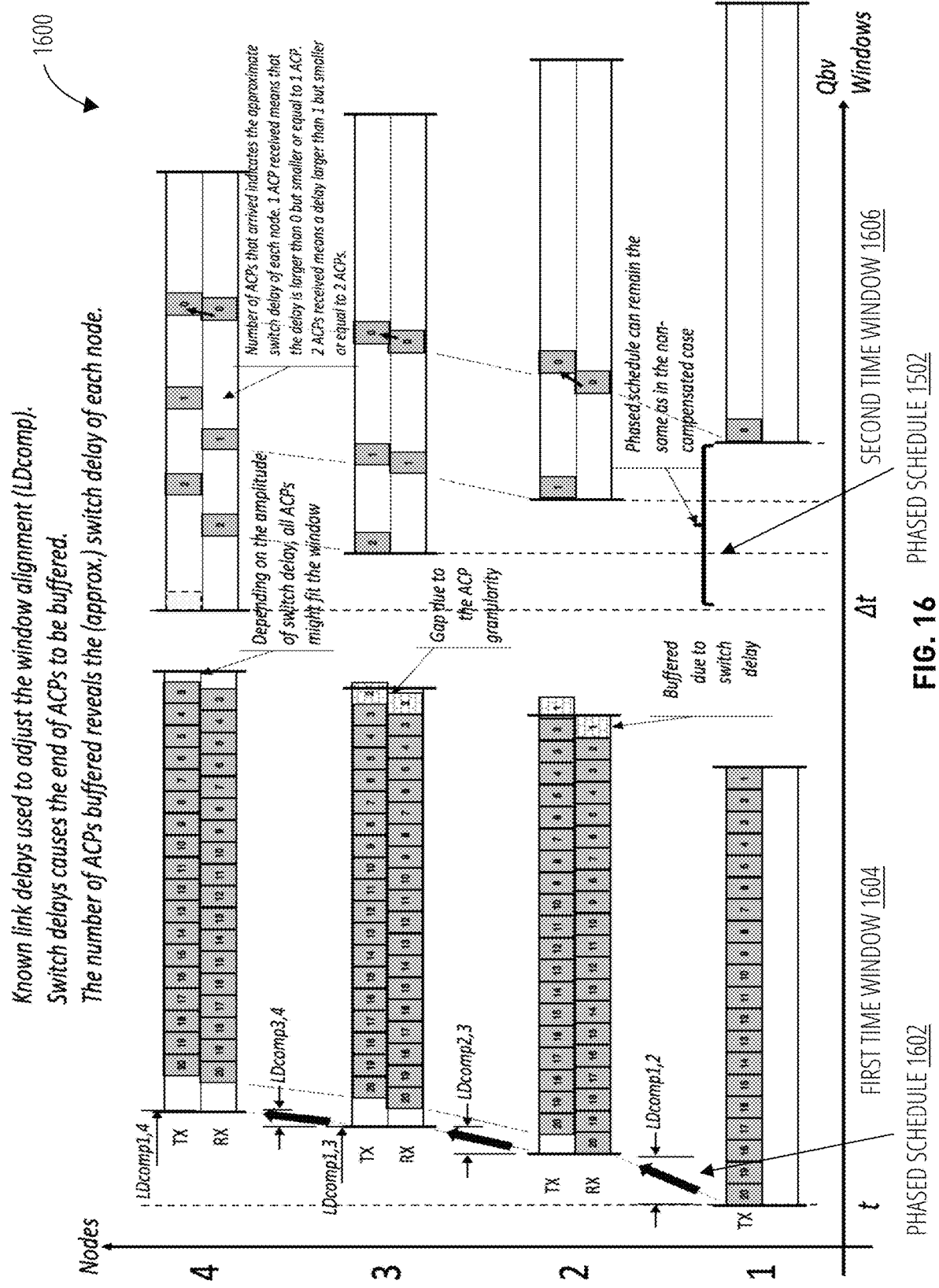
FIG. 16 illustrates an aspect of an operating environment 1600 in accordance with one embodiment.

FIG. 16 illustrates an operating environment 1600. The operating environment 1600 illustrates a technique to compensate for known LDs 1110 or SDs 1112 in the TSN 1002.

As previously discussed, the LDs 1110 and the SDs 1112 may be calculated using data gathered during normal operations for the TSN 1002. This may be accomplished using any number of measurement techniques, such as those used for standard time synchronization protocols (e.g., IEEE 802.1as, IEEE 1588, etc.). Embodiments may implement a phased schedule 1602 for the network nodes N1 through N4 that adjusts window alignments that compensate for the LDs 1110 and the SDs 1112. The phased schedule 1602 may include an offset for each network node that compensates for LD 1110, SD 1112, or both LD 1110 and SD 1112.

As depicted in FIG. 16, nodes N1 through N4 transmit and receive a first subset of ACPs 612 in a first time window 1604, and a second subset of ACPs 612 in a second time window 1606. An LD 1110 for each link between a pair of nodes is calculated. Window alignments can be adjusted by an offset parameter (LDcomp) based on the LD 1110. For example, an LD 1110 for a link between node 1 and node 2 is calculated, and window alignment between node 1 and node 2 is adjusted by an offset (LDcomp1, 2) to compensate for the known LD 1110. Similar operations occur for LD 1110 between nodes 2, 3 (LDcomp2,3) and nodes 3, 4 (LDcomp3,4).

Similarly, SD 1112 for each of the network nodes can be calculated based on a number of ACPs 612 buffered by a given network node. A number of ACPs 612 that arrive in the first time window 1604 and are transmitted in the second time window 1606 indicates an approximate SD 1112 of each node. For example, a first ACP1 is received during the first time window 1604 for node 2, and it is buffered for transmit during the second time window 1606. As such, the approximate SD 1112 for node 2 is computed as larger than 0 but less than or equal to 1 ACP. If two ACPs 612 are buffered, the approximate SD 1112 for a node would be computed as larger than 1 but less than or equal to 2, and so forth. The gap is because a given ACP 612 may be buffered due to the defined size of the ACP that precludes an entire ACP from being received by a given network node, which is demonstrated for node 3 in FIG. 16.

The phased schedule 1602 may include offsets for the estimated LDs 1110 to further align the windows to reduce or eliminate ACP buffering along the network path. Depending on an amplitude of the accumulated SD 1112, the entire set of ACPs 612 could potentially fit within the first time window 1604. When the LDs 1110 are compensated, the security monitor 614 may expect to receive the entire set of ACPs 612 within the first time window 1604 (e.g., the receiver time window 1 704) except for the reference ACP (ACP0). The security monitor 614 expects the reference ACP to arrive within the second time window 1606 (e.g., the receiver time window 2 804).

The operating environment 1600 implements the phased schedule 1602 for the nodes N1 through N4 to adjust window alignments for the nodes N1 through N4 in order to compensate for known LDs 1110. The phased schedule 1602 schedules a set of offset values for time windows used by each of node 1 through node 4 that causes an entire set of ACPs 612 to arrive a single time window 662, such as the receiver time window 1 704. As depicted in FIG. 16, starting at 1, the time windows are intentionally offset from each other in time in accordance with the phased schedule 1602, so that they force a specific transmission time for TX queue of each node, which is slightly off of its neighboring node.

Figure 17:
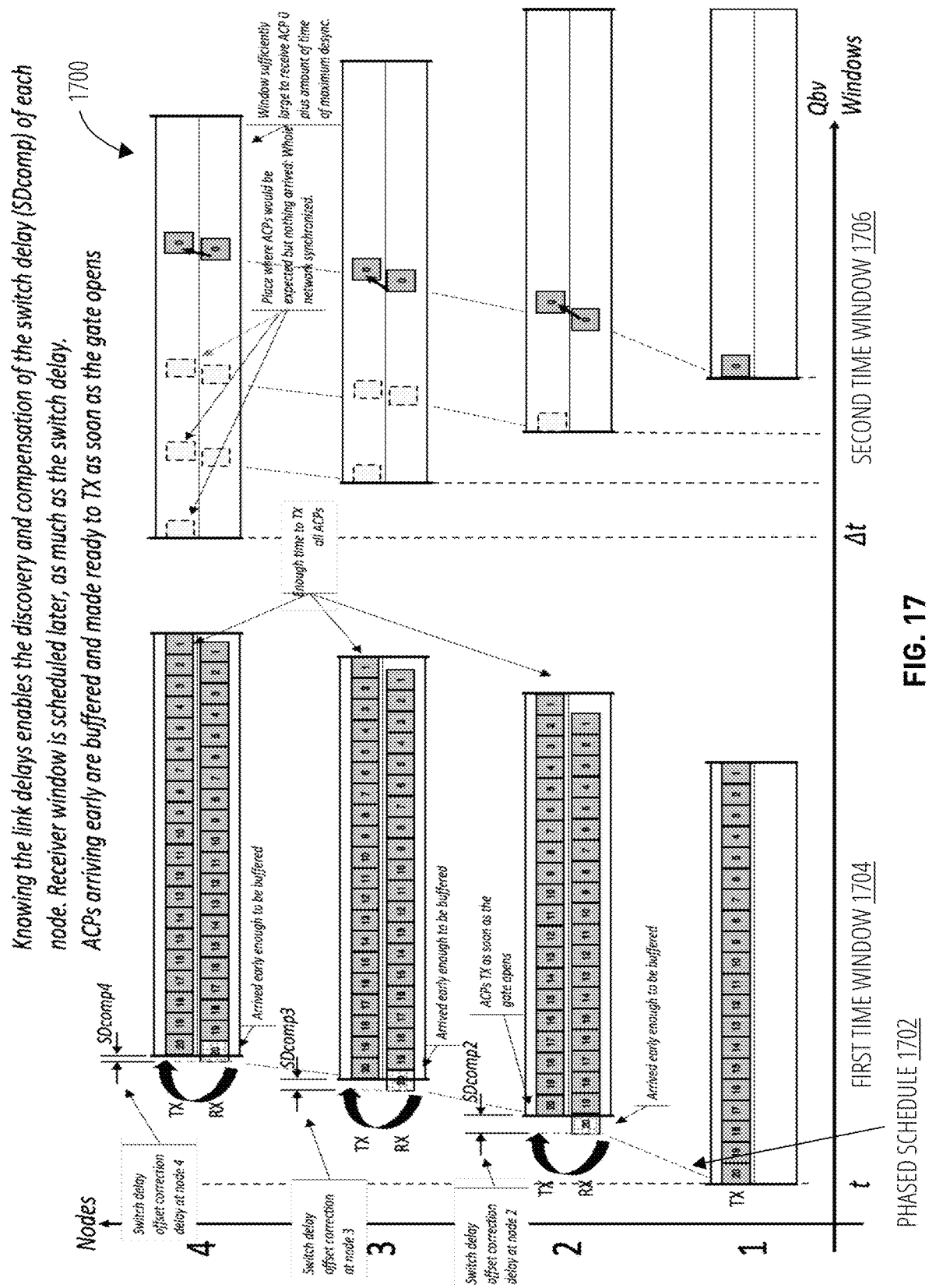
FIG. 17 illustrates an aspect of an operating environment 1700 in accordance with one embodiment.

FIG. 17 illustrates an operating environment 1700. The operating environment 1700 illustrates a technique to compensate for known SDs 1112 in the TSN 1002.

As discussed with reference to FIG. 16, the transmit windows for each node N1 through N4 may be adjusted by an offset parameter to compensate for SDs 1112 at each node N1 through N4. Knowledge of LDs 1110 enable the discovery and compensation of an SD 1112 using an offset parameter for each node (SDcomp) in accordance with a phased schedule 1702. A receive window is scheduled later using the same SD 1112.

Any ACPs 612 arriving early at a given network node are buffered and made ready for transmission as soon as the transmit gate opens for the first time window 1704. For example, an ACP20 arrives early enough in a receive queue for node 2 to be buffered by node 2. The switch delay offset correction delay at node 2 is denoted as SDcomp2. However, instead of buffering ACP20, a transmission window for node 2 is adjusted by SDcomp2 so that it can transmit ACP20 along with ACP1 through ACP19 during the first time window 1704. The same event occurs at node 3, where a switch delay offset correction at node 3 is denoted by SDcomp3, which is smaller than SCcomp2 due to the adjusted transmit window of node 2. Instead of buffering ACP20 at node 3, a transmission window for node 3 is adjusted by SDcomp3 so that it can transmit ACP20 along with ACP1 through ACP19 during the first time window 1704. The same event occurs at node 4, where a switch delay offset correction at node 4 is denoted by SDcomp4, which is smaller than SCcomp3 due to the adjusted transmit window of node 3. Instead of buffering ACP20 at node 4, a transmission window for node 4 is adjusted by SDcomp4 so that it can transmit ACP20 along with ACP1 through ACP19 during the first time window 1704.

The operating environment 1700 implements the phased schedule 1602 for the nodes N1 through N4 to adjust window alignments for the nodes N1 through N4 in order to compensate for known SDs 1112. The phased schedule 1702 schedules a set of offset values for time windows used by each of node 1 through node 4 that causes an entire set of ACPs 612 to arrive a single time window 662, such as the receiver time window 1 704. As depicted in FIG. 17, starting at 1, the time windows are intentionally offset from each other in time in accordance with the phased schedule 1702, so that they force a specific transmission time for TX queue of each node, which is slightly off of its neighboring node.

Figure 18:
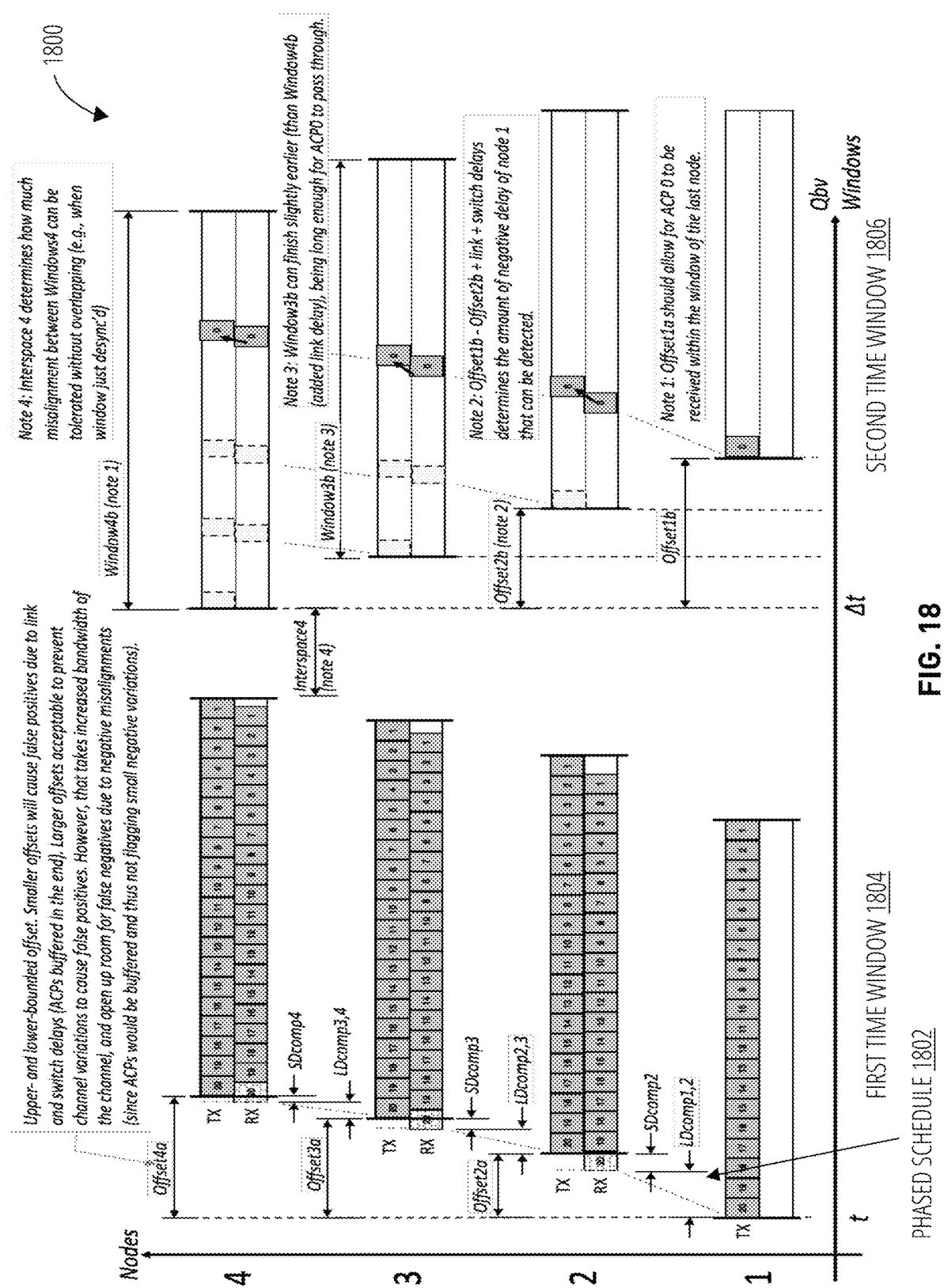
FIG. 18 illustrates an aspect of an operating environment 1800 in accordance with one embodiment.

FIG. 18 illustrates an operating environment 1800 for the TSN 1002. The operating environment 1600 illustrates a technique to compensate for known LDs 1110 and SDs 1112 in the TSN 1002 using a phased schedule 1802.

The phased schedule 1802 incorporates a total offset compensation for the first round of 802.1Qbv windows denoted as first time window 1804, which are identified on the left-hand side of FIG. 18 as a set of offset parameters denoted as Offset2a, Offset3a, and Offset4a in this example. Note that Offset1a for node 1 should allow for ACP0 to be received within the window of the last node. For example, the Window4b should be large enough to be able to receive ACP0. Each offset parameter comprises both LD 1110 (LDcomp) and SD 1112 (SDcomp) of each node. The right-hand side of FIG. 18 also represents offset parameters for the second round of Qbv windows, after the Interspace, denoted as second time window 1806, which are identified as Offset1b, Offset2b, Offset3b in this example. The Offset1b specifies the interspace between the first and second rounds of Qbv windows.

The offset parameters may include upper and lower boundaries that are configurable for a given implementation. Smaller offsets will cause false positives due to LD 1110 and SD 1112. Larger offsets acceptable to prevent channel variations that can cause false positives. However, this consumes increase bandwidth of the channel, and opens up room for false negatives due to negative misalignments, since ACPs would be buffered and thus not flagging small negative variations.

For Offset2b, an equation of Offset1b-Offset2b+link LD 1110+SD 1112 determines an amount of negative delay of node 1 that can be detected by the security monitor 614. For Window3b, it can finish slightly earlier than Window4b (added LD 1110), which is long enough for ACP0 to pass through. For Window4b, the interspace determines how much misalignment between Windows4 can be tolerated without overlapping, such as when the window just desynchronizes.

Figure 19:
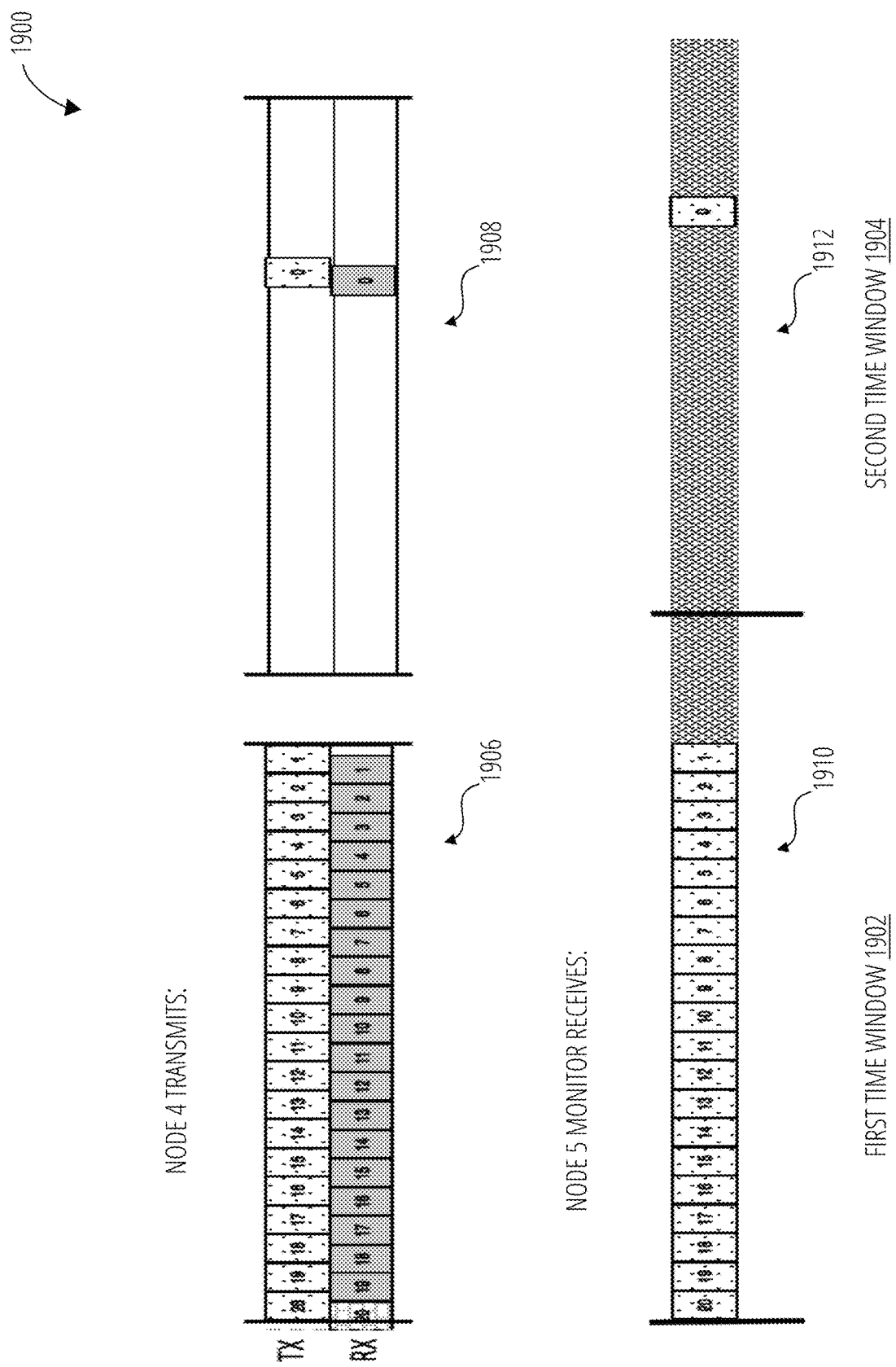
FIG. 19 illustrates an aspect of an operating environment 1900 in accordance with one embodiment.

FIG. 19 illustrates an operating environment 1900. As previously discussed with reference to FIG. 7A, FIG. 7B, and FIG. 7C, and FIG. 8A, FIG. 8B, and FIG. 8C, the security monitor 614, under benign conditions, can build a baseline pattern for receiving a set of ACPs 612, such as the estimated pattern 708 for the receiver time window 1 704, and the estimated pattern 810 for the receiver time window 2 804, as described previously. Then, for each diagnostic stream 636 with a set of ACPs 612 received, the security monitor 614 can analyze if the TSN 1002 remains aligned in time, or whether one or more network nodes are suffering an anomaly.

The operating environment 1900 illustrates a case where the security monitor 614 receives the set of ACPs 612 from a last network node in the network path, which in our example is node 4. Node 4 transmits a set of ACPs 612 in an actual pattern 1906 in a first time window 1302. Node 4 also transmits a reference ACP from the set of ACPs 612 in an actual pattern 1908 in a second time window 1904. The security monitor 614 receives the set of ACPs 612 in accordance with the actual pattern 1906 and the actual pattern 1908, and constructs a benign reference without any delays based on the beginning of reception of ACPs 612 and which ACPs 612 were received in the first time window 1902 and the time of reception of ACP0 in the second time window 1904. The result is represented as an estimated pattern 1910 in the first time window 1902, and an estimated pattern 1912 in the second time window 1904. The estimated pattern 1910 and the estimated pattern 1912 may be specific examples for the estimated pattern 708 and the estimated pattern 810, respectively.

Figure 20:
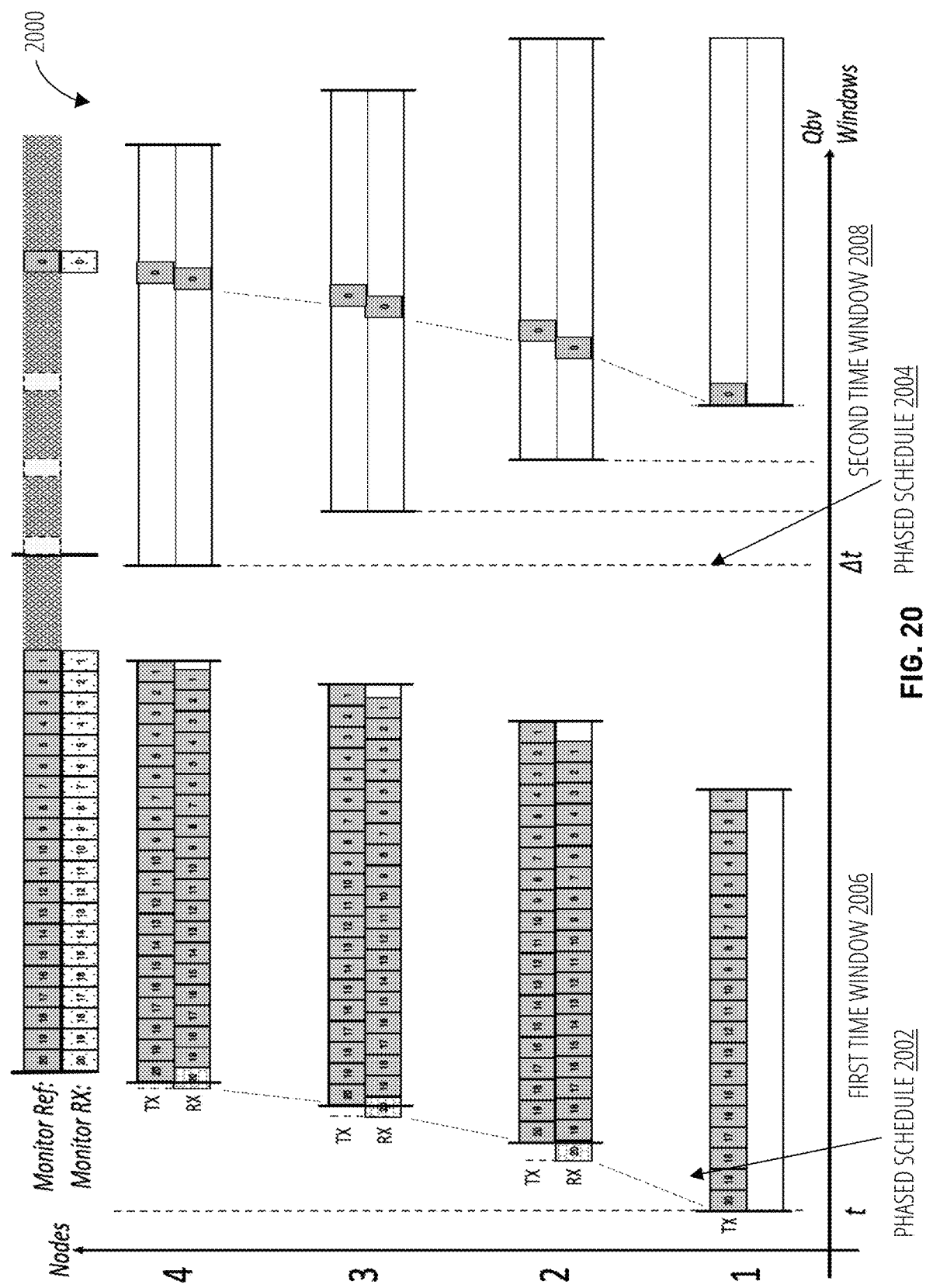
FIG. 20 illustrates an aspect of an operating environment 2000 in accordance with one embodiment.

FIG. 20 illustrates an operating environment 2000. The operating environment 2000 illustrates the security monitor 614 using the estimated pattern 1910 and the estimated pattern 1912. Once the security monitor 614 has a baseline, it compares the baseline with the set of ACPs 612 that are actually received from the diagnostic stream producer 602 via the network nodes N1 through N4.

Assume the nodes N1 through N4 operate using the phased schedule 2002 to offset transmit windows for the first time window 2006 and the phased schedule 2004 to offset transmit windows for the second time window 2008. In this case, the operating environment 2000 illustrates that the entire network is aligned, and the security monitor 614 detects that the received ACPs 612 match the expected positions of the baseline. Any deviation from the baseline indicates an anomaly. For example, attacks impacting the time of a given node will misalign the targeted node in time, and the consequences of the time-misalignment will immediately manifest against the baseline. The time-misalignment may occur because a given node is under attack, or it is suffering from an attack upstream in the time distribution path where another node is compromised or impacted. In either case, a local clock for the node is no longer synchronized with a network time in the TSN 102 as maintained by a clock leader for the TSN 102.

There are distinct patterns between early and late scenarios. FIG. 21 through FIG. 24 illustrate early arrival scenarios for node 1 through node 4, respectively. FIG. 25 through FIG. 28 illustrate late arrival scenarios for node 1 through node 4, respectively.

Figure 21:
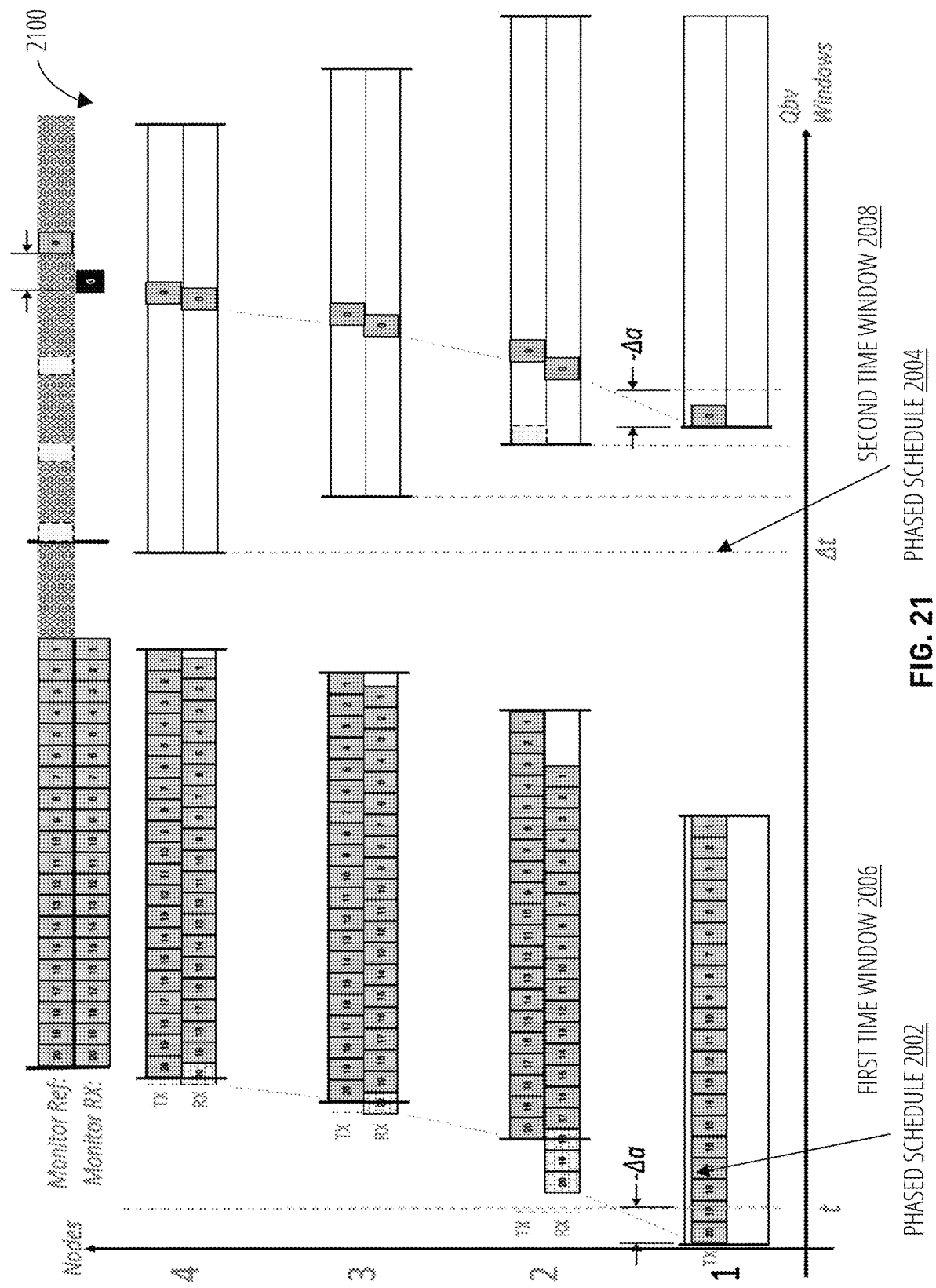
FIG. 21 illustrates an aspect of an operating environment 2100 in accordance with one embodiment.

FIG. 21 illustrates an operating environment 2100. The operating environment 2100 illustrates the security monitor 614 using the estimated pattern 1910 and the estimated pattern 1912 to detect early arrival of ACPs 612 transmitted from node 1. In this example, node 1 has been impacted and it is early in time in reference to the clock leader and the rest of the TSN 102. The time-misalignment may occur because node 1 is under attack, or it is suffering from an attack upstream in the time distribution path where another node is compromised or impacted in the TSN 102.

If a talker node 1106 (e.g., node 1) is early, ACPs 612 will all arrive in time in the receiver time window 1 704, and the reference ACP (ACP0) will arrive earlier than expected in the receiver time window 2 804. Time of arrival of ACP0 indicates an amount of misalignment for node 1.

Figure 22:
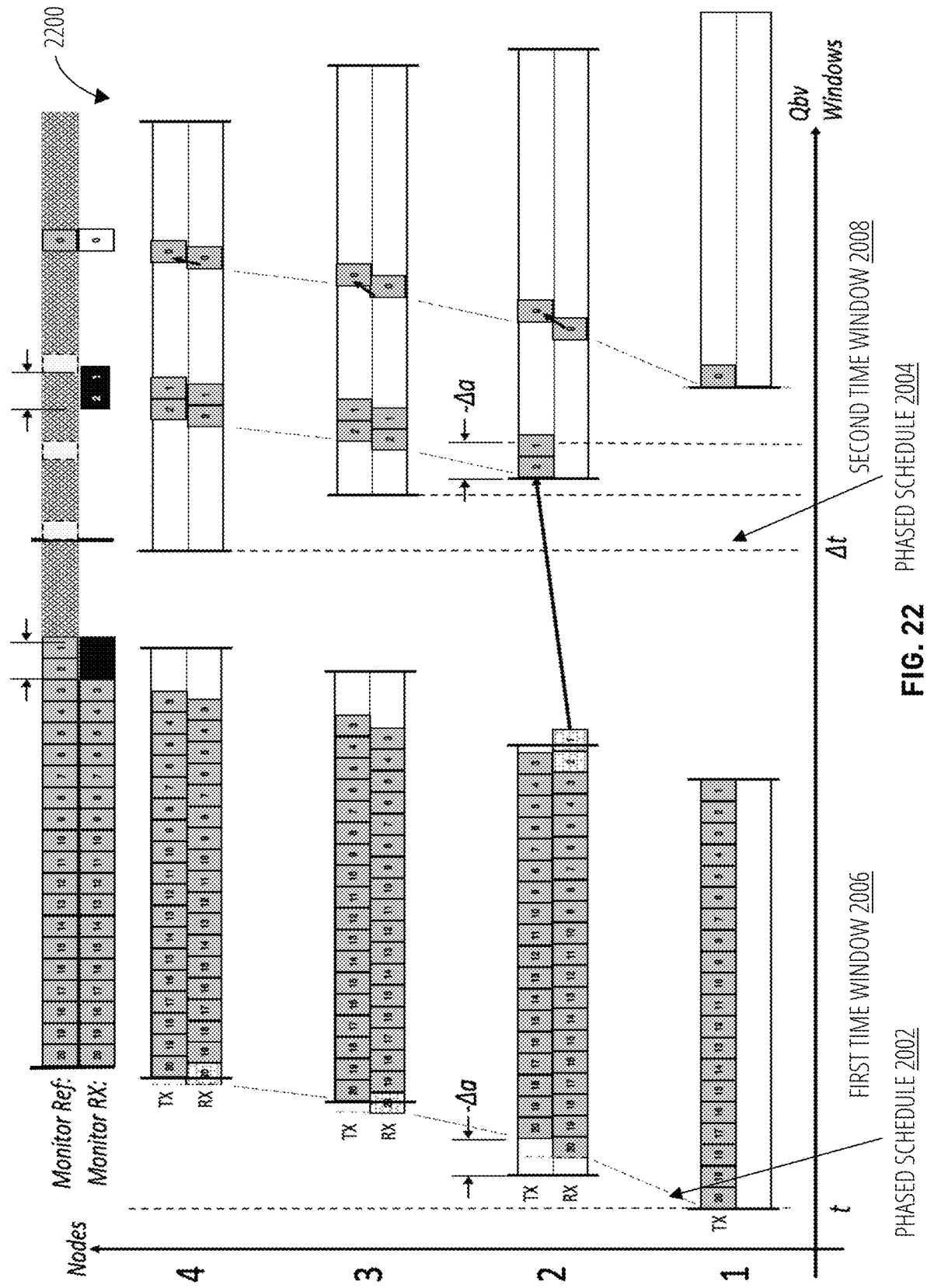
FIG. 22 illustrates an aspect of an operating environment 2200 in accordance with one embodiment.

FIG. 22 illustrates an operating environment 2200. The operating environment 2200 illustrates the security monitor 614 using the estimated pattern 1910 and the estimated pattern 1912 to detect early arrival of ACPs 612 transmitted from node 2. The ACPs 612 do not necessarily arrive early on node 2. In this example, node 2 has been impacted and it is early in time in reference to the clock leader and the rest of the TSN 102. The time-misalignment may occur because node 2 is under attack, or it is suffering from an attack upstream in the time distribution path where another node is compromised or impacted in the TSN 102.

Early misalignments of intermediate nodes 2, 3 and 4 manifests as ACPs 612 missing in the end of the first time window, such as receiver time window 1 704. The ACPs missing in the receiver time window 1 704 arrive earlier than expected in the second window, such as receiver time window 2 804. The number of ACPs 612 indicates an amount of misalignment for a given intermediate node.

Assume node 2 is compromised or impacted and its local clock is early in time relative to the clock leader of the TSN 102. As a result, it does not receive all the ACPs 612 from node 1 in sufficient time for transmission before its window closes, as denoted by the time interval Δa, which are shown as ACP1 and ACP2 in FIG. 22. Node 2 buffers ACP1 and ACP2 for transmission in the next window. Consequently, ACP1 and ACP2 arrive early at the security monitor 614.

The result is that the security monitor 614 will inspect arrivals of a first subset of ACPs 612 from the set of ACPs 612 in the first time window 2006, it compares the actual pattern of received ACPs 612 with the estimated pattern 1910, and it detects that ACP1 and ACP2 do not arrive in the first time window 2006 as expected. It then inspects arrivals of a second subset of ACPs 612 from the set of ACPs 612 in the second time window 2008, it compares the actual pattern of received ACPs 612 with the estimated pattern 1912, and it detects that a block of ACPs 612 including ACP1 and ACP2 arrive earlier than expected relative to an estimated time slot for node 2. Consequently, the security monitor 614 quantifies and localizes an amount of desynchronization time from node 2, compares the desynchronization time with a defined threshold, and sends a signal to the alert generator 616 to generate an alert. The security monitor 614 may perform similar operations to detect anomalies from network nodes 3, 4.

It is worthy to note that the reference ACP0 arrives in the estimated time slot for node 1 even though node 2 suffers a desynchronization event. When node 1 is under attack and is the source of a desynchronization event, the security monitor 614 may detect this occurrence by evaluating whether the reference ACP0 is earlier than the estimated time slot for the ACP0 as defined by the estimated pattern 1912.

Figure 23:
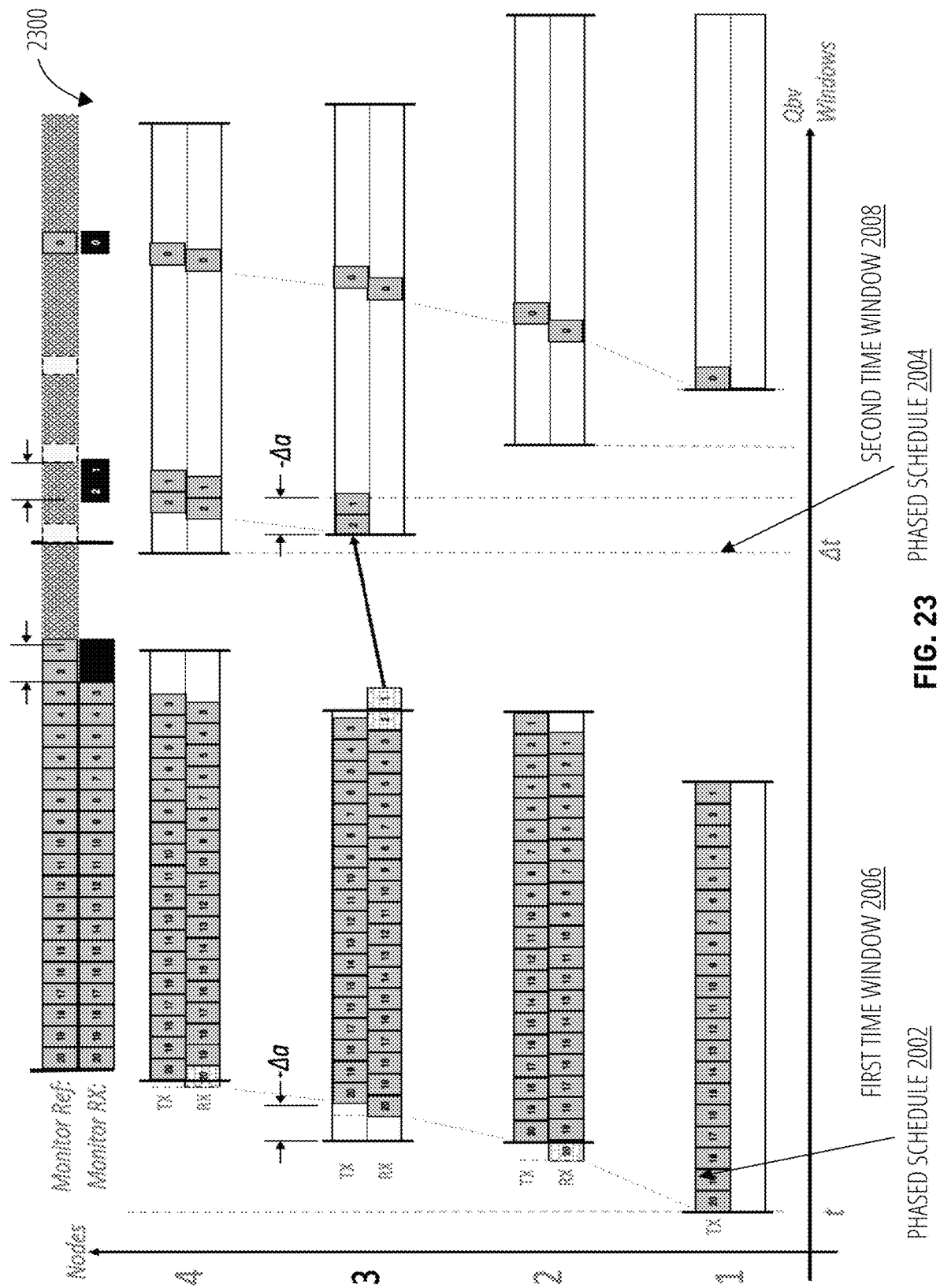
FIG. 23 illustrates an aspect of an operating environment 2300 in accordance with one embodiment.

FIG. 23 illustrates an operating environment 2300. The operating environment 2300 illustrates the security monitor 614 using the estimated pattern 1910 and the estimated pattern 1912 to detect early arrival of ACPs 612 transmitted from node 3. The ACPs 612 do not necessarily arrive early on node 3. In this example, node 3 has been impacted and it is early in time in reference to the clock leader and the rest of the TSN 102. The time-misalignment may occur because node 3 is under attack, or it is suffering from an attack upstream in the time distribution path where another node is compromised or impacted in the TSN 102.

Early misalignments of intermediate nodes 2, 3 and 4 manifests as ACPs 612 missing in the end of the first time window, such as receiver time window 1 704. The ACPs missing in the receiver time window 1 704 arrive earlier than expected in the second window, such as receiver time window 2 804. The number of late ACPs 612 indicates an amount of misalignment for a given intermediate node, which in this case include ACP1 and ACP2. The timing of arrival of the missing ACPs 612 reveals which node is misaligned.

Figure 24:
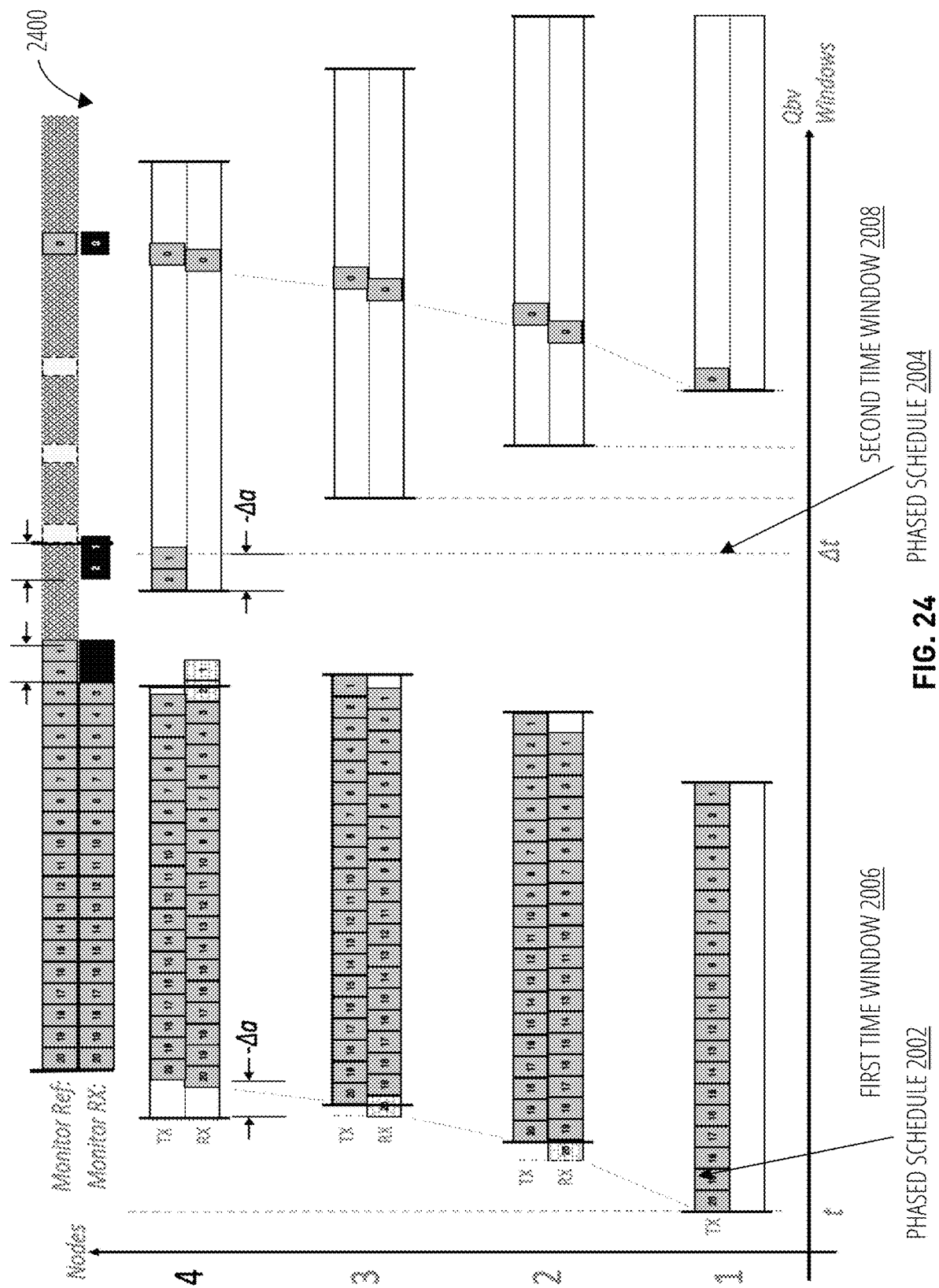
FIG. 24 illustrates an aspect of an operating environment 2400 in accordance with one embodiment.

FIG. 24 illustrates an operating environment 2400. The operating environment 2400 illustrates the security monitor 614 using the estimated pattern 1910 and the estimated pattern 1912 to detect early arrival of ACPs 612 transmitted from node 4. The ACPs 612 do not necessarily arrive early on node 4. In this example, node 4 has been impacted and it is early in time in reference to the clock leader and the rest of the TSN 102. The time-misalignment may occur because node 4 is under attack, or it is suffering from an attack upstream in the time distribution path where another node is compromised or impacted in the TSN 102.

Early misalignments of intermediate nodes 2, 3 and 4 manifests as ACPs 612 missing in the end of the first time window, such as receiver time window 1 704. The ACPs missing in the receiver time window 1 704 arrive earlier than expected in the second window, such as receiver time window 2 804. The number of ACPs 612 indicates an amount of misalignment for a given intermediate node, which in this case include ACP1 and ACP2. The timing of arrival of the missing ACPs 612 reveals which node is misaligned.

Figure 25:
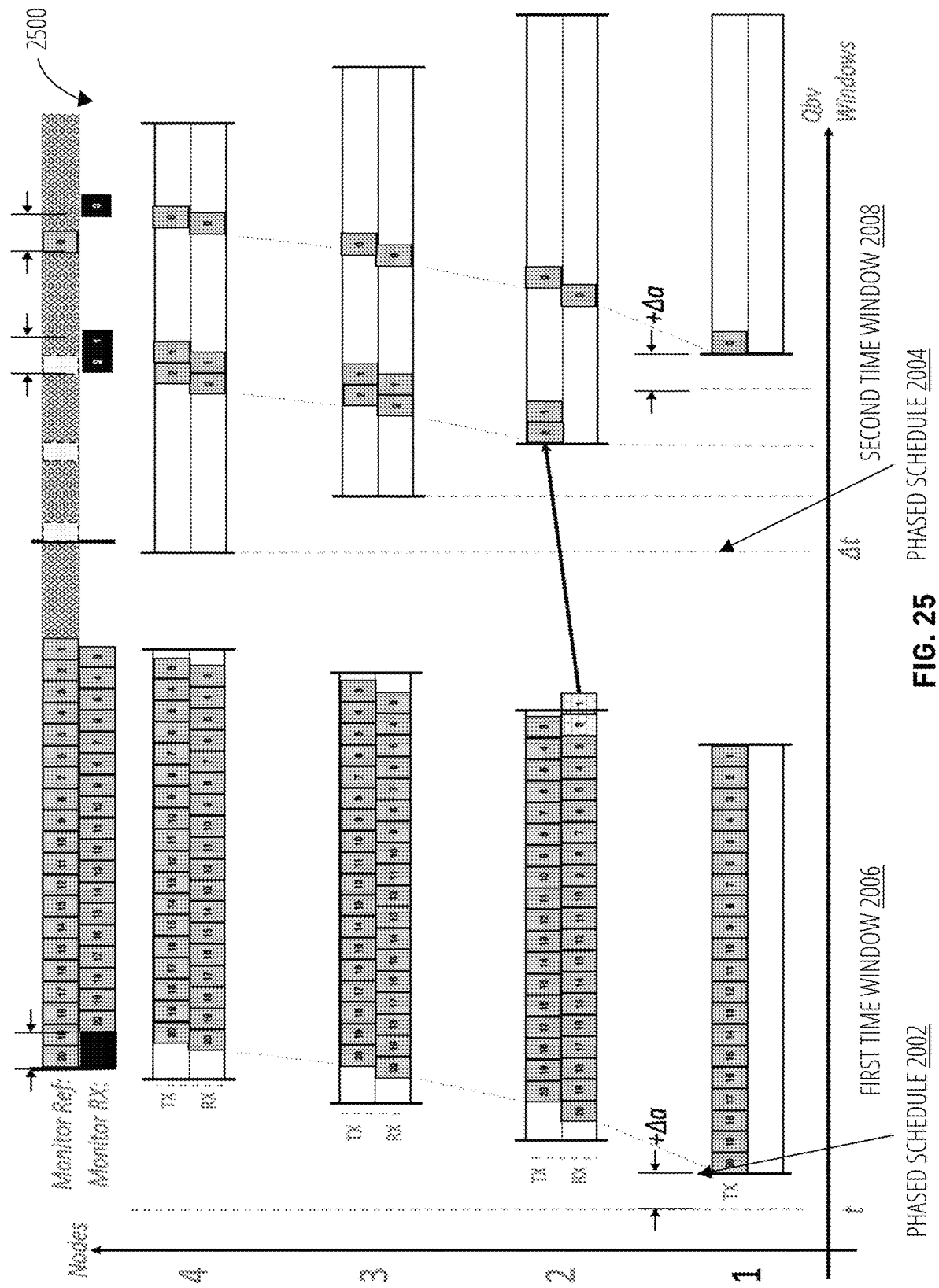
FIG. 25 illustrates an aspect of an operating environment 2500 in accordance with one embodiment.

FIG. 25 illustrates an operating environment 2500. The operating environment 2500 illustrates the security monitor 614 using the estimated pattern 1910 and the estimated pattern 1912 to detect late arrival of ACPs 612 from node 1. In this example, node 1 has been impacted and it is late in time in reference to the clock leader and the rest of the TSN 102. The time-misalignment may occur because node 1 is under attack, or it is suffering from an attack upstream in the time distribution path where another node is compromised or impacted in the TSN 102.

Late misalignments will always manifest as ACPs 612 missing in the beginning of the first window, such as the receiver time window 1 704. The ACPs 612 missing in the first window arrive in the second window, such as the receiver time window 2 804. The number of late ACPs 612 indicates an amount of misalignment for a given intermediate node.

As depicted in FIG. 25, if node 1 is late, then ACP0 will arrive later than expected at the security monitor 614.

Figure 26:
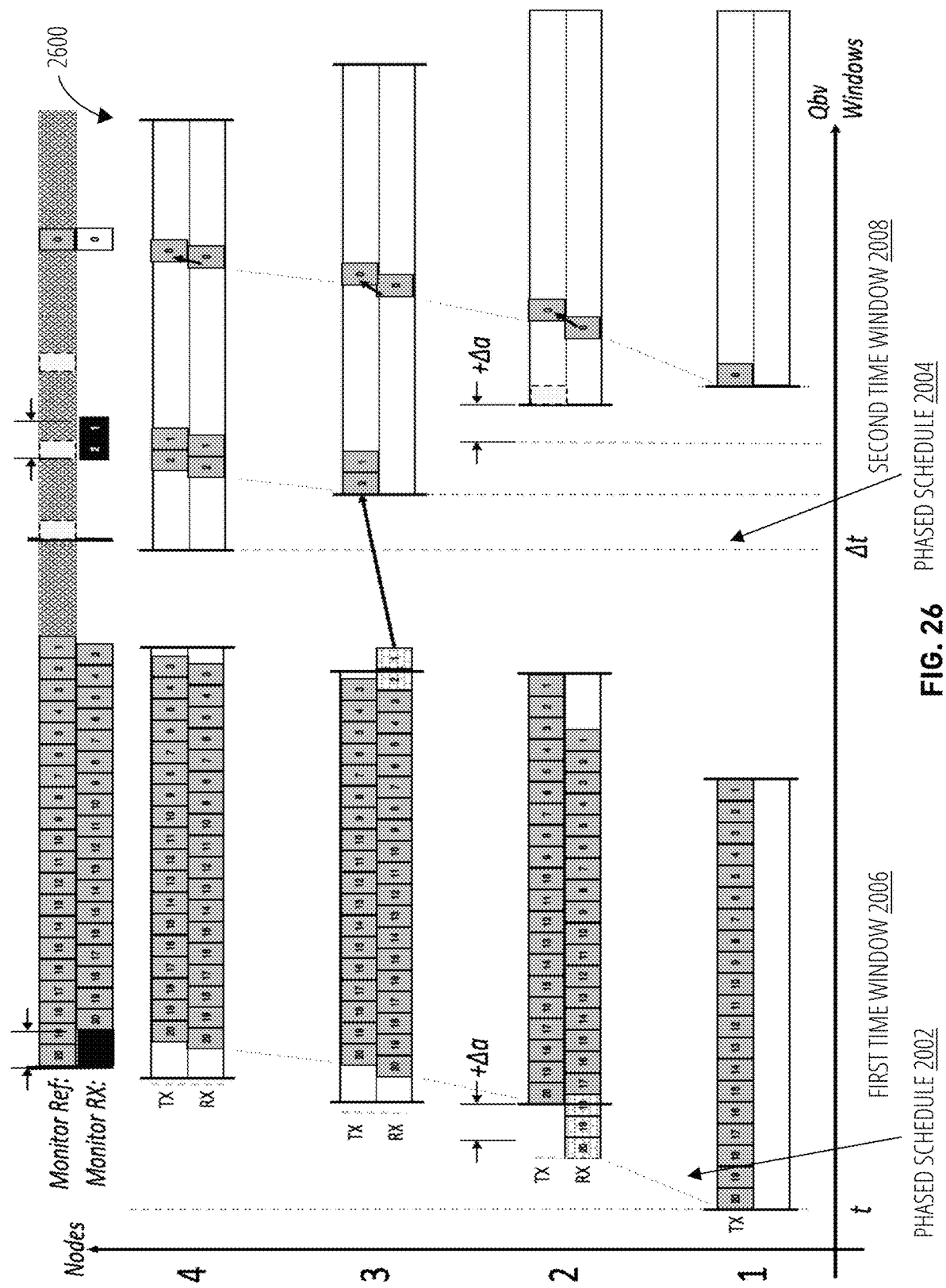
FIG. 26 illustrates an aspect of an operating environment 2600 in accordance with one embodiment.

FIG. 26 illustrates an operating environment 2600. The operating environment 2600 illustrates the security monitor 614 using the estimated pattern 1910 and the estimated pattern 1912 to detect late arrival of ACPs 612 from node 2. The ACPs 612 do not necessarily arrive late on node 2. In this example, node 2 has been impacted and its local clock is late in time in reference to the clock leader and the rest of the TSN 102. The time-misalignment may occur because node 2 is under attack, or it is suffering from an attack upstream in the time distribution path where another node is compromised or impacted in the TSN 102.

Assume node 2 is compromised or impacted and its local clock is late in time relative to the clock leader of the TSN 102. As a result, it does not receive all the ACPs 612 from node 1 in sufficient time for transmission before its window closes, as denoted by the time interval+Δa, which are shown as ACP18, ACP19 and ACP20 in FIG. 26. However, node 2 is also late in opening the transmission window, which allows node 2 time to buffer ACP18, ACP19 and ACP20 for transmission in the first time window 2006. Consequently, ACP1 and ACP2 arrive later at the security monitor 614.

The result is that the security monitor 614 will inspect arrivals of a first subset of ACPs 612 from the set of ACPs 612 in the first time window 2006, it compares the actual pattern of received ACPs 612 with the estimated pattern 1910, and it detects that ACP1 and ACP2 do not arrive in the first time window 2006 as expected. It then inspects arrivals of a second subset of ACPs 612 from the set of ACPs 612 in the second time window 2008, it compares the actual pattern of received ACPs 612 with the estimated pattern 1912, and it detects that a block of ACPs 612 including ACP1 and ACP2 arrive later than expected relative to an estimated time slot for node 2. Consequently, the security monitor 614 quantifies and localizes an amount of desynchronization time from node 2, compares the desynchronization time with a defined threshold, and sends a signal to the alert generator 616 to generate an alert. The security monitor 614 may perform similar operations to detect anomalies from network nodes 3, 4.

It is worthy to note that the reference ACP0 arrives in the estimated time slot for node 1 even though node 2 suffers a desynchronization event. When node 1 local clock is off in relation to the rest of the TSN system as a result of an attack on itself or another node somewhere in the TSN system, and it is part of a desynchronization event, the security monitor 614 may detect this occurrence by evaluating whether the reference ACP0 is later than the estimated time slot for the ACP0 as defined by the estimated pattern 1912.

Figure 27:
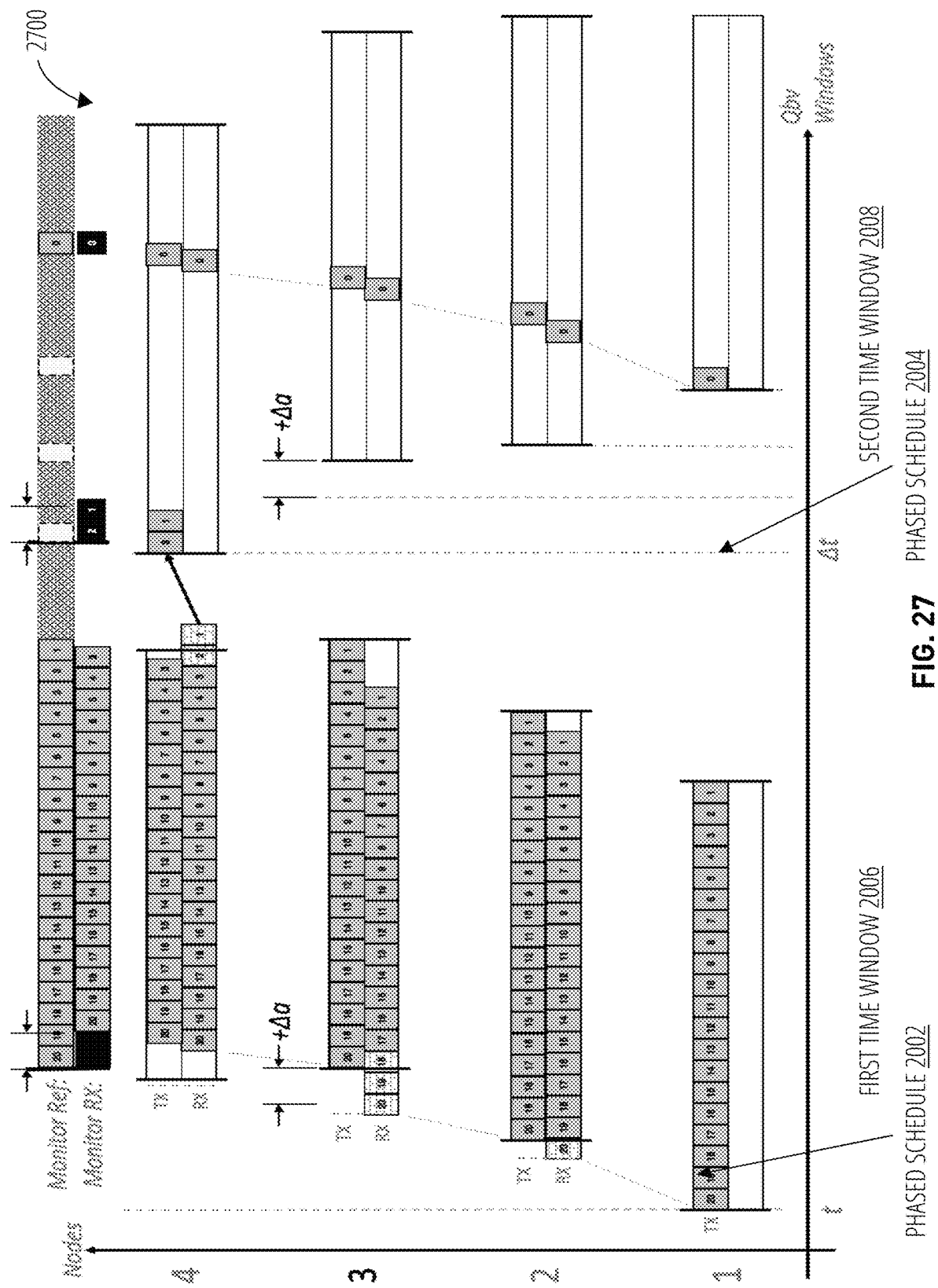
FIG. 27 illustrates an aspect of an operating environment 2700 in accordance with one embodiment.

FIG. 27 illustrates an operating environment 2700. The operating environment 2700 illustrates the security monitor 614 using the estimated pattern 1910 and the estimated pattern 1912 to detect late arrival of ACPs 612 from node 3. The ACPs 612 do not necessarily arrive late on node 3. In this example, node 3 has been impacted and it is late in time in reference to the clock leader and the rest of the TSN 102. The time-misalignment may occur because node 3 is under attack, or it is suffering from an attack upstream in the time distribution path where another node is compromised or impacted in the TSN 102.

Late misalignments will always manifest as ACPs 612 missing in the beginning of the first window, such as the receiver time window 1 704. The ACPs 612 missing in the first window arrive in the second window, such as the receiver time window 2 804. The number of late ACPs 612 indicates an amount of misalignment for a given intermediate node. The timing of arrival of ACPs 612 in the second window reveals which node was late.

As depicted in FIG. 27, if node 3 is late, then ACP1 and ACP2 will arrive later than expected at the security monitor 614.

Figure 28:
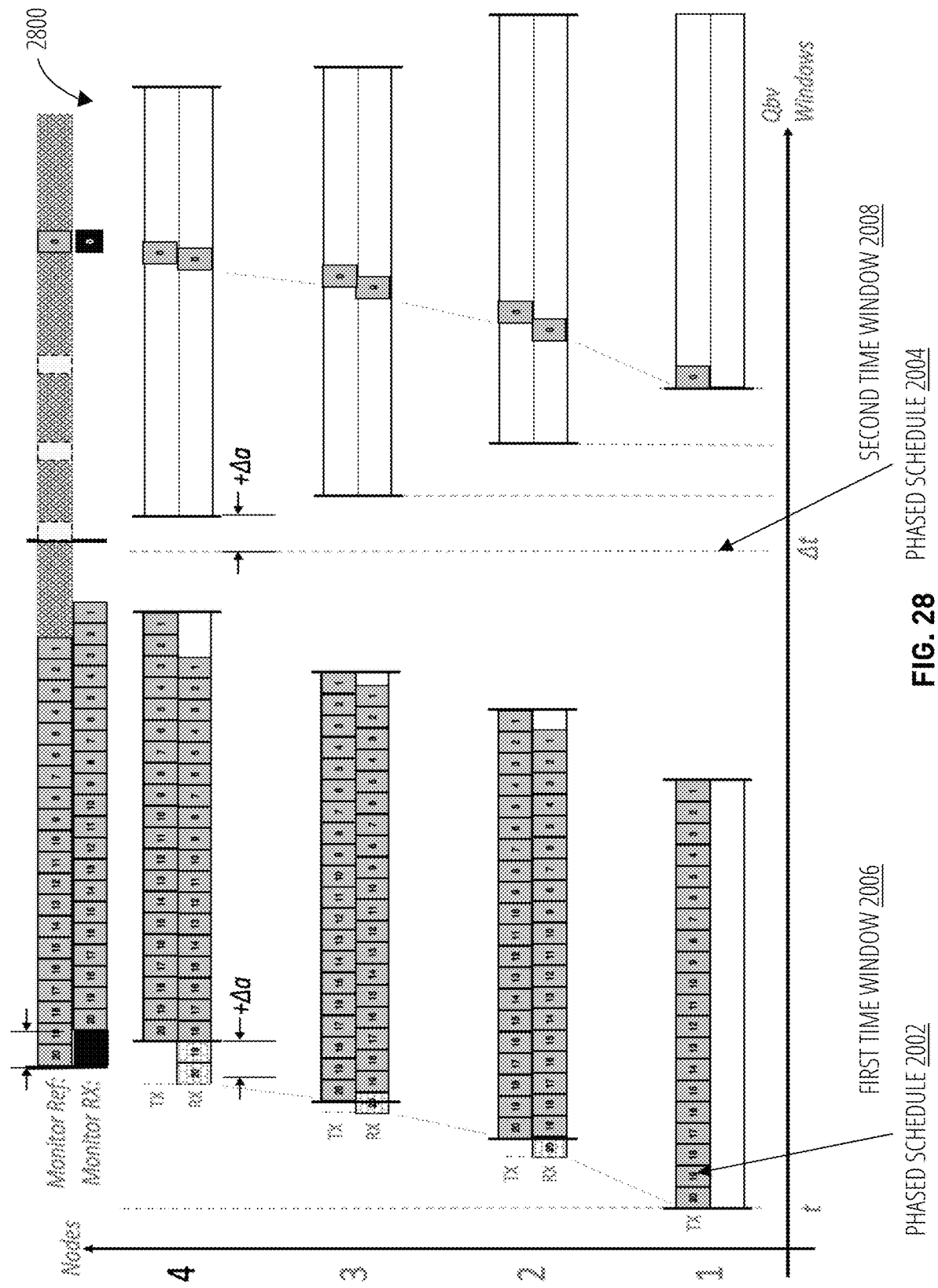
FIG. 28 illustrates an aspect of an operating environment 2800 in accordance with one embodiment.

FIG. 28 illustrates an operating environment 2800. The operating environment 2800 illustrates the security monitor 614 using the estimated pattern 1910 and the estimated pattern 1912 to detect late arrival of ACPs 612 from node 4. The ACPs 612 do not necessarily arrive late on node 4. In this example, node 4 has been impacted and it is late in time in reference to the clock leader and the rest of the TSN 102. The time-misalignment may occur because node 4 is under attack, or it is suffering from an attack upstream in the time distribution path where another node is compromised or impacted in the TSN 102.

Late misalignments will always manifest as ACPs 612 missing in the beginning of the first window, such as the receiver time window 1 704. The ACPs 612 missing in the first window arrive in the second window, such as the receiver time window 2 804. The number of late ACPs 612 indicates an amount of misalignment for a given intermediate node. The timing of arrival of ACPs 612 in the second window reveals which node was late.

As depicted in FIG. 28, if the last node (node 4) is late, a shift in time will be observed at the security monitor 614, but all ACPs 612 will arrive together.

FIG. 29 illustrates a packet and frame structure 2900 for an IEEE 802.3 Ethernet packet and frame. As shown in FIG. 29, the packet and frame structure 2900 may comprise multiple information fields, including a preamble 2902 of 7 octets, a start frame delimiter 2904 of 1 octet, a medium access control (MAC) destination 2906 of 6 octets, a MAC source 2908 of 6 octets, an 802.1Q tag (opt) 2910 of 4 octets, an EtherType (ethernet II) or length (IEEE 802.3) 2212 of 2 octets, a payload 2914 of 45-1300 octets, a frame check sequence 2916 (32-bit CRC) of 4 octets, and an interpacket gap 2918 of 12 octets. An L1 Ethernet frame plus an interpacket gap 2918 may comprise a combined information field of length of 72-1530 octets. An L2 Ethernet frame may comprise a first combined information field of 64-1522 octets and a second information field of 12 octets. Embodiments are not limited to using IEEE 803.3 Ethernet as an L1 or L2 transport, and other communications protocols may be used as desired for a given implementation. Embodiments are not limited in this context.

Specific dimensions for a set of ACPs 612 may be determined based on a frame payload capacity, such as the packet and frame structure 2900 for Ethernet, for example. Time granularity of detection is a function of the minimum packet size and the channel speed. The smallest Ethernet packet is 72 bytes+12 bytes of interpacket gap. In a first example, given a 5 gigahertz (GHz) 1300 megabits per second (Mbps) wireless channel, each bit is approximately 0.769 nanoseconds (ns). In the first example, 72 bytes (443.07 ns)+interpacket gap (73.84 ns)=516.92 ns. In a second example, given a 1 Gbps wired channel, each bit is approximately 1ns. In the second example, 72 bytes (72 ns)+interpacket gap (12 ns)=84 ns. In a third example, given a 40 Gbps wired channel, each bit is approximately 25 picoseconds (ps). In the third example, 72 bytes (14.4 ns)+interpacket gap (2.4 ns)=16.8 ns. Embodiments are not limited to these examples.

The time provided by the three examples may be used to calculate a number of ACPs for a set of ACPs 612 for a given time window (e.g., IEEE 803.1Qbv time window). Assume each ACP is 84 bytes wide (672 bits). In this case, each ACP covers an APC_timewidth of: (1) 516.92 ns in 5 GHz 1300 Mbps wireless channel; (2) 84 ns in 1 Gbps wired channel; and (3) 16.8 ns in 40 Gbps wired channel. Given a desired maximum delay detection D, the number of ACPs (NumACPs) is given by Equation (1) as follows:

$$\text{NumACPs} = D/APC\_\text{timewidth} \qquad \text{Equation (1)}$$

For example, for a security monitor 614 to detect 10 microsecond (μs) delays in a 1 Gbps wired channel, a number of APCs needed would be 120 ACPs.

A minimum window size is given by Equation (2) as follows:

$$W\_\text{size(bits)} = 672 * (\text{NumAPCs} + \text{NumNodes} - 1) \qquad \text{Equation (2)}$$

For example, for a TSN with 100 nodes, and each time window with 120 ACPs, the minimum window size is 147840 bits for a 1 Gbps wired network to detect 10 us attacks. Each bit is 84 ns wide, thus a window of 12.5 ms is needed.

Figure 30:
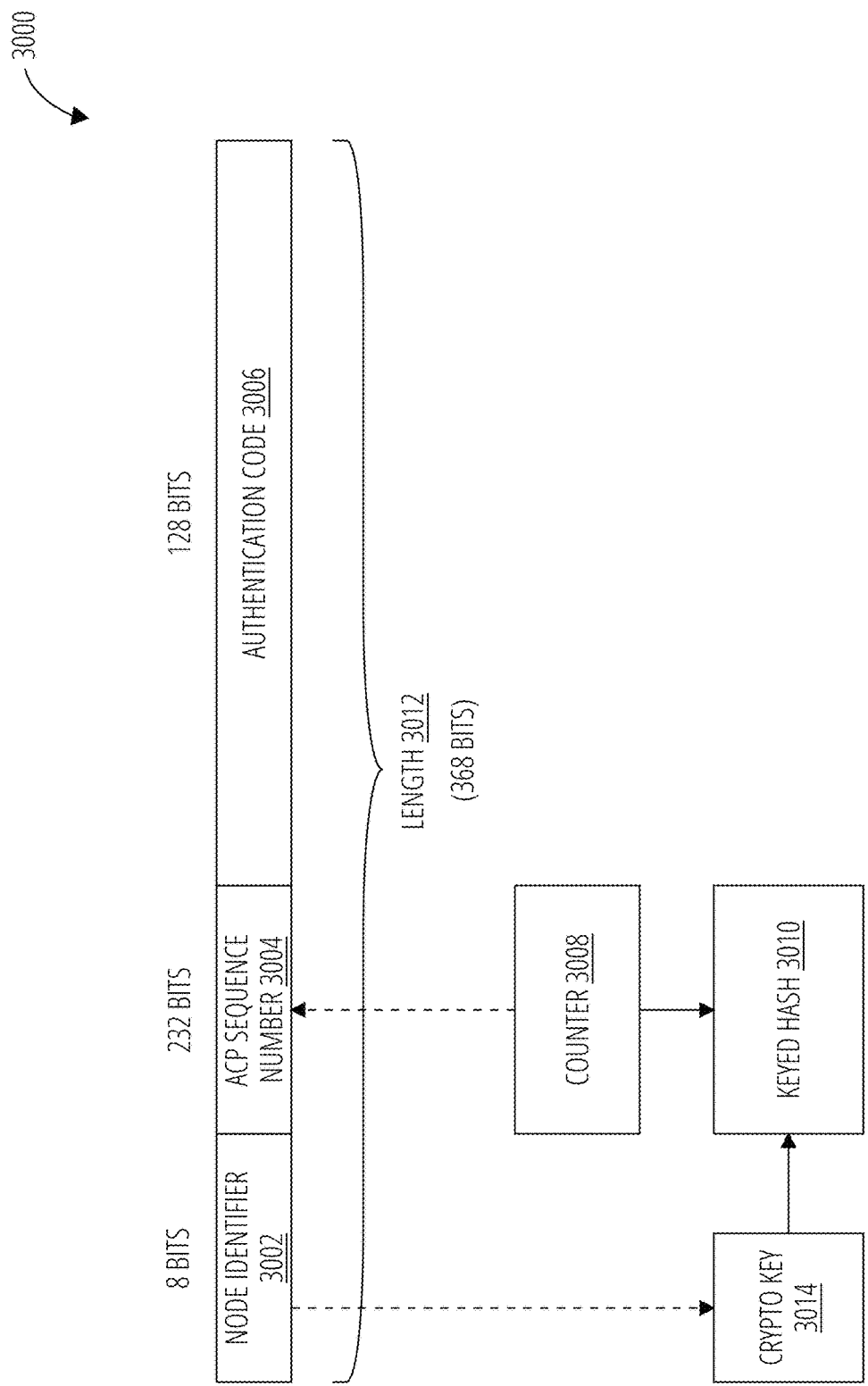
FIG. 30 illustrates an aspect of an alignment-check packet (ACP) structure 3000 in accordance with one embodiment.

FIG. 30 illustrates an exemplary ACP structure 3000 suitable for the ACPs 612. As depicted in FIG. 30, the ACP structure 3000 has three information fields. The first information field is for a node identifier 3002 and it comprises a length of 8 bits. The second information field is for an ACP sequence number 3004 and it comprises a length of 232 bits. The third information field is for an authentication code 3006 and it has a length of 128 bits. The three information fields have a combined total length of 368 bits. It may be appreciated that the number of fields and length of each field is given by way of example and not limitation, and a different number of fields and field lengths can be used for a given implementation. Embodiments are not limited in this context.

Each ACP 612 is generated to be unique, bounded to a TSN node 104, and unforgeable using a cryptographic algorithm. In one embodiment, for example, a pair-wise crypto key 3014 is shared between a TSN node 104 and a security monitor 614. The crypto key 3014 is used as a first input to a key hash algorithm. A count value from a counter 3008 is used as a second input to the key hash algorithm. The key hash algorithm receives the two inputs and outputs a keyed hash 3010. The keyed hash 3010 binds the node identifier 3002 for a TSN node 104 and an ACP sequence number 3004. A security monitor 614 can use the keyed hash 3010 to authenticate and verify each ACP of a set of ACPs 612.

Some embodiments can avoid exhausting a count value of ACP numbers by changing the cryptographic key on a periodic, aperiodic or on-demand basis. This prevents a condition where a TSN node 104 or TSN 102 runs out of sequence numbers. Cryptographic keys are changed periodically, following well-known specifications, such as those from the National Institute of Standards and Technology (NIST). Re-keying operations may also be triggered when a system is potentially running out of ACP sequence numbers.

Embodiments are specifically-designed to protect a TSN 102 from an attacker attempting to compromise one or more TSN nodes 104 from multiple attack vectors. For instance, assume the attacker attempts to block traffic or does not forward traffic. The attacker reveals itself, as traffic from the nodes pertaining to the entire stream path is expected by the security monitor 614. In another example, assume the attacker attempts to drop additional packets. The dropping of packets indicates an abnormality, and that abnormality reveals that the attacker is attempting to compromise the TSN 102. Therefore, there is no incentive for the attacker to drop packets. In yet another example, assume the attacker attempts to inject new packets into the TSN 102. In this case, the attacker cannot forge ACPs 612 as any forged ACP will be detected via the cryptograph scheme used by the TSN nodes 104 and the security monitor 614.

Figure 31B:
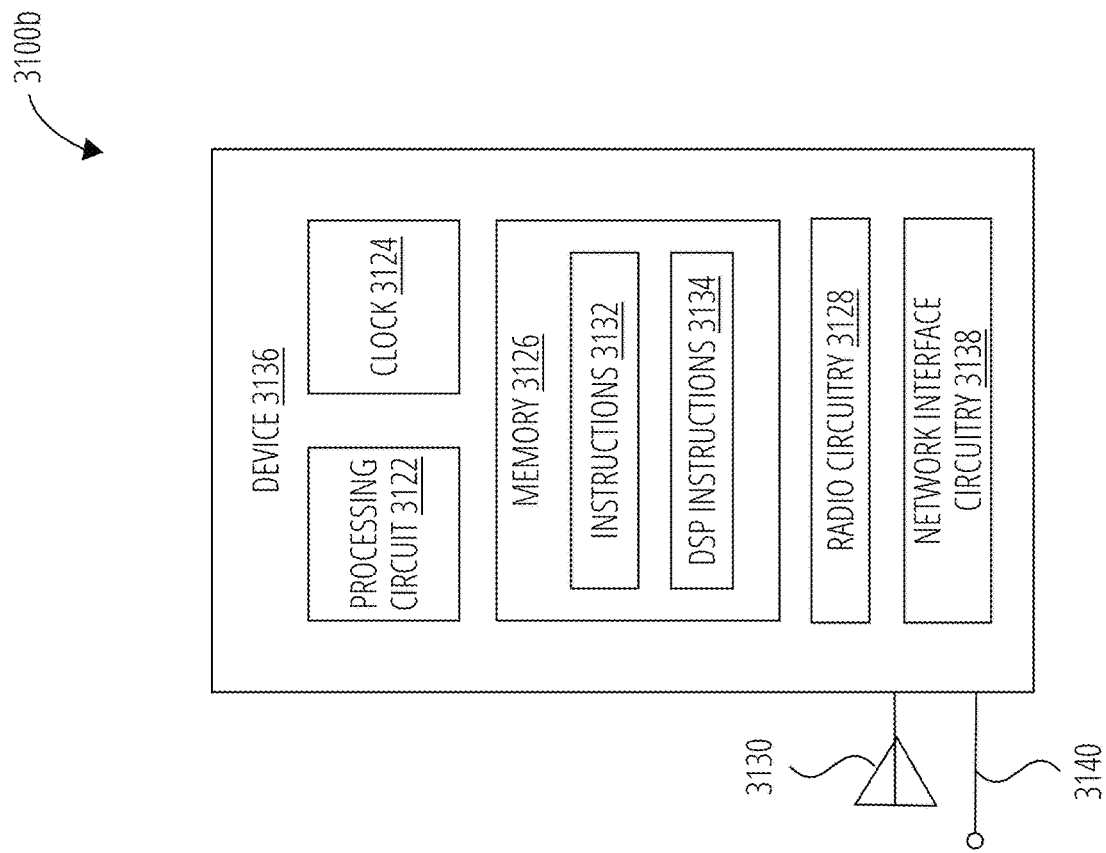
FIG. 31B illustrates an aspect of a TSN node 3100b in accordance with one embodiment.
Figure 31A:
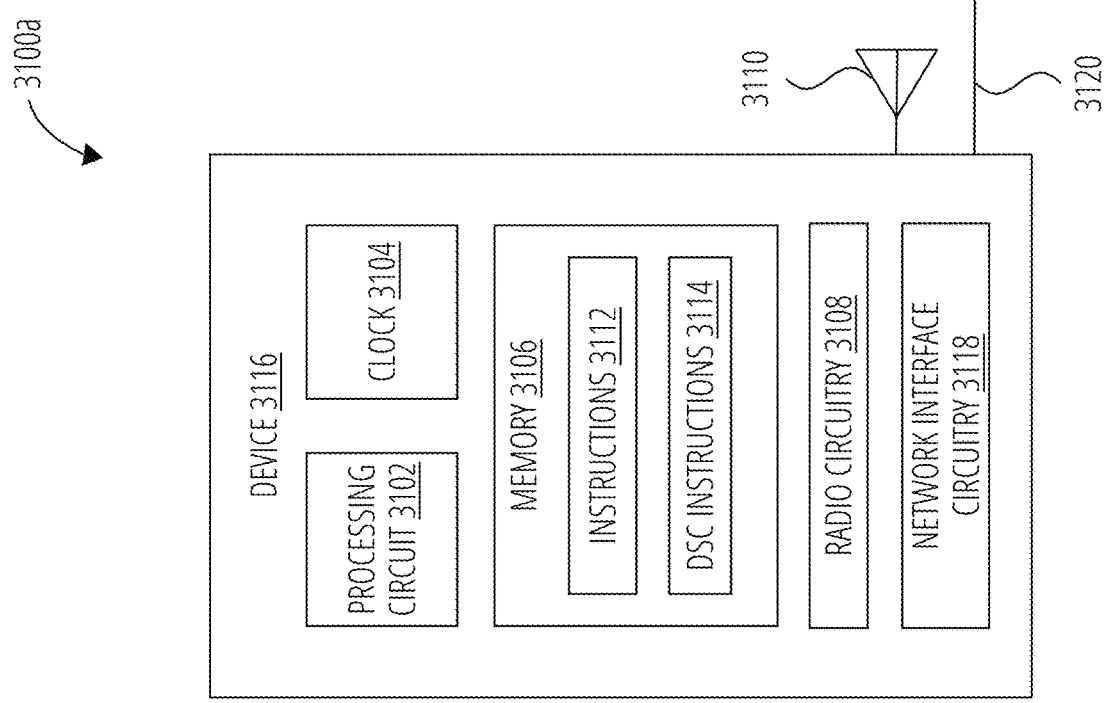
FIG. 31A illustrates an aspect of a TSN node 3100a in accordance with one embodiment.

FIG. 31A depicts a device 3116. The device 3116 could be any one of the TSN nodes 104 in a TSN network. Device 3116 includes a processing circuit 3102, a clock 3104, memory 3106, radio circuitry 3108, an antenna 3110, a network interface circuitry 3118, and a wired connection 3120. Memory 3106 stores instructions 3112 and diagnostic stream consumer instructions 3114. During operation, processing circuit 3102 can execute instructions 3112 and/or diagnostic stream consumer instructions 3114 to cause device 3116 to consume, analyze and monitor diagnostic streams 636 and/or unified streams 638 carrying diagnostic messages 642 with a set of ACPs 612 from other devices in the TSN network. In some examples, processing circuit 3102 can execute instructions 3112 and/or diagnostic stream consumer instructions 3114 to cause device 3116 to operate as a clock leader (CL) for the TSN network, such as sending time synchronization messages, time update messages, and other timing messages defined by various IEEE standards as discussed herein. Furthermore, processing circuit 3102 can execute instructions 3112 to cause device 3116 to send, via radio circuitry 3108 and antenna 3110 or network interface circuitry 3118 timing messages as the CL for a CF in a TSN network. In addition, processing circuit 3102 can execute instructions 3112 to cause device 3116 to send, via radio circuitry 3108 and antenna 3110 or network interface circuitry 3118 security messages in response to a security attack, such as alert messages, notification messages, network reconfiguration messages, device isolation messages, model update messages, and other messages in a TSN network.

FIG. 31B depicts a device 3136. The device 3136 could be any one of the TSN nodes 104 in a TSN network. Device 3136 includes a processing circuit 3122, a clock 3124, memory 3126, radio circuitry 3128, an antenna 3130, a network interface circuitry 3138, and a wired connection 3140. Memory 3126 stores instructions 3132 and diagnostic stream producer instructions 3134. During operation, processing circuit 3122 can execute instructions 3132 and/or diagnostic stream producer instructions 3134 to cause device 3136 to generate and send diagnostic streams 636 and/or unified streams 638 carrying diagnostic messages 642 with a set of ACPs 612 to other devices in the TSN network. In some examples, processing circuit 3122 can execute instructions 3132 and/or diagnostic stream producer instructions 3134 to operate as a clock follower (CF) for the TSN network, such as receiving timing messages as a clock follower (e.g., from time measurements from a global clock for a TSN network) from other devices in the TSN network, such as the device 3116. In some examples, processing circuit 3122 can execute instructions 3132 and/or diagnostic stream producer instructions 3134 to cause device 3136 to receive time synchronization messages, time update messages, and other timing messages defined by various IEEE standards as discussed herein. Furthermore, processing circuit 3122 can execute instructions 3132 and/or diagnostic stream producer instructions 3134 to cause device 3136 to receive, via radio circuitry 3128 and antenna 3130 or network interface circuitry 3138 timing messages as the CF for a CL in a TSN network. In addition, processing circuit 3122 can execute instructions 3132 and/or diagnostic stream producer instructions 3134 to cause device 3136 to send, via radio circuitry 3128 and antenna 3130 or network interface circuitry 3138 security messages in response to a security attack, such as alert messages, notification messages, network reconfiguration messages, device isolation messages, model update messages, and other messages in a TSN network.

Figure 32:
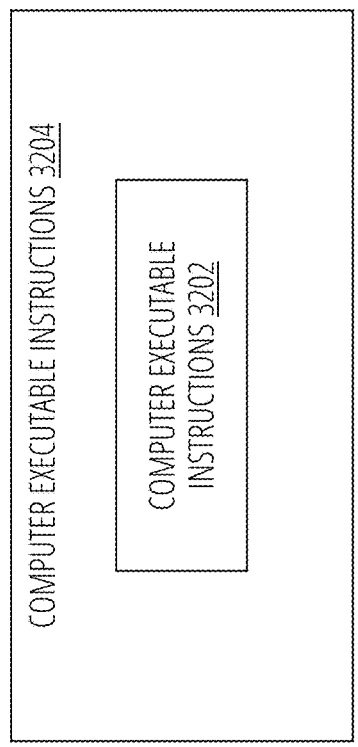
FIG. 32 illustrates an aspect of a computer-readable medium 3200 in accordance with one embodiment.

FIG. 32 illustrates computer-readable storage computer-readable medium 3200. Computer-readable storage computer-readable medium 3200 may comprise any non-transitory computer-readable storage medium or machine-readable storage medium, such as an optical, magnetic or semiconductor storage medium. In various embodiments, computer-readable storage computer-readable medium 3200 may comprise an article of manufacture. In some embodiments, computer-readable storage computer-readable medium 3200 may store computer executable instructions 3202 with which circuitry (e.g., processing circuitry 414, processor circuitry 622, processor circuitry 628, processing circuit 3102, processing circuit 3122, radio circuitry 3108, radio circuitry 3128, network interface circuitry 3118, network interface circuitry 3138, clock manager 106, clock circuitry 412, interface 626, interface 632, or the like) can execute. For example, computer executable instructions 3202 can include instructions to implement operations described with respect to logic flows 1900 and 2000. Examples of computer-readable storage computer-readable medium 3200 or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions 3202 may include any suitable type of code, such as source code, compiled code, interpreted code, executable code, static code, dynamic code, object-oriented code, visual code, and the like.

The various elements of the devices as previously described with reference to the figures include various hardware elements, software elements, or a combination of both. Examples of hardware elements include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements varies in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment are implemented by representative instructions stored on a machine-readable medium which represents various logic within the processor, which when read by a machine causes the machine to fabricate logic to perform the techniques described herein. Such representations, known as "intellectual property (IP) cores" are stored on a tangible, machine readable medium and supplied to various customers or manufacturing facilities to load into the fabrication machines that make the logic or processor. Some embodiments are implemented, for example, using a machine-readable medium or article which may store an instruction or a set of instructions that, when executed by a machine, causes the machine to perform a method and/or operations in accordance with the embodiments. Such a machine includes, for example, any suitable processing platform, computing platform, computing device, processing device, computing system, processing system, processing devices, computer, processor, or the like, and is implemented using any suitable combination of hardware and/or software. The machine-readable medium or article includes, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions include any suitable type of code, such as source code, compiled code, interpreted code, executable code, static code, dynamic code, encrypted code, and the like, implemented using any suitable high-level, low-level, object-oriented, visual, compiled and/or interpreted programming language.

As utilized herein, terms "component," "system," "interface," and the like are intended to refer to a computer-related entity, hardware, software (e.g., in execution), and/or firmware. For example, a component is a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server is also a component. One or more components reside within a process, and a component is localized on one computer and/or distributed between two or more computers. A set of elements or a set of other components are described herein, in which the term "set" can be interpreted as "one or more."

Further, these components execute from various computer readable storage media having various data structures stored thereon such as with a module, for example. The components communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component is an apparatus with specific functionality provided by mechanical parts operated by electric or electronic circuitry, in which the electric or electronic circuitry is operated by a software application or a firmware application executed by one or more processors. The one or more processors are internal or external to the apparatus and execute at least a part of the software or firmware application. As yet another example, a component is an apparatus that provides specific functionality through electronic components without mechanical parts; the electronic components include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description or the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include a circuit, an integrated circuit (IC), a monolithic IC, a discrete circuit, a hybrid integrated circuit (HIC), an Application Specific Integrated Circuit (ASIC), an electronic circuit, a logic circuit, a microcircuit, a hybrid circuit, a microchip, a chip, a chiplet, a chipset, a multi-chip module (MCM), a semiconductor die, a system on a chip (SoC), a processor (shared, dedicated, or group), a processor circuit, a processing circuit, or associated memory (shared, dedicated, or group) operably coupled to the circuitry that execute one or more software or firmware programs, a combinational logic circuit, or other suitable hardware components that provide the described functionality. In some embodiments, the circuitry is implemented in, or functions associated with the circuitry are implemented by, one or more software or firmware modules. In some embodiments, circuitry includes logic, at least partially operable in hardware. It is noted that hardware, firmware and/or software elements may be collectively or individually referred to herein as "logic" or "circuit."

Some embodiments are described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately can be employed in combination with each other unless it is noted that the features are incompatible with each other.

Some embodiments are presented in terms of program procedures executed on a computer or network of computers. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments are described using the expression "coupled" and "connected" along with their derivatives. These terms are not necessarily intended as synonyms for each other. For example, some embodiments are described using the terms "connected" and/or "coupled" to indicate that two or more elements are in direct physical or electrical contact with each other. The term "coupled," however, also means that two or more elements are not in direct contact with each other, but yet still co-operate or interact with each other.

Various embodiments also relate to apparatus or systems for performing these operations. This apparatus is specially constructed for the required purpose or it comprises a general purpose computer as selectively activated or reconfigured by a computer program stored in the computer. The procedures presented herein are not inherently related to a particular computer or other apparatus. Various general purpose machines are used with programs written in accordance with the teachings herein, or it proves convenient to construct more specialized apparatus to perform the required method steps. The required structure for a variety of these machines are apparent from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

The following aspects and examples pertain to further embodiments, from which numerous permutations and configurations will be apparent.

In one example, a method, may include receiving a diagnostic message in a time-synchronized network (TSN) by a diagnostic stream consumer of the TSN, the diagnostic message to comprise a set of alignment-check packets (ACPs) for a diagnostic stream producer, the set of ACPs to include a reference ACP, receiving a first subset of ACPs from the set of ACPs in a first time window, receiving a second subset of ACPs from the set of ACPs in a second time window, the second subset of ACPs to include at least the reference ACP, determining an amount of desynchronization time for the diagnostic message based on a number of ACPs in the second subset of ACPs excluding the reference ACP and a defined size for each ACP in the number of ACPs, and generating a security alert when the desynchronization time exceeds a defined threshold.

The method of any previous example may include determining an actual pattern for the second subset of ACPs received in the second time window, the actual pattern to comprise actual times blocks of ACPs are received in the second time window, where each actual time corresponds to a network node in a network path between the diagnostic stream producer and the diagnostic stream consumer.

The method of any previous example may include retrieving an estimated pattern for the second subset of ACPs, the estimated pattern to comprise estimated times blocks of ACPs are received in the second time window, where each estimated time corresponds to a network node in a network path between the diagnostic stream producer and the diagnostic stream consumer.

The method of any previous example may include detecting a timing difference between an actual pattern and an estimated pattern for the second subset of ACPs.

The method of any previous example may include identifying a network node in a network path between the diagnostic stream producer and the diagnostic stream consumer as a source of the desynchronization time based on a timing difference between an actual pattern and an estimated pattern for the second subset of ACPs.

The method of any previous example may include identifying a network node in a network path between the diagnostic stream producer and the diagnostic stream consumer as a source of the desynchronization time based on a timing difference between an actual pattern and an estimated pattern for the second subset of ACPs, may also include where the timing difference indicates an early arrival of a block of ACPs.

The method of any previous example may include identifying a network node in a network path between the diagnostic stream producer and the diagnostic stream consumer as a source of the desynchronization time based on a timing difference between an actual pattern and an estimated pattern for the second subset of ACPs, may also include where the timing difference indicates a late arrival of a block of ACPs.

The method of any previous example may also include where a set of network nodes in a network path between the diagnostic stream producer and the diagnostic stream consumer use a time-aligned set of time windows to transmit and receive the set of ACPs.

The method of any previous example may also include where a set of network nodes in a network path between the diagnostic stream producer and the diagnostic stream consumer use a time-aligned set of time windows to transmit and receive the set of ACPs in a first time window, may also include where each network node uses an offset parameter to offset when to transmit the set of ACPs relative to a neighboring network node in the first time window.

The method of any previous example may also include where a set of network nodes in a network path between the diagnostic stream producer and the diagnostic stream consumer use a time-aligned set of time windows to transmit and receive the set of ACPs in a second time window, may also include where each network node uses an offset parameter to offset when to transmit the set of ACPs relative to a neighboring network node in the first time window, each offset parameter to represent a link delay and a switch delay for the network node.

The method of any previous example may also include where a set of network nodes in a network path between the diagnostic stream producer and the diagnostic stream consumer use a time-aligned set of time windows to transmit and receive the set of ACPs in a second time window, may also include where each network node uses a reverse offset parameter to offset when to transmit the set of ACPs relative to a neighboring network node in the second time window.

The method of any previous example may include sending an instruction to a network node in a network path between the diagnostic stream producer and the diagnostic stream consumer, the instruction to cause the network node to send a test ACP to diagnose whether the network node is compromised.

The method of any previous example may also include where each ACP in the set of ACPs is unique and unforgeable.

The method of any previous example may also include where the diagnostic message is received in a diagnostic stream.

The method of any previous example may also include where the diagnostic message is received in a unified stream.

The method of any previous example may also include where in the first time window and the second time window are defined in accordance with an 802.1Qbv protocol standard.

The method of any previous example may also include where the desynchronization time is determined from a time-width of an ACP, the time-width to comprise a function of an ACP bit-width and channel speed. Other technical features may be readily apparent to one skilled in the art from the following figures, descriptions, and claims.

In one example, a computing apparatus may include a processor circuitry. The computing apparatus may include a memory storing instructions that, when executed by the processor circuitry, cause the processor circuitry to receive a diagnostic message in a time-synchronized network (TSN) by a diagnostic stream consumer of the TSN, the diagnostic message to comprise a set of alignment-check packets (ACPs) for a diagnostic stream producer, the set of ACPs to include a reference ACP, receive a first subset of ACPs from the set of ACPs in a first time window, receive a second subset of ACPs from the set of ACPs in a second time window, the second subset of ACPs to include at least the reference ACP, determine an amount of desynchronization time for the diagnostic message based on a number of ACPs in the second subset of ACPs excluding the reference ACP and a defined size for each ACP in the number of ACPs, and generate a security alert when the desynchronization time exceeds a defined threshold.

The computing apparatus of any previous example the processor circuitry to determine an actual pattern for the second subset of ACPs received in the second time window, the actual pattern to comprise actual times blocks of ACPs are received in the second time window, where each actual time corresponds to a network node in a network path between the diagnostic stream producer and the diagnostic stream consumer.

The computing apparatus of any previous example the processor circuitry to retrieve an estimated pattern for the second subset of ACPs, the estimated pattern to comprise estimated times blocks of ACPs are received in the second time window, where each estimated time corresponds to a network node in a network path between the diagnostic stream producer and the diagnostic stream consumer.

The computing apparatus of any previous example the processor circuitry to detect a timing difference between an actual pattern and an estimated pattern for the second subset of ACPs.

The computing apparatus of any previous example the processor circuitry to identify a network node in a network path between the diagnostic stream producer and the diagnostic stream consumer as a source of the desynchronization time based on a timing difference between an actual pattern and an estimated pattern for the second subset of ACPs.

The computing apparatus of any previous example the processor circuitry to identify a network node in a network path between the diagnostic stream producer and the diagnostic stream consumer as a source of the desynchronization time based on a timing difference between an actual pattern and an estimated pattern for the second subset of ACPs, may also include where the timing difference indicates an early arrival of a block of ACPs.

The computing apparatus of any previous example the processor circuitry to identify a network node in a network path between the diagnostic stream producer and the diagnostic stream consumer as a source of the desynchronization time based on a timing difference between an actual pattern and an estimated pattern for the second subset of ACPs, may also include where the timing difference indicates a late arrival of a block of ACPs.

The computing apparatus of any previous example may also include where a set of network nodes in a network path between the diagnostic stream producer and the diagnostic stream consumer use a time-aligned set of time windows to transmit and receive the set of ACPs.

The computing apparatus of any previous example may also include where a set of network nodes in a network path between the diagnostic stream producer and the diagnostic stream consumer use a time-aligned set of time windows to transmit and receive the set of ACPs in a first time window, may also include where each network node uses an offset parameter to offset when to transmit the set of ACPs relative to a neighboring network node in the first time window.

The computing apparatus of any previous example may also include where a set of network nodes in a network path between the diagnostic stream producer and the diagnostic stream consumer use a time-aligned set of time windows to transmit and receive the set of ACPs in a second time window, may also include where each network node uses an offset parameter to offset when to transmit the set of ACPs relative to a neighboring network node in the first time window, each offset parameter to represent a link delay and a switch delay for the network node.

The computing apparatus of any previous example may also include where a set of network nodes in a network path between the diagnostic stream producer and the diagnostic stream consumer use a time-aligned set of time windows to transmit and receive the set of ACPs in a second time window, may also include where each network node uses a reverse offset parameter to offset when to transmit the set of ACPs relative to a neighboring network node in the second time window.

The computing apparatus of any previous example the processor circuitry to send an instruction to a network node in a network path between the diagnostic stream producer and the diagnostic stream consumer, the instruction to cause the network node to send a test ACP to diagnose whether the network node is compromised.

The computing apparatus of any previous example may also include where each ACP in the set of ACPs is unique and unforgeable.

The computing apparatus of any previous example may also include where the diagnostic message is received in a diagnostic stream.

The computing apparatus of any previous example may also include where the diagnostic message is received in a unified stream.

The computing apparatus of any previous example may also include where in the first time window and the second time window are defined in accordance with an 802.1 Qbv protocol standard.

The computing apparatus of any previous example may also include where the desynchronization time is determined from a time-width of an ACP, the time-width to comprise a function of an ACP bit-width and channel speed. Other technical features may be readily apparent to one skilled in the art from the following figures, descriptions, and claims.

In one example, a non-transitory computer-readable storage medium, the computer-readable storage medium including instructions that when executed by processor circuitry, cause the processor circuitry to receive a diagnostic message in a time-synchronized network (TSN) by a diagnostic stream consumer of the TSN, the diagnostic message to comprise a set of alignment-check packets (ACPs) for a diagnostic stream producer, the set of ACPs to include a reference ACP, receive a first subset of ACPs from the set of ACPs in a first time window, receive a second subset of ACPs from the set of ACPs in a second time window, the second subset of ACPs to include at least the reference ACP, determine an amount of desynchronization time for the diagnostic message based on a number of ACPs in the second subset of ACPs excluding the reference ACP and a defined size for each ACP in the number of ACPs, and generate a security alert when the desynchronization time exceeds a defined threshold.

The computer-readable storage medium of any previous example may include instructions that when executed by processor circuitry, cause the processor circuitry to determine an actual pattern for the second subset of ACPs received in the second time window, the actual pattern to comprise actual times blocks of ACPs are received in the second time window, where each actual time corresponds to a network node in a network path between the diagnostic stream producer and the diagnostic stream consumer.

The computer-readable storage medium of any previous example may include instructions that when executed by processor circuitry, cause the processor circuitry to retrieve an estimated pattern for the second subset of ACPs, the estimated pattern to comprise estimated times blocks of ACPs are received in the second time window, where each estimated time corresponds to a network node in a network path between the diagnostic stream producer and the diagnostic stream consumer.

The computer-readable storage medium of any previous example may include instructions that when executed by processor circuitry, cause the processor circuitry to detect a timing difference between an actual pattern and an estimated pattern for the second subset of ACPs.

The computer-readable storage medium of any previous example may include instructions that when executed by processor circuitry, cause the processor circuitry to identify a network node in a network path between the diagnostic stream producer and the diagnostic stream consumer as a source of the desynchronization time based on a timing difference between an actual pattern and an estimated pattern for the second subset of ACPs.

The computer-readable storage medium of any previous example may include instructions that when executed by processor circuitry, cause the processor circuitry to identify a network node in a network path between the diagnostic stream producer and the diagnostic stream consumer as a source of the desynchronization time based on a timing difference between an actual pattern and an estimated pattern for the second subset of ACPs, may also include where the timing difference indicates an early arrival of a block of ACPs.

The computer-readable storage medium of any previous example may include instructions that when executed by processor circuitry, cause the processor circuitry to identify a network node in a network path between the diagnostic stream producer and the diagnostic stream consumer as a source of the desynchronization time based on a timing difference between an actual pattern and an estimated pattern for the second subset of ACPs, may also include where the timing difference indicates a late arrival of a block of ACPs.

The computer-readable storage medium of any previous example may also include where a set of network nodes in a network path between the diagnostic stream producer and the diagnostic stream consumer use a time-aligned set of time windows to transmit and receive the set of ACPs.

The computer-readable storage medium of any previous example may also include where a set of network nodes in a network path between the diagnostic stream producer and the diagnostic stream consumer use a time-aligned set of time windows to transmit and receive the set of ACPs in a first time window, may also include where each network node uses an offset parameter to offset when to transmit the set of ACPs relative to a neighboring network node in the first time window.

The computer-readable storage medium of any previous example may also include where a set of network nodes in a network path between the diagnostic stream producer and the diagnostic stream consumer use a time-aligned set of time windows to transmit and receive the set of ACPs in a second time window, may also include where each network node uses an offset parameter to offset when to transmit the set of ACPs relative to a neighboring network node in the first time window, each offset parameter to represent a link delay and a switch delay for the network node.

The computer-readable storage medium of any previous example may also include where a set of network nodes in a network path between the diagnostic stream producer and the diagnostic stream consumer use a time-aligned set of time windows to transmit and receive the set of ACPs in a second time window, may also include where each network node uses a reverse offset parameter to offset when to transmit the set of ACPs relative to a neighboring network node in the second time window.

The computer-readable storage medium of any previous example may include instructions that when executed by processor circuitry, cause the processor circuitry to send an instruction to a network node in a network path between the diagnostic stream producer and the diagnostic stream consumer, the instruction to cause the network node to send a test ACP to diagnose whether the network node is compromised.

The computer-readable storage medium of any previous example may also include where each ACP in the set of ACPs is unique and unforgeable.

The computer-readable storage medium of any previous example may also include where the diagnostic message is received in a diagnostic stream.

The computer-readable storage medium of any previous example may also include where the diagnostic message is received in a unified stream.

The computer-readable storage medium of any previous example may also include where in the first time window and the second time window are defined in accordance with an 802.1Qbv protocol standard.

The computer-readable storage medium of any previous example may also include where the desynchronization time is determined from a time-width of an ACP, the time-width to comprise a function of an ACP bit-width and channel speed.

It may be appreciated that any of the previous examples may be implemented as systems and/or means plus function embodiments. Embodiments are not limited to these examples.

What is claimed is:

1. A method, comprising:
   receiving a diagnostic message in a time-synchronized network (TSN) by a diagnostic stream consumer of the TSN, the diagnostic message to comprise a set of alignment-check packets (ACPs) for a diagnostic stream producer, the set of ACPs to include a reference ACP, the reference ACP comprising diagnostic information associated with the diagnostic stream producer, the diagnostic information comprising a node identifier for the diagnostic stream producer, an ACP sequence number, and an authentication code for the diagnostic stream producer;
   receiving a first subset of ACPs from the set of ACPs in a first time window;
   receiving a second subset of ACPs from the set of ACPs in a second time window, the second subset of ACPs to include at least the reference ACP;
   determining an amount of desynchronization time for the diagnostic message based on a number of ACPs in the second subset of ACPs and a defined size for each ACP in the number of ACPs; and
   generating a security alert when the desynchronization time exceeds a defined threshold.

2. The method of claim 1, comprising determining an actual pattern for the second subset of ACPs received in the second time window, the actual pattern to comprise actual times blocks of ACPs are received in the second time window, where each actual time corresponds to a network node in a network path between the diagnostic stream producer and the diagnostic stream consumer.

3. The method of claim 1, comprising retrieving an estimated pattern for the second subset of ACPs, the estimated pattern to comprise estimated times blocks of ACPs are received in the second time window, where each estimated time corresponds to a network node in a network path between the diagnostic stream producer and the diagnostic stream consumer.

4. The method of claim 1, comprising detecting a timing difference between an actual pattern and an estimated pattern for the second subset of ACPs.

5. The method of claim 1, comprising identifying a network node in a network path between the diagnostic stream producer and the diagnostic stream consumer as a source of the desynchronization time based on a timing difference between an actual pattern and an estimated pattern for the second subset of ACPs.

6. The method of claim 1, comprising identifying a network node in a network path between the diagnostic stream producer and the diagnostic stream consumer as a source of the desynchronization time based on a timing difference between an actual pattern and an estimated pattern for the second subset of ACPs, wherein the timing difference indicates an early arrival of a block of ACPs.

7. The method of claim 1, comprising identifying a network node in a network path between the diagnostic stream producer and the diagnostic stream consumer as a source of the desynchronization time based on a timing difference between an actual pattern and an estimated pattern for the second subset of ACPs, wherein the timing difference indicates a late arrival of a block of ACPs.

8. The method of claim 1, wherein a set of network nodes in a network path between the diagnostic stream producer and the diagnostic stream consumer use a time-aligned set of time windows to transmit and receive the set of ACPs.

9. A computing apparatus comprising:
   a processor circuitry; and
   a memory storing instructions that, when executed by the processor circuitry, cause the processor circuitry to:
   receive a diagnostic message in a time-synchronized network (TSN) by a diagnostic stream consumer of the TSN, the diagnostic message to comprise a set of alignment-check packets (ACPs) for a diagnostic stream producer, the set of ACPs to include a reference ACP, the reference ACP comprising diagnostic information associated with the diagnostic stream producer, the diagnostic information comprising a node identifier for the diagnostic stream producer, an ACP sequence number, and an authentication code for the diagnostic stream producer;
   receive a first subset of ACPs from the set of ACPs in a first time window;
   receive a second subset of ACPs from the set of ACPs in a second time window, the second subset of ACPs to include at least the reference ACP;
   determine an amount of desynchronization time for the diagnostic message based on a number of ACPs in the second subset of ACPs excluding the reference ACP and a defined size for each ACP in the number of ACPs; and
   generate a security alert when the desynchronization time exceeds a defined threshold.

10. The computing apparatus of claim 9, the processor circuitry to determine an actual pattern for the second subset of ACPs received in the second time window, the actual pattern to comprise actual times blocks of ACPs are received in the second time window, where each actual time corresponds to a network node in a network path between the diagnostic stream producer and the diagnostic stream consumer.

11. The computing apparatus of claim 9, the processor circuitry to retrieve an estimated pattern for the second subset of ACPs, the estimated pattern to comprise estimated times blocks of ACPs are received in the second time window, where each estimated time corresponds to a network node in a network path between the diagnostic stream producer and the diagnostic stream consumer.

12. The computing apparatus of claim 9, the processor circuitry to detect a timing difference between an actual pattern and an estimated pattern for the second subset of ACPs.

13. The computing apparatus of claim 9, the processor circuitry to identify a network node in a network path between the diagnostic stream producer and the diagnostic stream consumer as a source of the desynchronization time based on a timing difference between an actual pattern and an estimated pattern for the second subset of ACPs.

14. The computing apparatus of claim 9, the processor circuitry to identify a network node in a network path between the diagnostic stream producer and the diagnostic stream consumer as a source of the desynchronization time based on a timing difference between an actual pattern and an estimated pattern for the second subset of ACPs, wherein the timing difference indicates an early arrival of a block of ACPs.

15. The computing apparatus of claim 9, the processor circuitry to identify a network node in a network path between the diagnostic stream producer and the diagnostic stream consumer as a source of the desynchronization time based on a timing difference between an actual pattern and an estimated pattern for the second subset of ACPs, wherein the timing difference indicates a late arrival of a block of ACPs.

16. A non-transitory computer-readable storage medium, the computer-readable storage medium including instructions that when executed by processor circuitry, cause the processor circuitry to:
receive a diagnostic message in a time-synchronized network (TSN) by a diagnostic stream consumer of the TSN, the diagnostic message to comprise a set of alignment-check packets (ACPs) for a diagnostic stream producer, the set of ACPs to include a reference ACP, the reference ACP comprising diagnostic information associated with the diagnostic stream producer, the diagnostic information comprising a node identifier for the diagnostic stream producer, an ACP sequence number, and an authentication code for the diagnostic stream producer;
receive a first subset of ACPs from the set of ACPs in a first time window;
receive a second subset of ACPs from the set of ACPs in a second time window, the second subset of ACPs to include at least the reference ACP;
determine an amount of desynchronization time for the diagnostic message based on a number of ACPs in the second subset of ACPs excluding the reference ACP and a defined size for each ACP in the number of ACPs; and
generate a security alert when the desynchronization time exceeds a defined threshold.

17. The computer-readable storage medium of claim 16, comprising instructions that when executed by processor circuitry, cause the processor circuitry to determine an actual pattern for the second subset of ACPs received in the second time window, the actual pattern to comprise actual times blocks of ACPs are received in the second time window, where each actual time corresponds to a network node in a network path between the diagnostic stream producer and the diagnostic stream consumer.

18. The computer-readable storage medium of claim 16, comprising instructions that when executed by processor circuitry, cause the processor circuitry to retrieve an estimated pattern for the second subset of ACPs, the estimated pattern to comprise estimated times blocks of ACPs are received in the second time window, where each estimated time corresponds to a network node in a network path between the diagnostic stream producer and the diagnostic stream consumer.

19. The computer-readable storage medium of claim 16, comprising instructions that when executed by processor circuitry, cause the processor circuitry to detect a timing difference between an actual pattern and an estimated pattern for the second subset of ACPs.

20. The computer-readable storage medium of claim 16, comprising instructions that when executed by processor circuitry, cause the processor circuitry to identify a network node in a network path between the diagnostic stream producer and the diagnostic stream consumer as a source of the desynchronization time based on a timing difference between an actual pattern and an estimated pattern for the second subset of ACPs.

* * * * *